United States Patent [19]
Velander et al.

[11] Patent Number: 5,977,345
[45] Date of Patent: Nov. 2, 1999

[54] INSIDE-OUT CROSSLINKED AND COMMERCIAL-SCALE HYDROGELS, AND SUB-MACROMOLECULAR SELECTIVE PURIFICATION USING THE HYRDOGELS

[75] Inventors: William H. Velander, Blacksburg; Kevin E. Van Cott, Shawsville; Roger Van Tassell, Blacksburg, all of Va.

[73] Assignee: Virginia Tech Intellectual Properties, Inc, Blacksburg, Va.

[21] Appl. No.: 09/033,686

[22] Filed: Mar. 3, 1998

[51] Int. Cl.⁶ .......................... B01D 15/08; B01D 39/00; C02F 1/28
[52] U.S. Cl. .................. 536/57; 210/198.2; 210/502.1; 210/635; 210/656; 96/101; 502/404
[58] Field of Search .......................... 536/57; 210/198.2, 210/502.1, 635, 656; 96/101; 502/404

[56] References Cited

U.S. PATENT DOCUMENTS 5,328,603   7/1994   Velander et al. ..................... 210/198.2

OTHER PUBLICATIONS

"Optimization of Pressure–Flow Limits, Strength, Intraparticle Transport and Dynamic Capacity by Hydrogel Solids Content and Bead Size in Cellulose Immunosorbents", Journal of Chromatograpy, 648 (1993) 79–90, Jeffrey A. Kaster et al.

"A Systematic Approach to Screening Ion–Exchange Chromatography Media for Process Development", Y. Dasarathy et al., BioPharm, Sep. 10, 1996, pp. 42–45.

"Analysis of Nonequilibrium Adsorption/Desorption Kinetics and Implications for Analytical and Preparative Chromatograpy", R. Whitley et al., Ind. Eng. Chem. Res. 1993, 32, 149–159.

"Predictability of Chromatographic Protein Separations, Study of Size–Exclusion Media with Narrow Particle Size Distributions", A. Athalye et al., Journal of Chromatography, 589 (1992) 71–85.

*Primary Examiner*—Nathan M. Nutter
*Attorney, Agent, or Firm*—Sughrue, Mion, Zinn, Macpeak & Seas, PLLC

[57] ABSTRACT

Relating to chromatographic processes and ion-exchange and affinity matrices, a spatial installation method for a bifunctional reagent that crosslinks and/or activates a polymer matrix is disclosed, with inside-outside installation of a bifunctional reagent on and within a polymer matrix. The polymer matrix is cellulose, agarose, or chitosan particles. The installation may be followed by inside-outside ligand attachment, by further reacting the matrix with a ligand or ionic group so that a higher concentration of ligand or ionic moiety occurs on the intra-particle volume than the outer matrix surface.

24 Claims, 37 Drawing Sheets

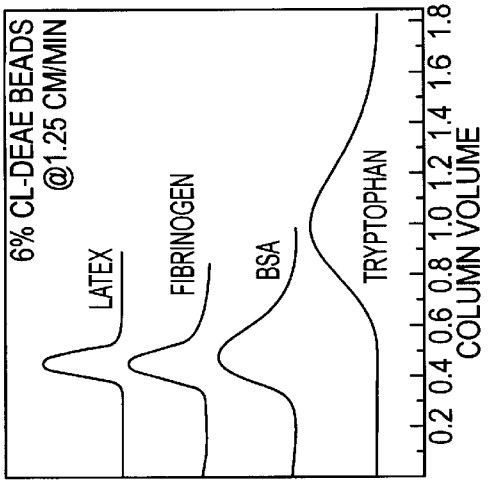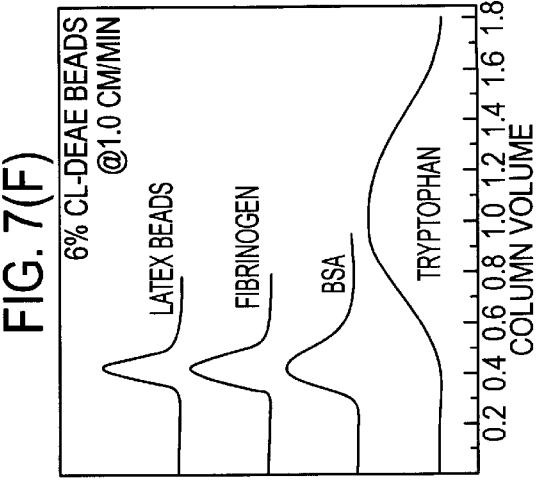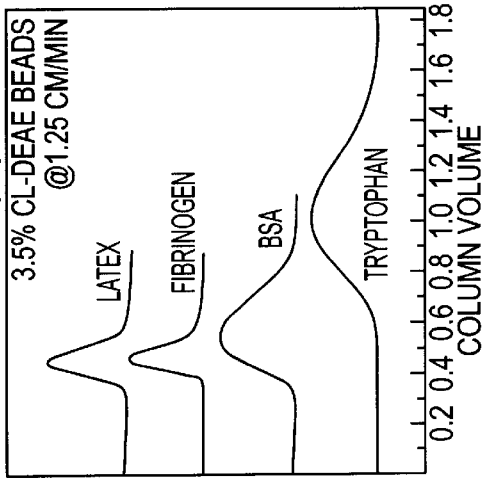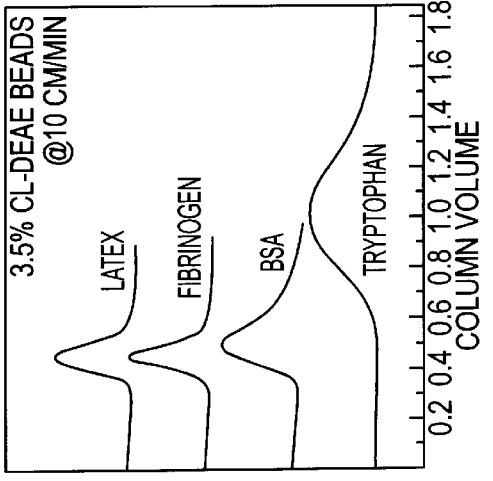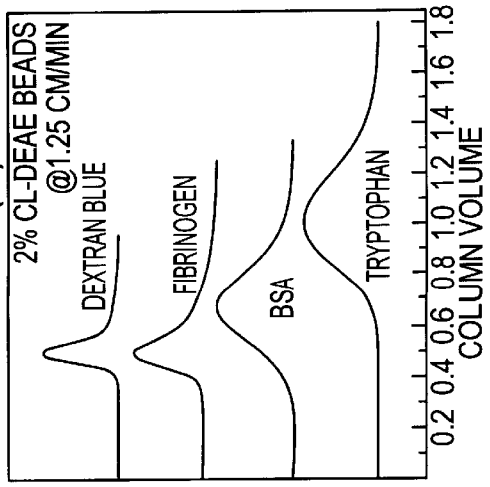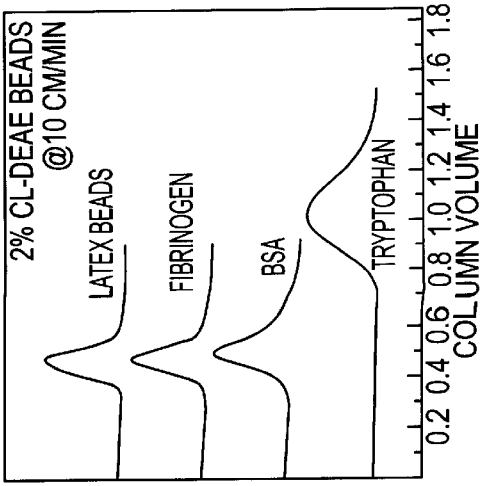

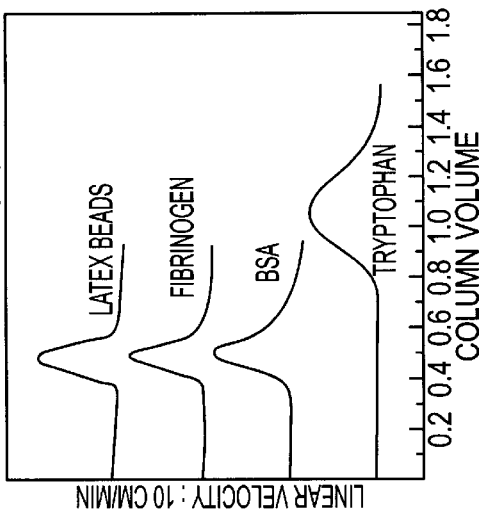
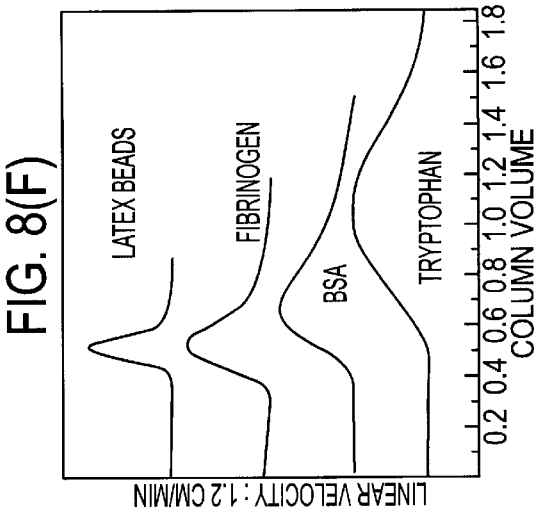
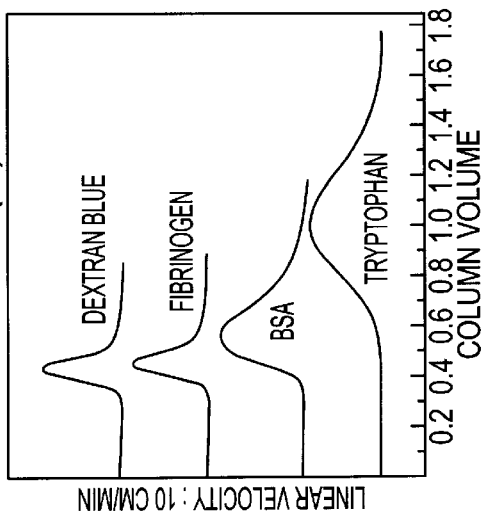
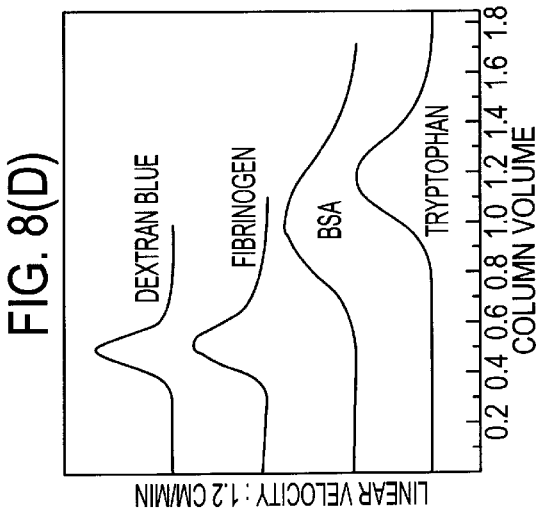
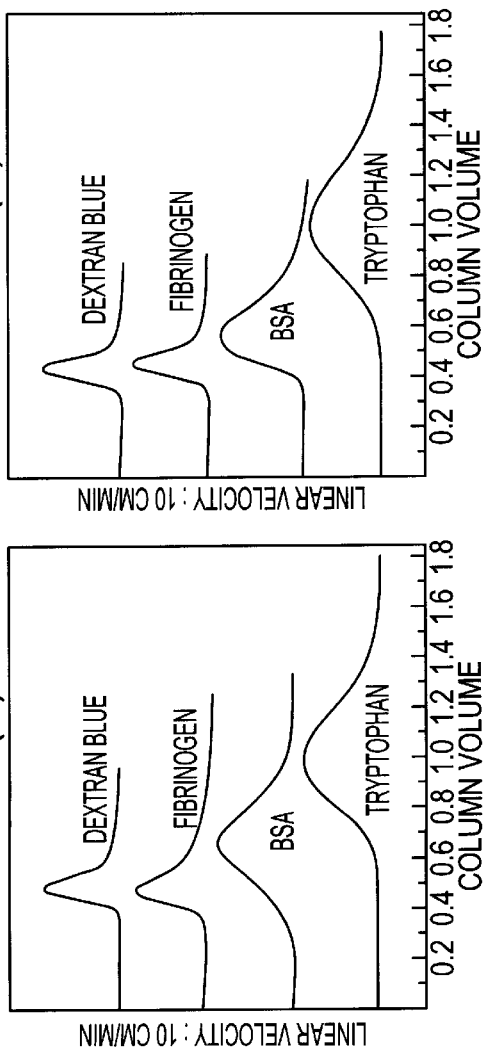
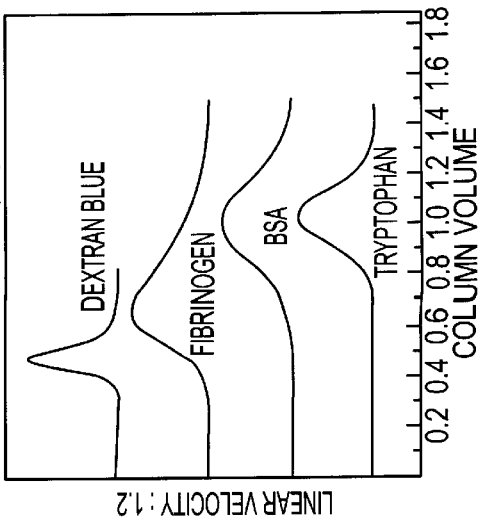

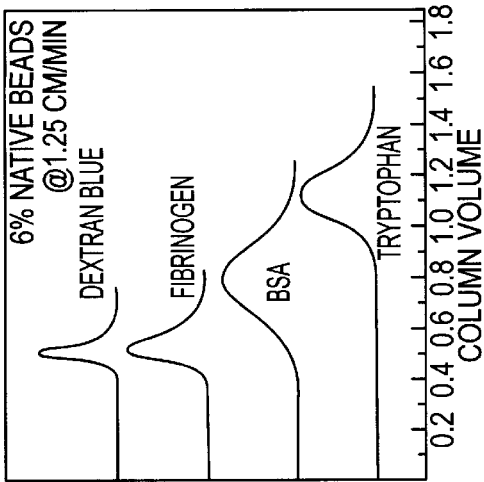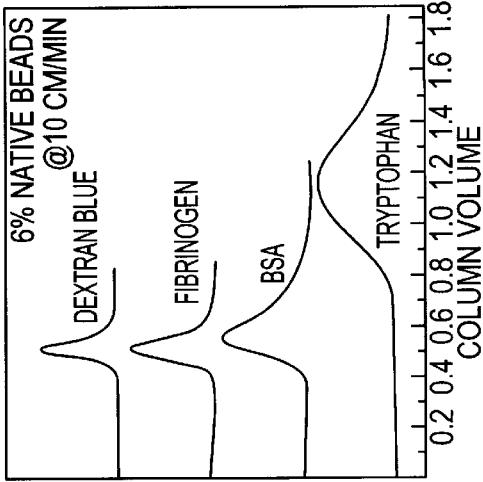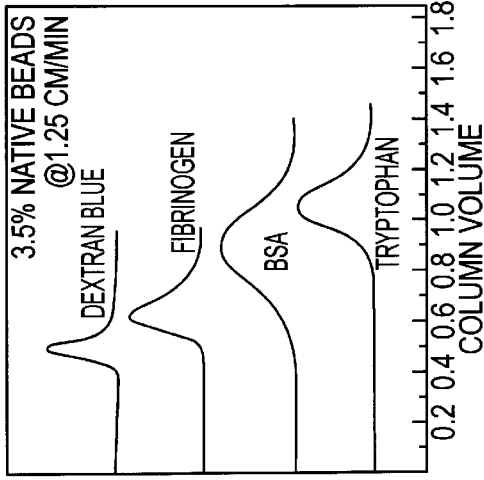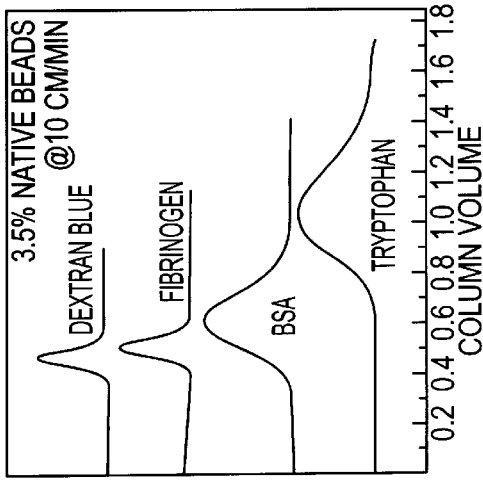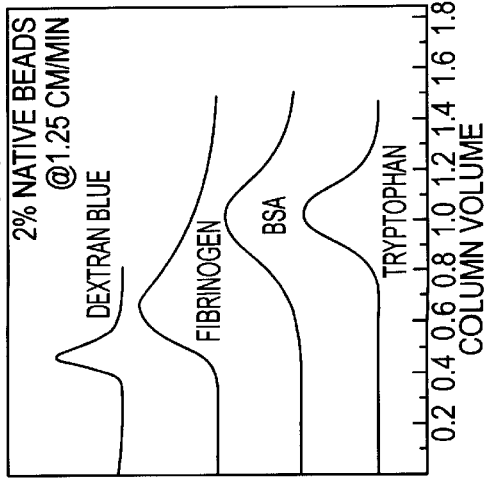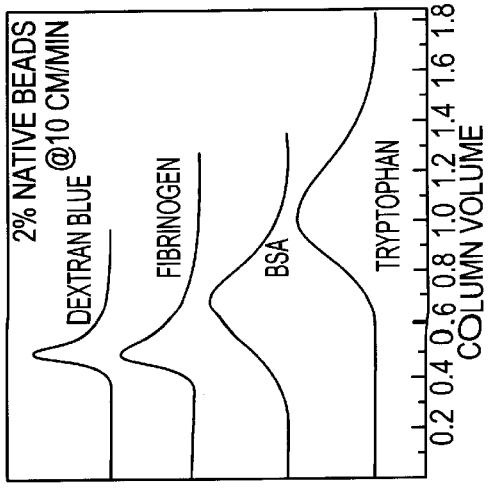

FIG. 13 (A)
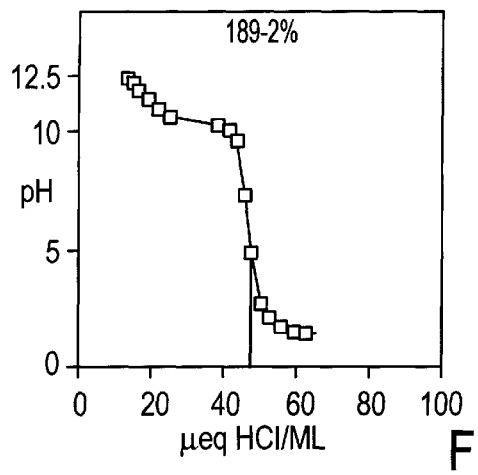
FIG. 13 (B)
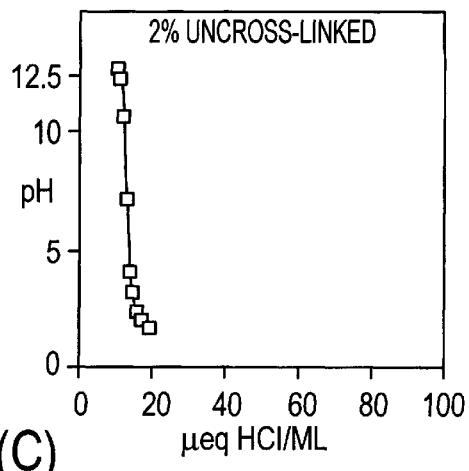
FIG. 13 (C)
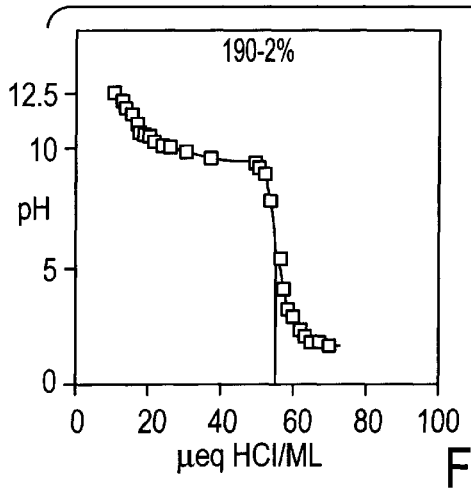
16h @ 42C, 1N NaOH
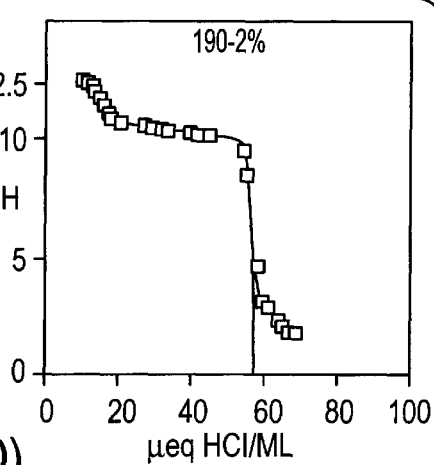
FIG. 13 (D)
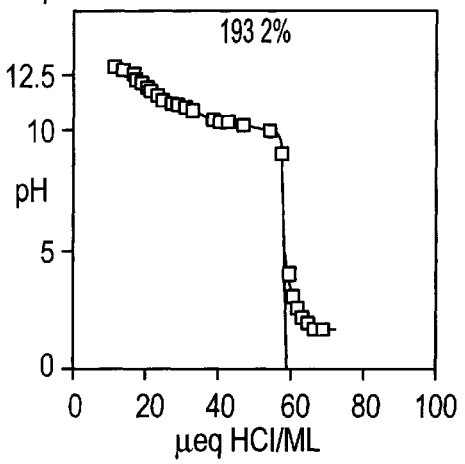
16h @ 42C, 0.5 N NaOH
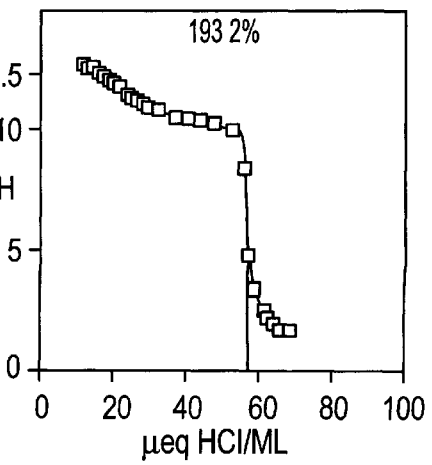

FIG. 15(A)
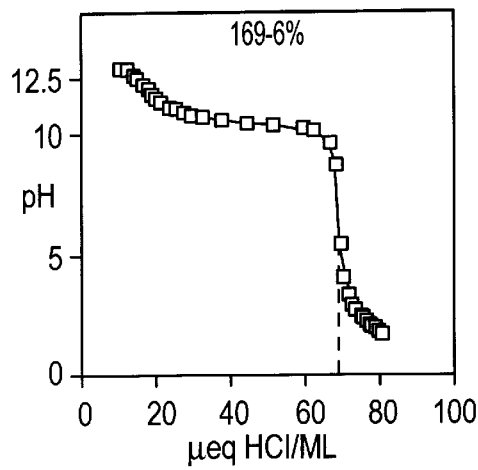
FIG. 15(B)
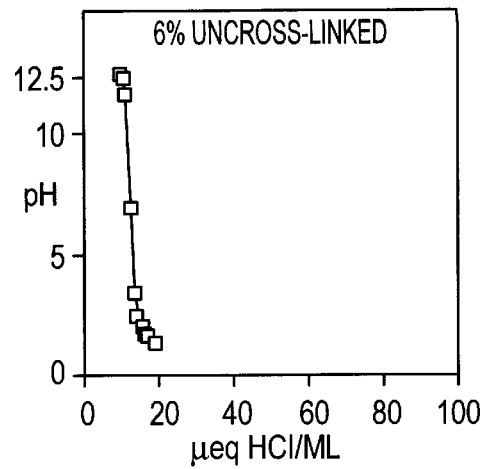
FIG. 15(C)
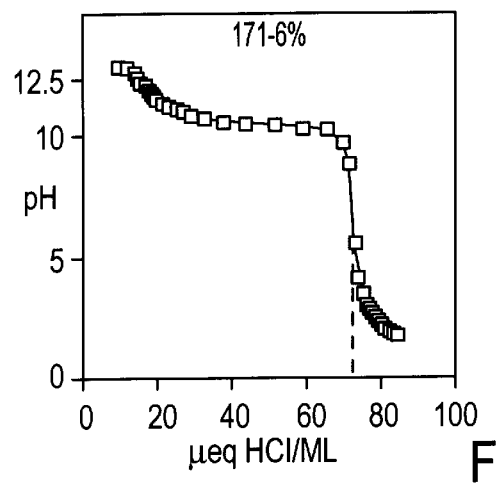
FIG. 15(D)
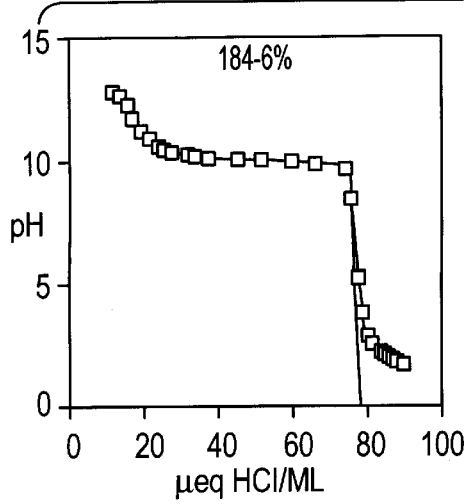
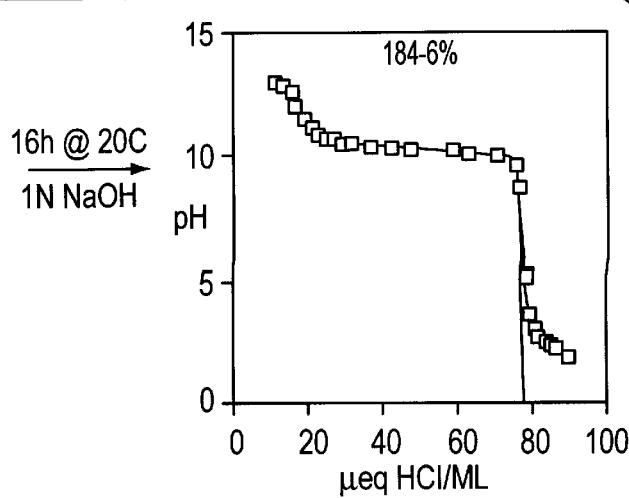

FIG. 16(A)
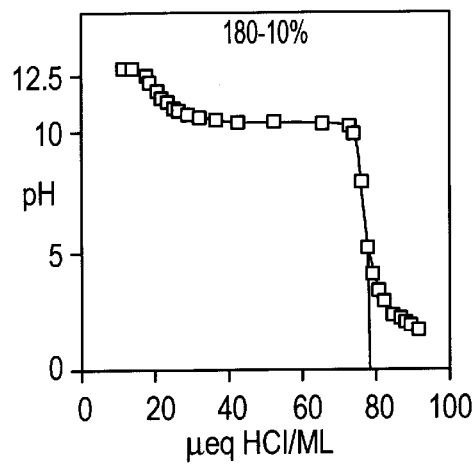
FIG. 16(B)
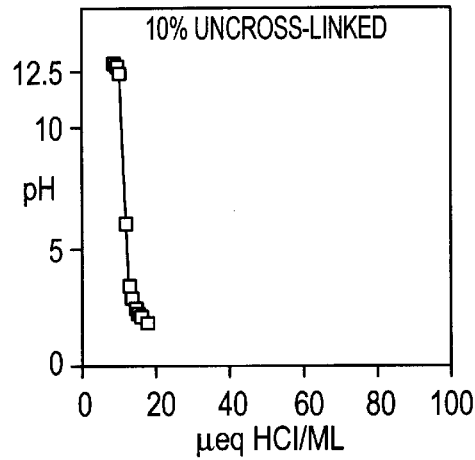
FIG. 16(C)
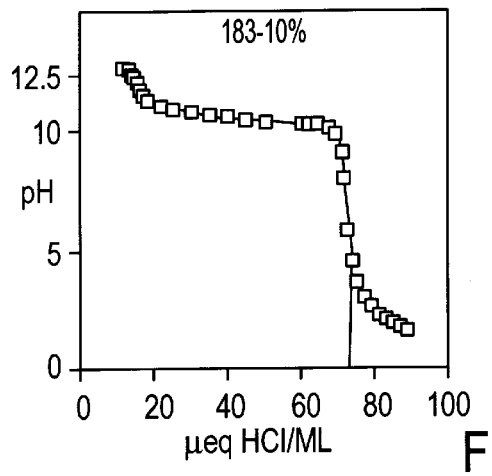
FIG. 16(D)
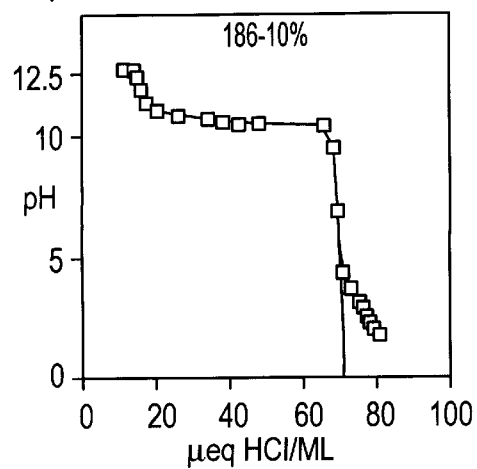 16h @ 20C, 1N NaOH → 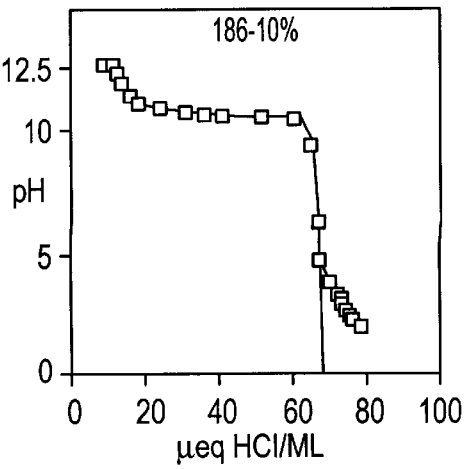

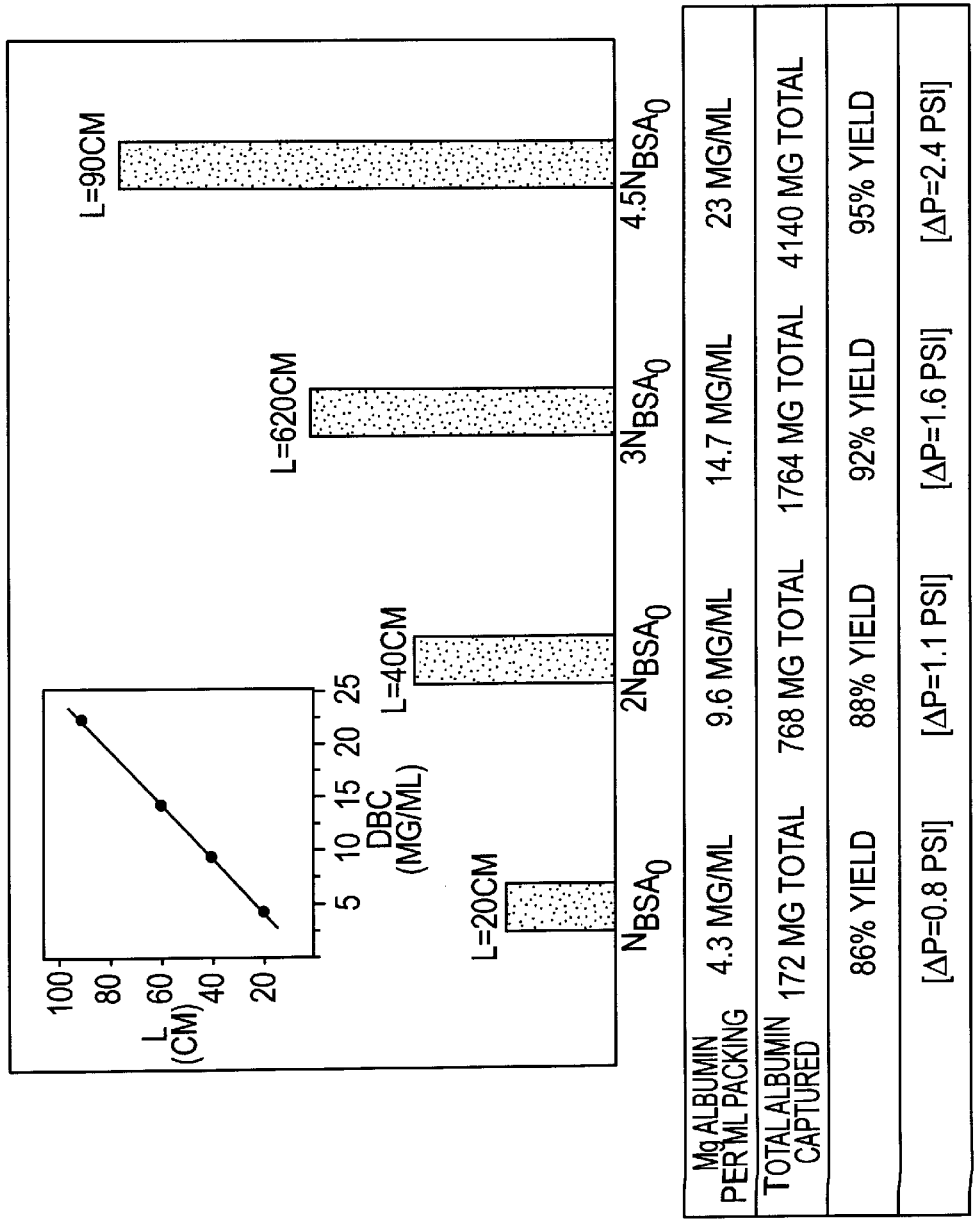

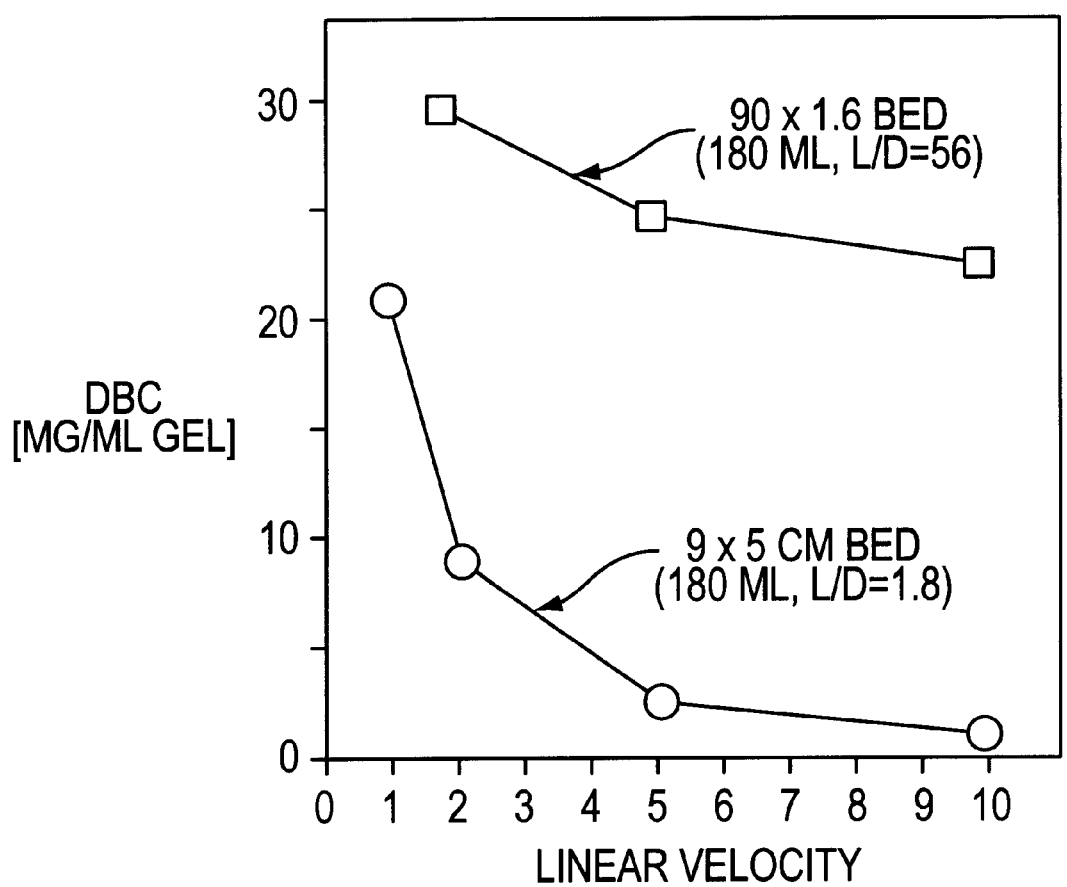

195 Q, BSA
2% CL-Q IN TRIS BUFFER pH 7.5

196 Q, BSA
6% CL-Q IN TRIS BUFFER pH 7.5

195 Q (2%), BSA ISOTHERMS
IN TRIS BUFFER; pH 8.3

196 Q (6%), BSA ISOTHERMS
IN TRIS BUFFER; pH 8.3

195 Q(2%), BSA ISOTERMS
IN TRIS BUFFER WITH SALT; pH 8.6

196 Q (6%), BSA ISOTERMS
IN TRIS BUFFER WITH SALT; pH 8.6

195 Q (2%), BSA ISOTERMS
IN TRIS PHOSPHATE BUFFER; pH 8.6

196 Q(6%), BSA ISOTERMS
IN TRIS PHOSPHATE BUFFER; pH 8.6

192 Q, BSA
10% CL-Q IN TRIS BUFFER pH 7.5

Q SEPHAROSE, WITH BSA
IN TRIS BUFFER pH 7.5

192 Q (10%), BSA ISOTHERMS
IN TRIS BUFFER; pH 8.3

SEPHAROSE Q WITH BSA
IN TRIS BASE BUFFER; pH 8.3

192 Q (10%), BSA ISOTHERMS
IN TRIS BUFFER WITH SALT; pH 8.6

SEPHAROSE Q WITH BSA
IN TRIS BASE WITH SALT; pH 8.6

192 Q (10%), BSA ISOTHERMS
IN TRIS PHOSPHATE BUFFER; pH 8.6

SEPHAROSE Q WITH BSA
IN TRIS PHOSPHATE BUFFER; pH 8.6

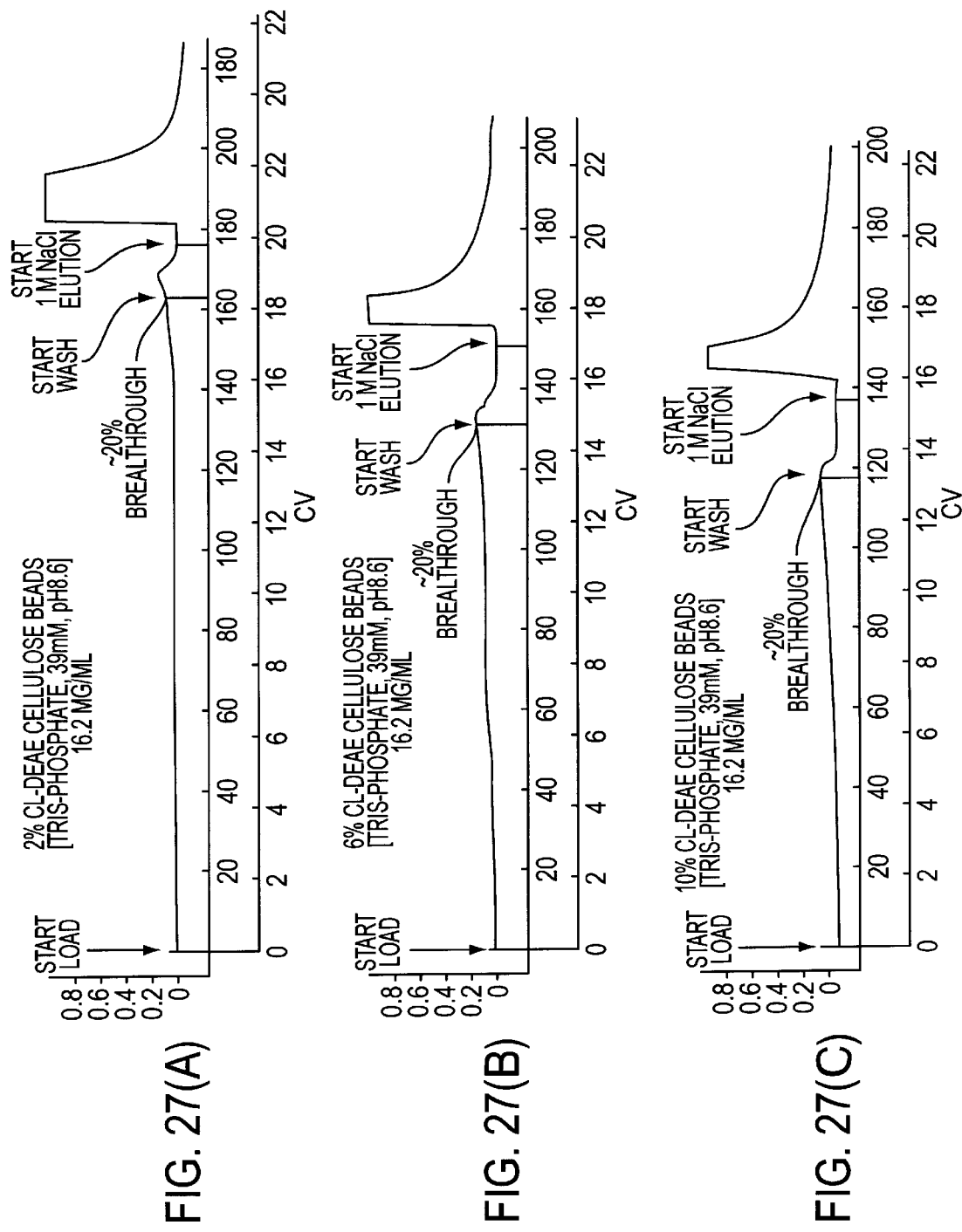

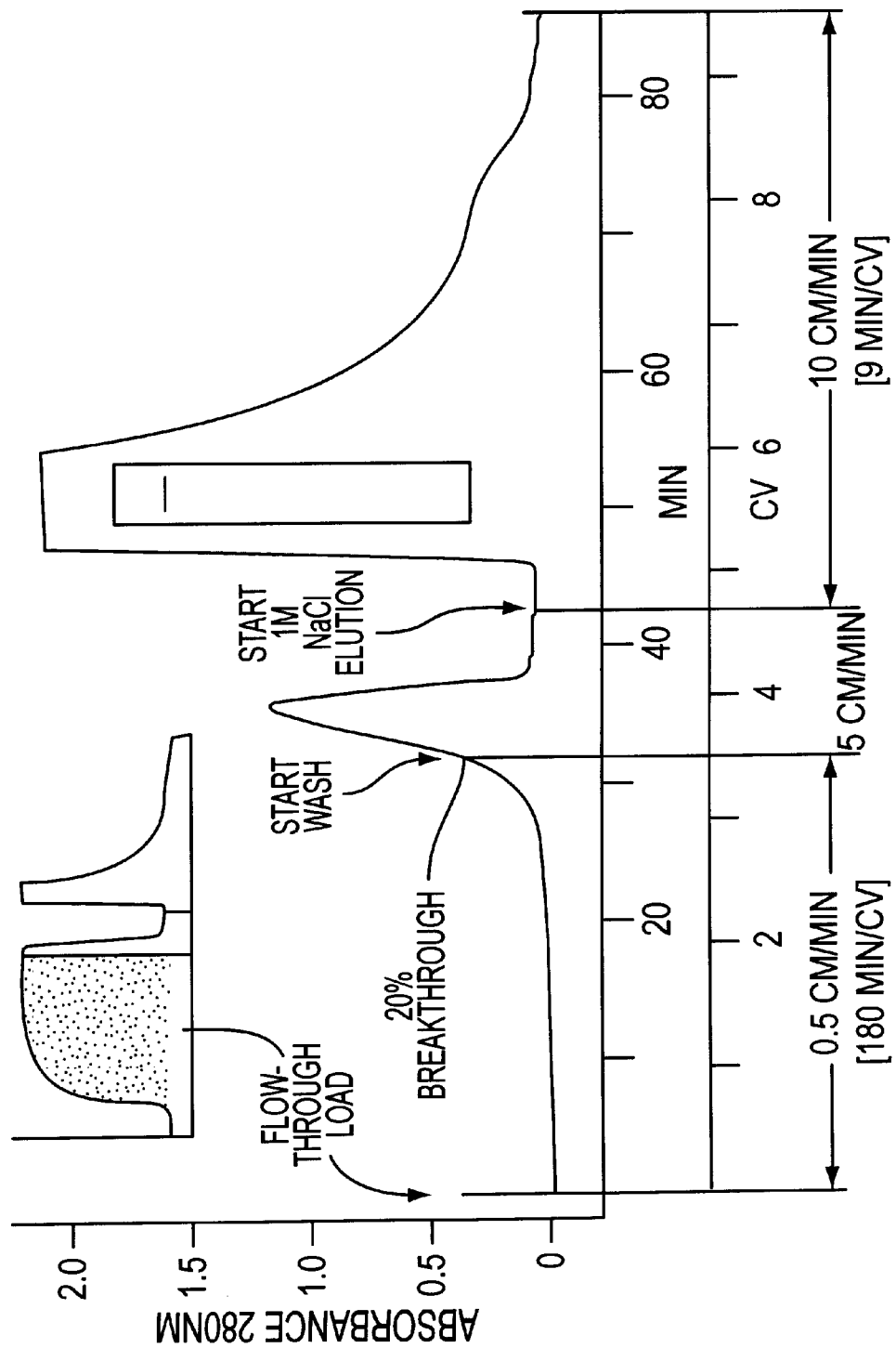

INSIDE-OUT CROSSLINKED AND COMMERCIAL-SCALE HYDROGELS, AND SUB-MACROMOLECULAR SELECTIVE PURIFICATION USING THE HYRDOGELS

FIELD OF THE INVENTION

The present invention relates to chromatographic processes and to ion-exchange and affinity matrices, particularly, to crosslinking of hydrogels made from polymers by inside-out crosslinking and activation methods and to inside-out crosslinked and activated polymeric hydrogels.

The present invention also relates to removal by macromolecular filtration of particles such as viruses and pathogens from virus or pathogen-containing products.

BACKGROUND OF THE INVENTION

Ion-exchange and affinity matrices function based on adsorptive purification processes where the matrix selectively binds a target molecule with greater avidity than other molecules present in the same mixture. Such matrices are used to purify and concentrate proteins and other targets from complex, natural, synthetic, and biosynthetic mixtures. These matrices typically consist of polymeric particles (such as cellulose beads) consisting of a packed bed of particles having void spaces through which liquid can flow. A target molecule solution which is to be purified from solution is passed through the packed bed. Binding sites in the particles constituting the packed bed react with materials to be removed from the complex mixture. Upon passing a washing solution through the column, the eluant leaving the column is a purified target solution. The higher the target binding activity, the higher the purification capacity of the packed bed.

Such ion-exchange and affinity matrices may be constructed from a polymeric hydrogel. A polymeric hydrogel consists of an aqueous part (hence the name "hydro-") and a polymer backbone. Generally, a hydrogel has a low-solids content and is very water-like.

Certain features are peculiar to ion-exchange and affinity matrices, respectively, as set forth below.

When a polymeric hydrogel is to be used as an ion-exchange matrix, the matrix is derivatized to make the matrix ionic. The ionic character of the matrix poses a particular problem, as the matrix tends to dissolve over time and become unusable. Generally, a conventional solution to the dissolution problem has been to crosslink the matrix using conventional crosslinking methods which utilize batch chemistry.

Such conventional methods and matrices suffer from certain disadvantages, discussed further below.

The size (diameter) of the cellulose particles used in constructing the hydrogel influences the properties and performance of the hydrogel. Cellulose particles on the order of 450–600 μm are considered large.

Hydrogels for use on a bench scale (i.e., a small scale) have been available. However, there has been an unsatisfied demand for hydrogels that function on to a larger, commercial scale. For use on such a scale, high through-put is important, that is, the highest possible flow rate for each of the steps in column chromatographic processing when operated at the tallest possible column height (i.e., about 1 m versus 0.1 m). These steps comprise loading (adsorption of target molecules to both surface and intraparticle volume), washing of non-target molecules from the media (matrix), elution of target molecules from the matrix, and cleaning (or regeneration) of the matrix.

Designing large scale adsorption media generally calls into play four considerations, namely, (1) void space pressure driven flow; (2) intraparticle transport; (3) site installation; and (4) media stability.

Void space pressure driven flow refers to the pressure needed to sustain a given flow rate in a packed bed chromatographic column.

Intraparticle transport refers to diffusional and/or convective transport of molecules within the hydrogel particle.

Site installation refers to placing certain pre-ordained structures, so that the sites are not too densely packed and are installed at the desired location within the matrix.

Media stability refers to whether the hydrogel dissolves and/or becomes disintiguous over time, so that it has an acceptable shelf-life or easily deforms under ordinary flow rates used in chromatographic processing.

Traditionally, modifying or designing ion-exchange matrices to be useable on a larger scale than bench-scale, such as for commercial production, has posed difficulties that come from the four aspects mentioned above that often are competing. That is, achieving improved performance on one aspect typically disadvantageously has compromised at least one other aspect. Thus, there is a need for a hydrogel for large-scale use which has satisfactory performance optimized in all four aspects.

The stability problem associated with hydrogels has been addressed by chemical crosslinking, to impart chemical and mechanical robustness and to prevent leaching of polymer backbone into the purified product. However, conventional crosslinking procedures improve stability but at the expense of other aspects of the hydrogel.

Particularly, conventional crosslinking methods are known, whereby, using a crosslinking reagent that generally is a bifunctional molecule, a hydrogel that is "outside-in" crosslinked is produced. In conventional chromatographic hydrogels (e.g. Pharmacia Sepharose Fast-Flow ("FF") crosslinked by the conventional "outside-in" crosslinking procedure, extensive crosslinking occurs near the bead surface before crosslinking occurs in the interior of the bead due to installation by batch chemistry.

Conventional crosslinking molecules (e.g., epichlorhydrin) are insoluble in water, which is the solvent used in the conventional "outside-in" procedure. The conventional water-solvent crosslinking process relies on partitioning the crosslinker into the aqueous phase of the hydrogel, and subsequent reaction with the hydrogel polymer backbone. Such phase partitioning is an inefficient mass transfer operation, and results in little penetration of the crosslinking and/or activating molecule into the interior of the bead prior to the reaction of the cross-linker or activating molecule with the matrix.

As a result, "outside-in" crosslinked hydrogels have a higher degree of crosslinking in the outer strata of the particles, and lower crosslinking in the interior of the particles. Excessive crosslinking at the matrix surface can lessen the accessibility to the interior of the bead, i.e., about 70% of the interior volume becomes inaccessible.

Despite the disadvantages of conventional outside-in crosslinking, abandoning crosslinking is not an acceptable solution, because without crosslinking, the matrix becomes not useable because the matrix dissolves or becomes disintiguous over time (because the polymer becomes soluble when stored or operating in aqueous because the matrix is highly ionic) and/or becomes easily deformed when operated in a chromatographic mode. Shelf-life is an important consideration for ion exchange applications of hydrogels. Hydrogels with shelf-lives on the order of many months or years, rather than weeks as conventional hydrogels provide, are desired.

Conventional designs of chromatographic matrices emphasized small particle sizes, so as to reduce intraparticle diffusional mass transfer resistance.

Small particle diameters correspond to higher pressure drops, with the use of low L/D (i.e., length-to-diameter) columns to achieve throughout, which is a disadvantage. For the small particles of the conventional hydrogels, high crosslinking becomes necessary because the pressure necessarily will be so high that otherwise the chromatographic media would be deformed. Overall, considerably less crosslinking is needed for large particles in order to provide resistance to deformation while operated under high flow rates and/or tall columns. There is a need for methods to make larger particles usable in hydrogels, because, generally, larger crosslinked-cellulose particles may have certain practical advantages relative to small particles, such as (1) very low pressure at very high linear velocities; (2) allowing for a process with partially clarified, partially filtered feeds; (3) high throughput at large-scale capacity; and, (4) robustness to sanitization. All of the above should be able to occur in a tall bed height without significant pressure drop.

The sanitization point noted above becomes important because most matrices typically are re-used.

Between purification cycles, matrices typically are cleaned with an NaOH solution with pH of about 12–13 at 45° C. for about 2 to 3 hours, which are relatively harsh conditions. The cleaning (and other chemical treatments) can affect the stability of a matrix, by the reagents disrupting hydrogen bonding.

Also, the need for making larger particles usable in hydrogels further corresponds to the relative advantages of manufacturing large compared to smaller particles, of allowing for (1) continuous processing; (2) simplified classification at high yields; (3) ease of manufacturing; and (4) simple manufacturing for product diversity (e.g., crosslinked DEAE (diethyl amino-ethane) cellulose particles; crosslinked Q cellulose particles; affinity-ligand cellulose particles). However, in the conventional methods, the resulting large particles are outside-in crosslinked and correspondingly suffer from certain disadvantages such as (1) lack of accessibility of submacromolecular species to the interior volume of particles by diffusional and convective transport mechanisms due to molecular exclusion or sieving effects (of these submacromolecular species, i.e., proteins, peptides, etc.); and (2) lack of appropriate site installation into accessible intraparticle domains. Thus, there is a need to overcome the disadvantages associated with large conventionally-crosslinked cellulose particles, without giving up any of the advantages that such conventional particles may provide.

The high degree of crosslinking in the art for all particles, small and large, has particularly made large particles unsuitable for ion-exchange and affinity applications at large-scale (i.e., 1 m tall or higher operated at 1 cm/min or greater linear velocity).

For example, the high degree of crosslinking in the outer strata of the conventional large-bead hydrogels results in minimal intraparticle penetration of average sized protein molecules (such as albumin, 66 kDa) at typical large scale processing linear velocities of 1 cm per minute. Thus, less adsorptive capacity in proteins is seen in large particles crosslinked with classical outside-in methods as applied to small particles (i.e., there is a lack of adsorptive surface area where large particles are used). With large beads, overall less surface area is provided, therefore the need to use the bead interior is increased.

Accordingly, in view of the competing considerations discussed above and not satisfactorily addressed by conventional crosslinking and conventional outside-in crosslinked hydrogels, a crosslinking procedure is needed that gives the stability advantages of conventional outside-in crosslinking methods without at the same time suffering from the disadvantages associated with conventional outside-in crosslinking.

In attempting to scale-up ion-exchange matrices (i.e., to design the matrices for larger scale use), one approach has been to use dimensionless group analysis. Dimensionless group analysis uses the governing physics to generate normalized processing parameters which are dimensionless but scale the relative importance of different phenomena to the process (i.e. the ratio of spatial diffusion to a site to the spatial adsorption of the target molecule once that molecule reaches the site). See R. D. Whitley, K. E. Van Cott, and N. H. L. Wang, *Ind. End. Chem. Res.* (1993) 32: 149–159. The Whitley paradigm identified the rate limitations in kinetic and mass transfer steps and allowed for rational scale-up of chromatographic processes based on dimensionless ratios of these rates. Whitley et al. (1993) identified the effects of slow sorption kinetics in multi-component systems.

Intraparticle transport and adsorption kinetics are not well characterized or optimized for most commercially available DEAE matrices. Significant intraparticle transport of proteins at processing scale velocities is absent in commercially-available ion exchange matrices. Void-flow convection and/or surface adsorption kinetics has been identified as the rate limiting mass transfer step for many beaded matrices. Thus, the most important dimensionless group for sorptive (i.e., adsorptive) processes is the adsorption number, $N_{+i}$, defined by the ratio of sorption kinetic rates to the convection rate. That is, $$N_{+i} = LC_i k_{+i}/u_o$$

$$N_{-i} = \frac{k_{-i}L}{U_o}$$

where L is the column length; $C_i$ is the concentration of species i; $k_{+i}$ is the adsorption rate coefficient of i; and $u_o$ is the average linear velocity of the fluid in the void space.

Considering the processing variables which affect the N+i expression, it can be seen that column length (L) and linear velocity ($u_o$, which normalizes volumetric processing rates to the column length to bead and column contacting times) are important in scaling up a chromatographic process from the lab bench to production scale.

Benefits of long column lengths have been recognized. Particularly, with long column length, constant pattern behavior (i.e., steady state plug flow) can be approached. Under conditions of constant pattern the highest possible concentration driving force for adsorptive or desorptive processes occurs. In practical terms, that translates into efficient adsorption and higher capacity; sharper concentration fronts; increased eluted product concentration; less elution and wash volumes; and increased productivity when operated in a long column.

Numerical simulations have shown that for $N_{+i} \geq 10$, the system can be considered nearly at equilibrium, according to Whitley et al. Under these conditions, the sorption kinetics are not rate limiting and there will be little product loss due to inefficient adsorption or peak spreading. Thus, efficient chromatographic processes should have high $N_{+i}$ numbers (high ratios of L to $u_o$) for the adsorption step.

It has been shown experimentally that the $N_{+i}$ variable is the key design variable.

Previously, the present inventors have found that a certain phenomenon governs processing goals and that to optimize scale-up, resolution, and product yields, as well as to develop novel matrices for the isolation of "troublesome proteins", chromatographic processes may be tailored to take advantage of "N". Particularly, $N_{+i} \geq 10$ for column loading step $N_{-i} << 10$ for column washing step $N_{-i} \geq 10$ for column elusion step In the above, i represents any given species (molecule) to be adsorbed, with "+" meaning "adsorption", and "−" meaning "desorption".

Putting the adsorption number theory to work has posed difficulties, because hydrogel matrices for anion exchange adsorption chromatography of proteins frequently incorporate small particles (<100 μm mean particle size) that have a short path length for diffusional transport of target proteins. As a result, high pressure drops, low flow rates, and low L/D column dimensions usually accompany this design emphasis. Thus, there is little room to manipulate $N_{\pm i}$ when doing process scale-up (i.e. increasing column length at constant processing velocity so as to increase $N_{\pm i}$). Large diameter particles (~600 μm) engineered to have minimal intraparticle transport limitations provide the flexibility of high L to $u_o$ and thus maximal $N_{+i}$.

A model for optimizing affinity media was demonstrated using large diameter (500–700 μm) cellulose particles with relatively low solids contents (Kaster et al., 1994). That optimization yielded an adsorptive media which provided: (i) low pressure drops at high flow rates in a high L/D column mode operation; and, (ii) rapid transport to adsorption sites.

A high L/D column, coupled with the wide range of flow rates available due to minimal pressure drop, allow the user to manipulate the $N_{+i}$ number to a greater extent than for commercially available matrices, would allow for the design of more efficient and productive chromatographic processes. See Whitley et al. (1993); see also J. A. Kaster, W. Oliveira, W. G. Glasser and W. H. Velander, Optimization of pressure-flow limits, strength, intra-particle transport and dynamic capacity by hydrogel solids content and beads size in cellulose immunosorbents, *J. Chromatography* 79–90 (1993).

Thus, a need remains for further methods to optimize hydrogel matrices for large scale protein purification.

Also, conventional matrices would benefit from methods for enhancing ion exchange performance, including methods for exploiting relative rates of mass transfer and sorption kinetics (sorption number $N_{\pm i}$).

Particularly, there is a need for a method of improving the shelf life and deformability of large crosslinked cellulose particles to be used in ion-exchange matrices, especially to bring the shelf-life to the order of many months or years rather than weeks as is the shelf-life for conventionally crosslinked or uncrosslinked ion exchange cellulose particles.

In the case of affinity applications for cellulose particles, there is a need to improve ligand spacing in the cellulose particles.

In affinity applications, getting to the core of the bead is even more important than in the case of ion-exchange matrices, because of the relative number of sites. Sites must be functional. If sites are installed too close together, they will be dysfunctional.

Thus, to summarize the above, there have been many needs for an improved hydrogel and for improved methods of producing hydrogels, particularly for installation of crosslinking or activation chemistries (used to attach affinity ligands).

Additionally, at the same time, in the context of products containing large macromolecular complexes (i.e. particles larger than about 10 nm hydrodynamic radius) such as viruses and other pathogens (e.g., large viral particles such as HIV, Hepatitis B and C) there has been a need for improved methods for selectively removing such pathogens from feedstreams. Existing methods have suffered from various shortcomings, such as loss of valuable feedstream components having hydrodynamic radii of about 5 nm or less (therapeutic proteins).

SUMMARY OF THE INVENTION

A first object of the present invention is to provide an activated matrix which can accommodate and optimize the spatial installation of affinity ligands while preventing the immobilization of excess ligand in the outer strata of the hydrogel bead.

Another object of the present invention is to provide inside outside crosslinked beads (particles) which can be further activated using classical outside in chemistry methods. This classical method should add surface groups at high density. When these groups are quenched with reagent which results in a nonionic group, the surface becomes inert. The particles thus derivatized can be further derivatized with ionic moieties resulting in ionic binding sites primarily within the interior and not on the exterior surface.

Another object of the present invention is to provide a method whereby reaction occurs to a greater extent in the interior of the hydrogel (relative to the outside) to achieve inside-out crosslinking (IOC) or inside-out activation (IOA).

A further object of the present invention is to provide ion exchange cellulose particles with an extended shelf-life, on the order of months or years, and mechanical rigidity (stability) under conditions of flow.

Another object of the present invention is to provide a method for removing macromolecular species, such as HIV, Hepatitis B and Hepatitis C, from submacromolecular species containing such viruses by allowing such macromolecular particles to pass through unadsorbed.

The above objects are achieved by the present invention as described in detail below.

One embodiment of the present invention is a spatial installation method for a bifunctional reagent that crosslinks and/or activates a polymer matrix, comprising at least the step of (a) inside-outside installing a bifunctional reagent on and within a polymer matrix.

In a further embodiment, the polymer matrix of that method comprises at least one cellulose particle.

In another embodiment of the method, the polymer matrix comprises at least one agarose particle.

In an even further embodiment, the polymer matrix comprises at least one chitosan particle.

A further embodiment provides the polymer matrix which comprises a composite of cellulose, agarose, chitosan, and/or other polymer particles.

In an embodiment of the inventive method, the inside-outside installation step comprises (i) spatially distributing the bifunctional reagent throughout the intraparticle volume of the polymer matrix.

The spatial distributing is by a column loading method in one embodiment.

In another embodiment of the present invention, the spatial distribution of the bifunctional reagent is followed by (ii) reacting the polymer matrix with the bifunctional reagent under conditions and for a time to react one functionality of the bifunctional reagent with the polymer matrix.

A further embodiment of the present invention includes the further step of removing the reagent from the void volume of the polymer matrix prior to the reacting step (ii).

In another embodiment of the invention, the reacting step (ii) is followed by the inside-outside crosslinking step of: (iii) further reacting the matrix so to crosslink the matrix, wherein a higher local concentration of crosslinking occurs in the intra-particle volume relative to the local concentration near the outer surface of the matrix.

In a further embodiment of the inventive method, the reacting step (ii) is followed by the inside-outside ligand attachment step of: (iii*) further reacting the matrix with a ligand or an ionic group so that a higher concentration of ligand or ionic moiety occurs on the intra-particle volume relative to the outer surface of the matrix.

Another embodiment of the invention provides, prior to the crosslinking step (iii) or (iii*), a step of classifying by fluidizing.

In another embodiment, there is provided a method for providing inside-out crosslinking of a polymer bead, comprising the steps of: (a) preloading a column of polymer beads with an organic solvent to give a non-aqueous bead/organic solvent preload; (b) adding a bifunctional reagent dissolved in an organic solvent mixture to the bead/organic solvent preload of step (a), to give a bead/organic solvent/bifunctional reagent mixture; and optionally (c) draining excess mixture from void spaces of the bead/organic solvent/bifunctional reagent mixture of step (b).

Another embodiment of the present invention provides a method of keeping a ligand in a hydrogel polymer matrix interior during crosslinking, comprising adjusting solvent conditions during crosslinking.

Another embodiment of the present invention provides a ligand-solution purification method comprising delivering a ligand-solution to a purification column comprising a plurality of inside-out crosslinked particles having binding capacity distributed with more than 90% of the binding capacity in the particle interior and 10% or less on the exterior surface of the particle.

In an embodiment of the inventive ligand-solution purification method, the ligand is a protein.

The present invention also provides an inside-out crosslinked particle, comprising a particle having binding capacity distributed with more than 90% of the binding capacity in the particle interior and 10% or less on the exterior surface.

Another embodiment of the present invention provides an inside-out crosslinked particle, wherein the particle is selected from the group consisting of cellulose, agarose, chitosan and mixtures of two or more of cellulose, agarose and chitosan.

In a further embodiment of the present invention, the inside-out crosslinked particle has a diameter within the range of about 400–600 $\mu$m.

Another embodiment of the present invention provides a hydrogel comprising a plurality of inside-out crosslinked polymer particles.

In a further embodiment of the present invention, there is provided an ion-exchange matrix comprising a hydrogel comprising a plurality of inside-out crosslinked polymer particles.

The present invention, in an even further embodiment, provides an affinity matrix comprising a hydrogel comprising a plurality of inside-out crosslinked polymer particles.

In another embodiment of the present invention, a method is provided for further derivatizing an inside-out crosslinked hydrogel comprising a polymer backbone, comprising the step of attaching a protein binding ligand to the polymer backbone.

In a further embodiment of the above inventive method for further derivatization, the protein binding ligand is selected from the group consisting of DEAE, a synthetic or phage display derived polypeptide, and synthetic organics from combinatorial libraries, quartenary ethyl amino ethane ("QEAE"), carboxy methyl ("CM"), a reactive dye, and an antibody.

The present invention also provides a hydrogel polymer crosslinking method comprising (a) inside-out crosslinking a hydrogel polymer, followed by (b) outside-in crosslinking the inside-out crosslinked hydrogel polymer of step (a).

The present invention also provides a hydrogel crosslinking method wherein the outside-in crosslinking step (b) reduces the number of adsorption sites on the bead outer edge.

The present invention further provides a crosslinking method, wherein after the outside-in crosslinking step (b), large particles (i.e., large molecules or large molecular assemblies) in a biological feed source undergo no or lessened non-specific adsorption on or near the matrix outer surface.

In one embodiment of the method of the present invention, the large particles are pathogens.

In another embodiment of the method of the present invention, the large particles are virus particles.

The present invention, in another embodiment, provides a method for producing a commercial-scale hydrogel, comprising: (a) inside-out crosslinking of polymer particle; and (b) constructing a hydrogel comprising the inside-out crosslinked particles of step (a).

Also, one embodiment of the present invention is a commercial-scale hydrogel produced according to the inventive method.

In a further embodiment, the present inventors have provided a method for producing a large-scale purification column, comprising: (a) inside-out crosslinking of polymer particles; and (b) constructing a column comprising the inside-out crosslinked particles of step (a).

In another embodiment, the present invention provides a column produced according to the inventive method, wherein the column has a column length of 90 cm or greater.

In a further embodiment, the present invention provides a method of viral reduction of a virus-containing product, comprising applying a crosslinked hydrogel polymer according to the invention.

In a preferred embodiment of the viral reduction method comprises, an amount of HIV, pathogen, Hepatitis C and/or Hepatitis B is removed from the product.

BRIEF DESCRIPTION OF THE FIGURES

FIG. 5(A) depicts high activation density through the support for classical outside-in activation. FIG. 5(B) depicts spatially distributed activation by inside-out activation, according to the present invention.

FIG. 7 graphically depicts transport in 2%, 3.5% and 6% cross-linked-DEAE cellulose beads under nonadsorbing conditions.

FIG. 8 graphically depicts results relating to transport in 2% cellulose beads (600 um), for uncrosssslinked (affinity beads), crosslinked beads, and crosslinked-DEAE beads.

FIG. 9 includes graphs showing data for transport in 2%, 3.5% and 6% "native", underivatized (uncrosslinked) cellulose beads, for a 90×1.6 cm column of native (uncrosslinked) beads of 450–600 $\mu$ diameter.

FIG. 13 shows titrations of DEAE groups on 2% cross-linked-DEAE cellulose beads.

FIG. 15 graphically depicts titrations of DEAE groups on 6% cross-linked-DEAE cellulose beads.

FIG. 16 graphically depicts titrations of DEAE groups on 10% cross-linked-DEAE cellulose beads.

FIG. 19 shows the effect of column length on dynamic binding capacity, namely, by increasing adsorption number to increase DBC.

FIG. 21 shows the effect of column length on the DBC of 3.5% cross-linked-DEAE cellulose beads.

FIG. 27 graphically depicts dynamic binding of serum albumin on cellulose beads under optimal binding conditions operating at a linear velocity of 10 cm/minute and in comparison to Q-sepharose media.

FIG. 28($b$) gives data for cm/minute loading, washing and elution.

DETAILED DESCRIPTION OF THE INVENTION

Polymer Matrices and Particles

Figure 1A:
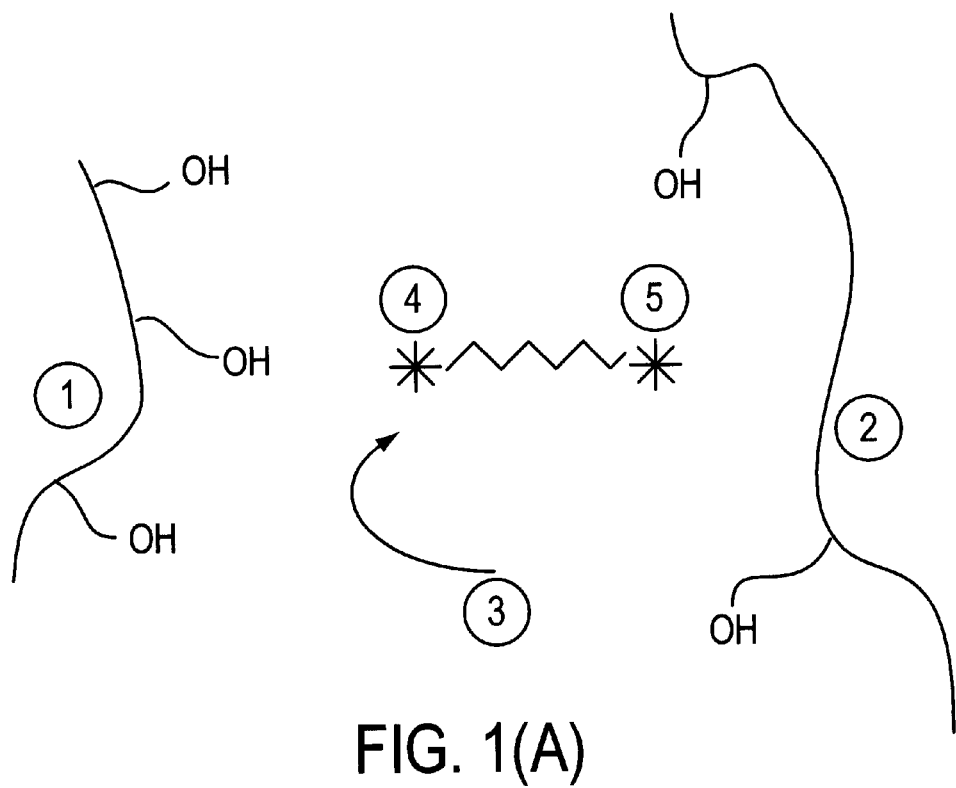
FIG. 1(A) depicts the chemical structure of a matrix with unreacted bifunctional reagent.

The polymer particles (which may be spherical beads or asymmetrical particles) for use in the present invention include polymer particles. Cellulose, agarose, dextran, chitosan and composites of these are polymer matrices or particles which are hydrogels and they are preferred examples. Cellulose is the most preferred example.

Suitable polymers which can be crosslinked include those with polysaccharide linkages, e.g., agarose, dextran, cellulose.

Suitable particle sizes which can be used are 350 microns to 1,000 microns, preferably 500 microns to 1,000 microns. Large particles, that is, on the order of about 400–600 um, are preferred. Large particles provide the advantage of producing less back pressure to flow.

Sizing of polymer particles as is discussed herein is known in the art. Particle size may be determined by placing a sample of particles on a glass depression slide and mounting the slide under the microscope. It is preferable to use a video system with a "sizing scale" on the screen. The effective diameter or hydraulic radius of 20 particles from ten different microscopic fields is measured, from which the average bead diameter and standard deviation are calculated.

Preferably, the particles have a generally spherical shape, but it is not necessary for the particles to be perfectly spherical.

The cellulose particles for use in the present invention include cellulose beads which may be commercially obtained, such as cross-linked-DEAE Cellulose Beads (commercially available from Ligochem) and underivatized polymeric matrices such as those made by Pharmacia (e.g., Sepharose Fast Flow, consisting of spherical crosslinked particles less than about 140 microns, made of agarose), Whatman (cellulose, amorphous crosslinked particles for the most part), Biosepra (small composite polymer material, less than 200 microns in diameter), and Sterogene (a large particle, 1 mm in diameter or greater, made of a polysaccharide).

Polymer Particle Preparation

Cellulose particles also may be prepared according to any known method, such as from a cellulose stock solution made from a cellulose powder.

When preparing cellulose particles from cellulose powder, examples of the cellulose powder include CF11 (Whatman; DP 200) and T679 (Weyerhauser; DP 2000).

In preparing a cellulose stock solution for making cellulose beads, in one method, the cellulose first is activated.

In an example of an activation method, weighed-out cellulose is added to deionized water, followed by covering and letting the cellulose swell and absorb the water (for about 5–10 minutes), followed by vigorously mixing (for about 1–2 hours). For vigorous mixing, a paddle-stirring apparatus (100–200 RPM) may be used. A cellulose suspension is thereby formed. The cellulose suspension is filtered through a 10–20$\mu$ nylon filter in a vacuum funnel and flask until a "dry cake" is formed. The cellulose cake is removed to a beaker, and dimethylacetamide ("DMAC") is added (e.g., 6–8 volumes of DMAC), followed by mixing (with a spatula) until a uniform cellulose suspension is formed and then vigorously mixing for about 30–60 minutes (using a paddle-stirring apparatus, 100–200 RPM).

The filtering, cake removal, suspension formation and mixing may be repeated, one or more times, to obtain a cellulose cake.

In another method for activating the cellulose, weighed-out cellulose is added to DMAC, covered, and the cellulose allowed to swell for about 1–2 weeks. After that, the cellulose suspension is filtered through a 10–20$\mu$ nylon filter in a vacuum funnel and flask until a "dry cake" is formed.

After the cellulose is activated, the cellulose is dissolved. In dissolving the cellulose, a solution of $LiCl_2$ dissolved in DMAC may be used.

In one method, DMAC is poured into a long-necked flask set in a heating mantle. With a paddle-stirring apparatus, the DMAC is vigorously stirred (200–300 RPM). $LiCl_2$ is added to the stirring DMAC. The DMAC/$LiCl_2$ is heated to 80° C. with vigorous stirring. A Thermowatch temperature controller optionally may be used to maintain 80° C. $LiCl_2$ is carefully rinsed from the inside of flask neck using a glass pipette and bulb.

In another method of dissolving the cellulose, a hot (80° C.) DMAC/$LiCl_2$ solution is added to the cellulose cake (in a clean beaker). The hot cellulose solution is stirred with a spatula to give a uniform mixture and then poured into a round-bottom flask containing hot DMAC/$LiCl_2$ solution. Cellulose may be rinsed from the neck of the flask with hot DMAC/$LiCl_2$ solution. The cellulose is stirred (200–300 RPM) at 80° C. for about 2–4 hours. The stirring cellulose solution is covered with foil (around the flask neck which contains the thermometer and stirring paddle) and the mixture is allowed to cool to room temperature for at least 18 hours.

In another method for dissolving cellulose powder, cellulose that was swollen in DMAC for about 1–2 weeks is filtered to a dry cake. The cellulose cake is dissolved, with vigorous stirring, in DMAC containing 8.5% $LiCl_2$ at 80° C. for two hours. The partially dissolved suspension is allowed to completely dissolve by stirring overnight at room temperature (~21° C.).

A stirrer and receiving vessel may be used for washing freshly made beads in distilled water to remove the beading solution.

After the cellulose solution is made, it is beaded. In one method of beading a cellulose solution, an atomizing system is set up by assembling Bete fog nozzle components, including a gasket between the fluid cap and housing, and connecting the "fog nozzle" to the air source and cellulose flow valve (in line with the pressure tank).

The cellulose stock solution may be diluted to give a working solution. The cellulose solution is added to a stainless-steel pressure tank, and the vessel is lock-sealed. The inlet is made of Teflon (trademark of E.I. duPont deNemours & Co.) and is connected to the nitrogen source. The Teflon outlet of the pressure tank/cellulose reservoir is connected to the flow valve (in line with the fog nozzle).

An ethanol/water (50:50 to 80:20 by volume) beading solution is prepared, preferably in an amount about 3 times the volume of cellulose. The beading solution is allowed to de-gas for 5–10 minutes and then poured into the beading tower. A fog nozzle is clamped into place above the beading solution.

After setting up the beading system, the system may be primed. In one priming method, connections in the system (i.e., nitrogen to cellulose tank; cellulose tank to flow valve; flow valve to fog nozzle; fog nozzle to valve to air) are checked and tightened. The clamped fog nozzle is swung over a graduated cylinder to collect the 'priming' fluid. The cellulose tank is pressurized to about 4–10 PSI, and the flow valve is opened to let a stream of cellulose solution flow through the system to remove air and bubbles. The air valve is opened to the fog nozzle and set at 0.3–1.0 PSI.

In one method for beading the cellulose solution, the flowing nozzle is swung back over the ethanol/water beading solution and beads are collected. The beading solution is stirred slowly using a 1–2 inch stirring bar.

The flow of the air and pressure of the tank may be adjusted to get the desired sizes of particles. Preferably, the air pressure is between 0.3–0.5 PSI and the tank (nitrogen) pressure is 5–10 PSI, depending on the concentration (viscosity) of the cellulose solution.

Beading is continued until the cellulose tank is empty, stirring particles for 1–2 hours after beading.

In beading cellulose solutions, nitrogen may be used to pressurize the stainless steel reservoir to force the DRAC/$LiCl_2$ solution through the nozzle assembly from which an aerosol of the cellulose solution is sprayed into the stirring ethanol/water beading solution in a "beading tower" arrangement. Both beads and particles can be made in this way.

After discontinuing the stirring of the bead suspension in the ethanol, the beading solution is allowed to settle for about 3–5 minutes. The ethanol/water (and debris) are decanted off the settled beads.

Beads are poured into a 120 mesh screen pan and rinsed well with de-ionized water, after which the particles begin to become slightly opaque. The rinsed beads then are stored, preferably in about 10 bead volumes of de-ionized water, covered, and stirred vigorously for 18 hours at room temperature.

Polymer Particle Size Sorting

After the cellulose is beaded, the cellulose beads may be sorted by fluidization.

One fluidization method uses a fluidization column, which is made by filling a wash water reservoir with fresh de-ionized water (20 liters) and connecting the appropriate tubing and recycle ports, e.g., Masterflex peristaltic pump with model 7018-52 pump head and tubing #6485-18. Preferably, the top and bottom of the column are fitted with nylon screens (e.g., SpectraMesh 47 mm, 100$\mu$). Wash water is pumped into the inlet (bottom) of the fluidization column at 500 ml/min to remove air from the lines and screen assembly. The column may be filled one-half full and the flow stopped so that the lines and column seals may be checked for leaks, and bolts evenly tightened if necessary. Up to 25% column volume of beads (~750 ml in a 7.5×75 cm column) are then poured into the top of the column, beads are washed from the top 10 cm of the top and the top screen is assembled. The stopper/screen/retainer plate assembly is bolted evenly around the top. The outlet (top) recycle tubing is connected to the "collection net column" and aligned with the recycle funnel-port on the top of the wash water reservoir.

After column assembly, the beads may undergo expanded bed sorting.

In one method for expanded bed sorting that may be used with medium solids beads, 5–6%, using low speed (about 200–300 ml/min), the column is filled with wash water, the flow connections are checked, the flow is stopped and the beads are allowed to settle for 10–15 minutes. After settling, the bead bed heights are measured and the bead bed is expanded at 500 ml/min (11–12 cm/min) with the top port closed and the side port open, with the collection "net column" connected.

After equilibration at 500 ml/min for 30 minutes, the fine beads are collected and removed from the column to avoid back pressures.

The bead bed is expanded to about 55–60 cm by increasing the flow to ~800 ml/min (18 cm/min). During equilibration with side port collection for about 1–2 hours, the rate of small bead and debris accumulation is monitored, watching for pressure build up in the collection net column. Beads are examined by microscopy to gauge the size range being removed at the flow rate. These beads may be ref luidized to achieve more size classification.

To prepare to collect the target beads, the top port is opened and the side port closed. The side port tubing is removed from the collection net column and placed into a bead collection vessel. The side port is opened and beads are allowed to flow into the collection vessel.

The flow rate may be increased to 1800–2000 ml/min (40–45 cm/min). The flow is adjusted through the top "recycle" port until approximately equal flow occurs from the top port (back into the reservoir) and side port (into the bead collection vessel).

After collecting at 1800–2000 ml/min, the flow is stopped the remaining beads (i.e., the retentate) allowed to settle. The height of the retentate bed is measured or estimated (as often as required if it is less than 1 cm).

The wash water is decanted from the collected beads and the beads pooled into a container. A stock sodium azide solution may be added to bring the beads to a concentration of 0.02%. Bead storage preferably is at 4° C.

In another method of fluidizing cellulose beads, deionized water is pumped ascendingly through beds of freshly made beads at rates from about 4–6 cm/min (for low solids beads) to about 25–45 cm/min (for high solids beads). During equilibration, water circulates through the top of the column and carries the small beads into the collection "net" column (above the reservoir in sink). After the bed is expanded to the appropriate degree, the target beads are collected from the side port into the collection vessel. Two distinct layers are noted within the column: the 'target' beads in the bottom and the small beads (50–400$\mu$) expanding into the upper portion of the column from where they will be collected.

It will be understood that the above methods for producing cellulose beads are by way of example, and that the cellulose beads for use in the present invention are not limited.

It further will be appreciated that other polymer particles may be obtained or made for use in the present invention.

Inside-Outside Crosslinking and Bead Preparation

Observation that inside-outside crosslinking has occurred may proceed as follows.

For a bead according to the present invention that is approximately spherical and 500 microns in diameter, the observable halo is about 50 microns from the particle's edge. The part of the particle (bead) which is heavily crosslinked is about the interior volume from the particle center to about the point where the radius is about 200 microns. Correspondingly, about 50% of the interior bead volume is heavily crosslinked and outer 50% is not heavily crosslinked.

As noted above, the term "inside-outside" crosslinking refers to crosslinking in the interior of the polymer matrix or beads as opposed to crosslinking at the surface of the polymer matrix or bead.

Examples of the exchanging column, into which are placed the polymer beads for carrying out the inside-out crosslinking procedure which is the subject of the present invention, are an XK30 column w/plungers (<500 ml) and a heavy-walled Pyrex column (7.5 cm diameter, fitted with 100$\mu$ nylon filters, neoprene stoppers and retainer plates at each end). Other exchanging columns may be used.

The size of the exchanging column may be chosen, depending on batch size. A 5–10% (by volume) headspace is desirable. It is preferable to use a flanged thick-walled pyrex glass cylinder (7.5 cm diameter) ranging in length from 20 cm (~1 l) to 50 cm (~2.5 l), fitted with a butyl rubber screen "assembly" at both ends (bolted together).

The column for use in the present invention includes any column that can accommodate fast flows (e.g., 50 cm/minute or greater in a one-meter column are possible), is compatible with caustic, ethanol and epichlorohydrin, and allows for easy bead removal. As to easy bead removal, preferred configurations include a column with a removable bottom or a column which can be rotated/inverted on the stand (along the clamp axis).

In preparation for crosslinking according to the present invention, the polymer beads are transferred Es into the exchanging column. When the beads are transferred to the exchanging column, preferably head space is left, e.g., 3–5 cm.

After the beads settle in the column, the bed height is measured (and preferably marked on the column).

After measurement of the bed height, the beads optionally are washed before crosslinking.

optionally, a first pre-crosslinking wash may be performed using de-ionized water. An example of the de-ionized water wash is an ascending flow with 3–5 volumes of de-ionized water at 1 column volume/10 min.

The displacement of water from the beads in a column mode by using a dry organic solvent is done before the bifunctional reagent mixture (i.e., a bifunctional reagent (e.g., epichlorohydrin; bis epoxy reagents (e.g., 1,4-butanediol diglycidyl ether); bifunctional oxazoline reagents; bifunctional succinamide based reagents) dissolved in an organic solvent) is introduced to the beads. The bifunctional reagent mixture is introduced preferably in a column mode to the solvent exchanged beads. The reaction of the bifunctional molecule within the beads is done by changing to conditions such as high or low pH, higher temperature, addition of a catalyst or combinations of the above.

The present crosslinking method uses bead bed volumes (bead bed volume being the (measured) volume of a column that has been packed with the particles beads, including the interior void spaces, i.e., the total volume). A preferable reagent for preparing the bead bed volume is epichlorohydrin in ethanol (e.g., 50% epichlorohydrin in 100% ethanol). Epichlorohydrin is virtually insoluble in water but soluble in ethanol.

Preparing more than one bead bed volume is preferable, e.g., two or more bead bed volumes.

After preparing the bead bed volumes, the beads are equilibrated using the bead bed preparation reagent. In a preferred example, 50% epichlorohydrin/ethanol is supplied using ascending flow at 1 column volume per 10 minutes, by pumping. Examples of pumps for use in the present invention include peristaltic pumps (e.g., Masterflex L/S drive peristaltic pump, 10–600 rpm, Cole Parmer, Page 978 in '95/96 catalog); easy load pump heads (used for washing and exchanging beads with solvents and reagents). Examples of tubing for use in the present invention include Viton, Fluran or other chemical resistant tubing #14 (for pumping base) and 16–18 (for washing and exchanging buffers).

After supplying the bead bed preparation reagent (e.g. epichlorohydrin solution), the system is closed off and the beads are allowed to incubate in the bead bed preparation solution, preferably at room temperature for about 30 minutes.

After incubation, interstitial fluid is removed, preferably by reversing the direction of the flow and pumping or drawing air through the column.

After incubation and interstitial fluid removal, the beads are removed to a reaction vessel (e.g., a 3L round bottom flask with top ports).

In the bead removal, preferably a NaOH+0.5% NaBH$_4$ solution is used. In a preferred example, one bead volume of 1 N NaOH+0.5% NaBH$_4$ (5g/l) is used, with a squirt bottle. Optionally, it is preferable to use a heat exchanging device with a thermostat to maintain 25° C.

After bead removal, a bead/NaOH suspension is made. In making the bead/NaOH solution, it is preferable to use 3N NaOH/0.5% NaBH$_4$. In a preferred example, 0.5 column volumes of 3N NaOH/0.5% NaBH$_4$ is prepared in a graduated cylinder and added to the beads.

The bead/NaOH suspension is then stirred. For example, in the reaction vessel containing the removed beads, a paddle-stirring apparatus and pH monitor/controller may be assembled.

An example of the stirrer used for mixing during the various reaction stages in the present invention is a Caframo dual-range stirrer, along with stands and bases (Fisher Sci.).

The pH controller is any pH meter capable of controlling the pumping of NaOH at 10–20 ml/minute at pH 12–13.5, such as a Horizon unit made by New Brunswick and Cole-Palmer.

The bead/NaOH suspension is stirred, keeping the pH above 12.5 until the pH stabilizes at about pH 12.7 to 12.8. In stirring the bead/NaOH suspension, about 100–200 RPM for about 18–24 hours is preferable.

During stirring, the reagent for making the bead/NaOH solution (e.g., 3N NaOH/0.5% NaBH$_4$) is added at a controlled rate, preferably at 10 ml/minute.

To keep the pH above 12.5, it is preferable to continue to add 3N NaOH until the pH "stabilizes" around 12.7 to 12.8 (i.e., no longer decreases), which usually is overnight.

The pH stabilized beads are transferred to the exchanging column and washed. Preferably, washing is with de-ionized water using descending flow, with 3–5 bead bed volumes of de-ionized water at 1 column volume per 10 minutes to remove salts, followed by ethanol washing by descending flow, with 3–5 bead bed volumes of 100% ethanol at 1 column volume per 10 minutes to remove residual epichlorohydrin, followed by de-ionized water washing by ascending flow, with 3–5 bead bed volumes of de-ionized water at 1 column volume per 10 minutes.

After washing and fluid removal, the beads are removed to the reactor vessel. In the removal, it is preferable to use 1 bead volume of 1 N NaOH/0.5% NaBH$_4$ with a squirt bottle.

At this point, the product can be used as an activated matrix. The beads are considered activated at this point where many bifunctional molecules are attached at only one end within the matrix. High temperature attaches the remaining end thus achieving crosslinking.

The beads are stirred (preferably at about 100–200 RPM), and the temperature is slowly raised to 60° C. The initial pH preferably is the range of about 13.0 to 13.4.

Preferably, a Thermowatch temperature controller is used. Advantageously, a paddle-stirring apparatus is used for stirring. A pH monitor preferably is used for monitoring pH.

When the beads have been equilibrated to about 60° C., the pH is adjusted to about pH 13.0, preferably by adding a NaOH/NaBH solution.

Preferably, the NaOH/NaBH solution is added with gentle stirring of the bead suspension at 60° C. for about 18–24 hours. Preferably, 3N NaOH/NaBH$_4$ (~25% bead bed volume) is added once or twice to maintain pH ~13.0 (at setting for 25° C.). The reaction is preferably maintained at pH 13.

After the step at about pH 13.0, the pH is allowed to stabilize to a range of about 12.6 to 12.8. This stabilization preferably occurs overnight, between a second and a third day.

When the pH is stable in the range of about 12.6 to 12.8, the beads are transferred as set forth below.

After pH has stabilized in a range of about 12.7 to 12.8, the beads are washed with water or adjusted to pH<12.

The crosslinked beads may be removed to a storage container.

During the above-described crosslinking reaction, the partitioning of the solvent/crosslinker phase with the external aqueous phase may be observed. The gradual disappearance of the inner solvent/crosslinker phase can be monitored visually during the reaction stage. Fully crosslinked beads have a "halo" appearance, with the highly crosslinked interior of the hydrogel bead differentiated from the sparse outer strata, where the halo extends to about 10–30% from the outer bead diameter inward. That is, for a bead (particle) of about 500 microns in diameter, about the outer 50 microns of the radial dimension constitutes the halo and is lightly crosslinked.

The sparse outer strata of the inside-out crosslinked (IOC) hydrogel has a greater visco-elastic fluid-like property than does the dense more highly crosslinked interior. By environmental electron microscopy, the lack of purely elastic solid structure in the outer strata of the low-solids hydrogels according to the above inventive method is confirmed.

For storing the crosslinked beads, a sodium azide stock solution preferably may be added, to a final concentration of 0.02% sodium azide.

Crosslinked or activated particles prepared according to the above method may be used in a hydrogel in an ion-exchange matrix or an affinity application.

Schematic Representation of Crosslinking/Activated Polymer Matrix or Beads

As shown in FIG. 1(A), in the starting state, the matrix includes polymer backbone 1 and adjacent polymer backbone 2. In a first step, bifunctional reagent (molecule) 3 having functionalities 4 and 5 is spatially distributed throughout the intraparticle volume, preferably by column loading methods.

Figure 1B:
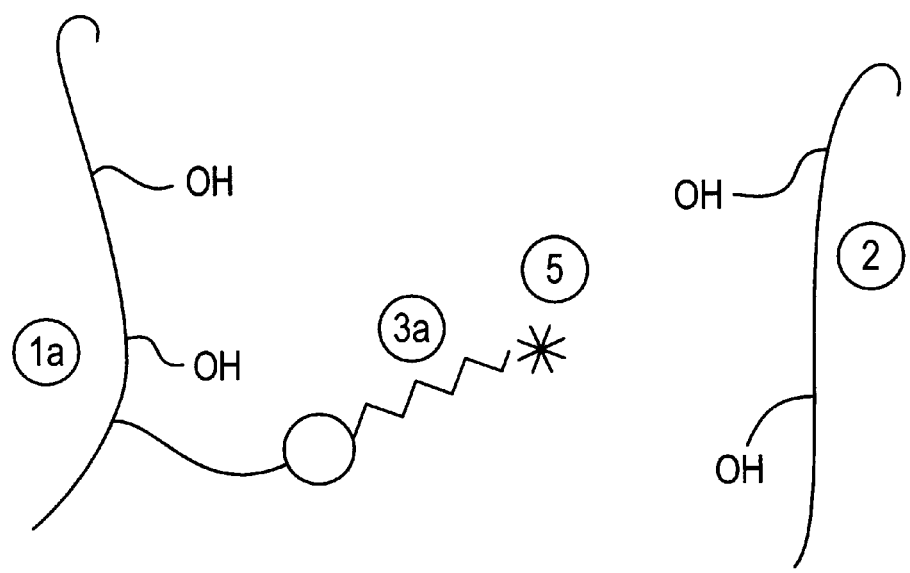
FIG. 1(B) depicts the chemical structure of a matrix reacted with one functionality of the bifunctional reagent.

As shown in FIG. 1(B), the matrix in a second step, is reacted with a bifunctional molecule 3 (so that the reacted polymer backbone 1a includes the reacted bifunctional reagent 3a) under conditions and timeframe which tend to react one of the functionalities of the bifunctional reagent with the polymer of the matrix while leaving the other functionality 5 unreacted. Preferably, the matrix is activated (reacted) so that the highest concentration of reaction occurs at the center relative to the exterior edge of the particle.

Figure 1C:
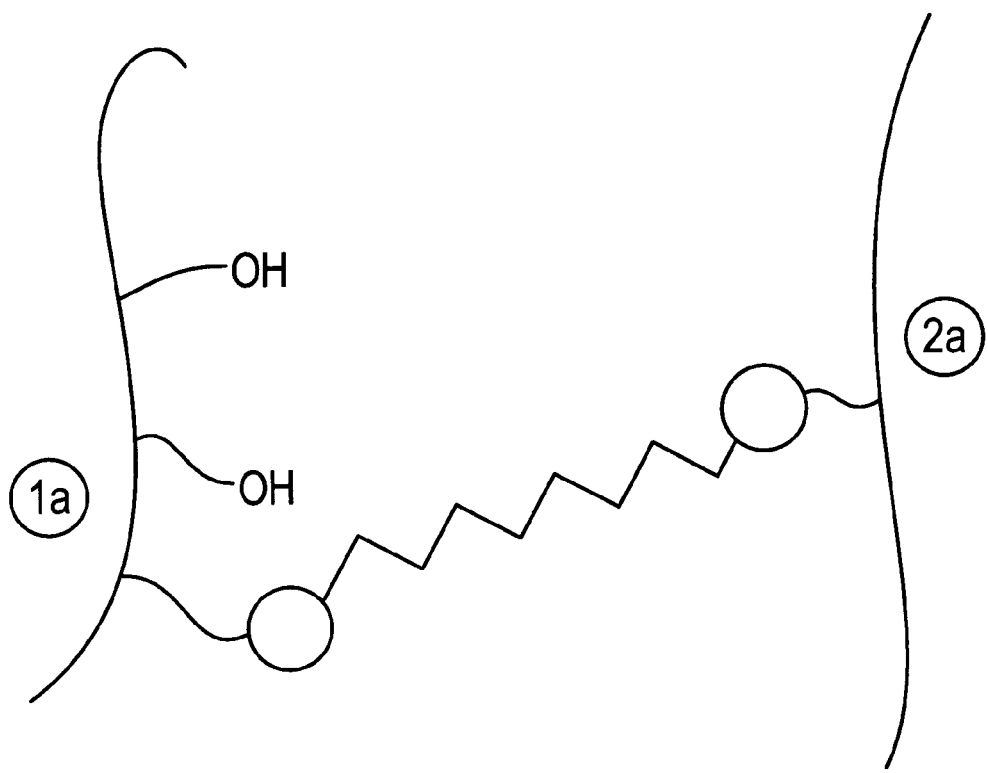
FIG. 1(C) depicts the chemical structure of a crosslinked matrix crosslinked by the completely reacted bifunctional reagent.

As shown in FIG. 1(C), next, in a third step, the matrix which is primarily activated/reacted with only one functionality of the bifunctional reagent is further reacted to crosslink the matrix so that more (i.e., a higher concentration of) crosslinking occurs between two polymeric backbones (1a and 2a) on the intra-particle volume than on the outer surface.

In an alternative third step, the matrix which is activated/reacted with only one of the functionalities of the bifunctional reagent is further reacted with a ligand or ionic group so that a higher concentration of ligand or ionic moiety occurs on the intraparticle volume than at the outer particle surface.

Additionally, inside-out crosslinked beads according to the present invention may be used in a chromatography station. Preferably, the station consists of long columns (85–95 cm, L/D>50) for cellulose beads, and short columns for Sepharose Fast Flow and Whatman DE-52 beads. Also included in the station are a peristaltic pump with linear velocities of 0.5 to 60 cm/min, a UV detector with a 'fast flow' cell and a computer-interfaced data acquisition hardware and software system.

In another aspect of the invention, a polymer support (preferably a cellulose support) is activated by inside-out crosslinking before ligand attachment.

An example of a support to be activated is a 3.5 wt. % cellulose support.

A preferable example of inside-out activation of a support which is to be used in an affinity application is epoxy-activating the support using the above-outlined inside-out crosslinking method, using epichlorohydrin.

As an example of the beads for use in such a support to be inside-out activated are beads with an average bead diameter of 500 to 600 µm.

Inside-out crosslinked beads prepared according to the invention may be used with ligands such as a monoclonal antibody (e.g., a monoclonal antibody which binds protein C) or a synthetic ligand (e.g., a synthetic ligand which consists of a synthetic peptide which is less than 3500 molecular weight and that binds IgG).

The ligand coupling techniques for use with the inside-out crosslinked beads are not particularly limited. Various affinity ligand coupling techniques in the preparation and the subsequent performance of an inside out ligand attachment (IOLA) based immunosorbent were evaluated.

As an example, a monoclonal antibody (12A8 Mab) directed against recombinant human protein C (rhPC) was used. The cellulose support was epoxy-activated using the above Inside-Out Ligand Attachment technique prior to MAb immobilization as set forth in Example 1.

EXAMPLE 1

A 3.5 wt. % cellulose support was epoxy-activated using the IOLA method using epichlorohydrin. The average bead diameter was 500 to 600 µm. The affinity ligand immobilization methods used were as follows: (1) ligand coupling at constant pH 9.5 using 0.1 M sodium carbonate/0.1 M sodium chloride at 4° C. overnight (classical one-step method); (2) ligand coupling at pH 5.0 for 1 hour in the presence of 0.5 M tris, then adjusted to pH 9.5 and the coupling allowed to proceed overnight at 4° C. (two-step method with nucleophilic competitor); (3) ligand coupling at pH 6.0 for 1 hour, then adjusted to pH 9.5 and the coupling reaction allowed to proceed overnight (conventional two-step method); (4) the cyano-transfer technique (classical one-step method of Kohn et al. (1984); see Kaster et al, J. Chrom, supra.) The column bed volume was 1.0 ml for each case. Under batch-loading conditions, rhPC (1.0 mg/ml) in TBS buffer was batch-equilibrated at 4° C. for 24 hours. Under dynamic-loading conditions, each column was loaded to 200–300% of its maximum theoretical rhPC binding capacity. The bound rhPC was eluted with 2.0 M NaSCN, and rhPC was determined by ELISA.

COMPARATIVE EXAMPLES 1(a), (b), (c)

Figure 2:
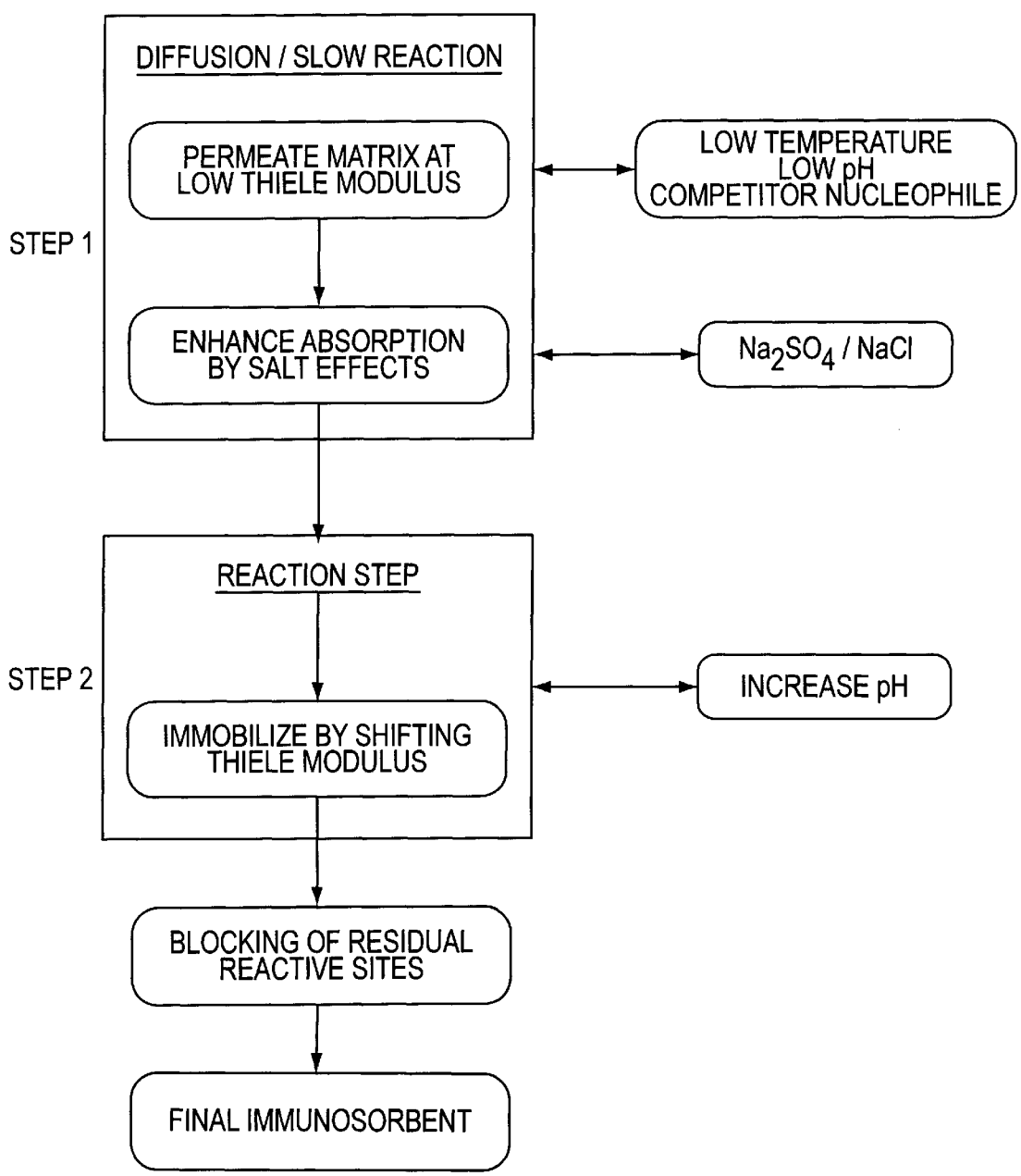
FIG. 2 is a flow-chart depicting a two-step method of ligand installation.
Figure 3B:
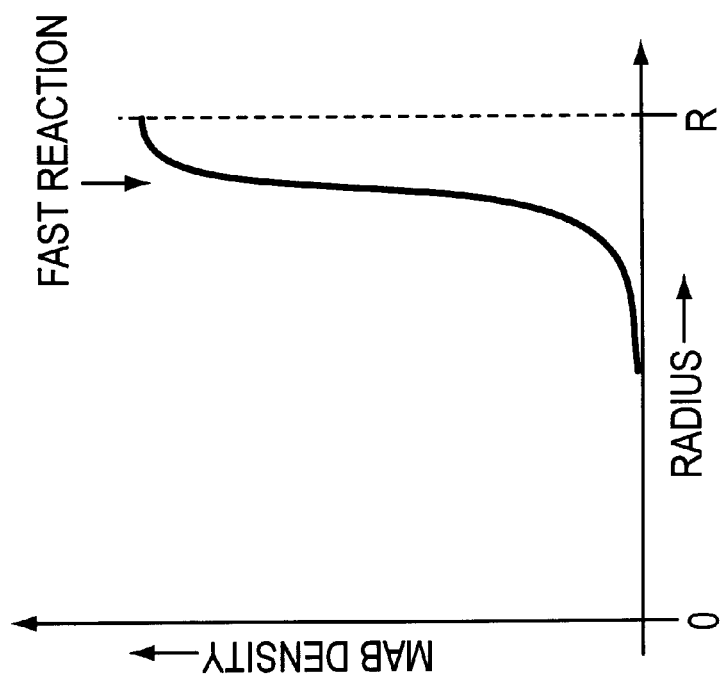
FIG. 3(B) graphically depicts classical high density immobilization within the intraparticle volume.
Figure 3A:
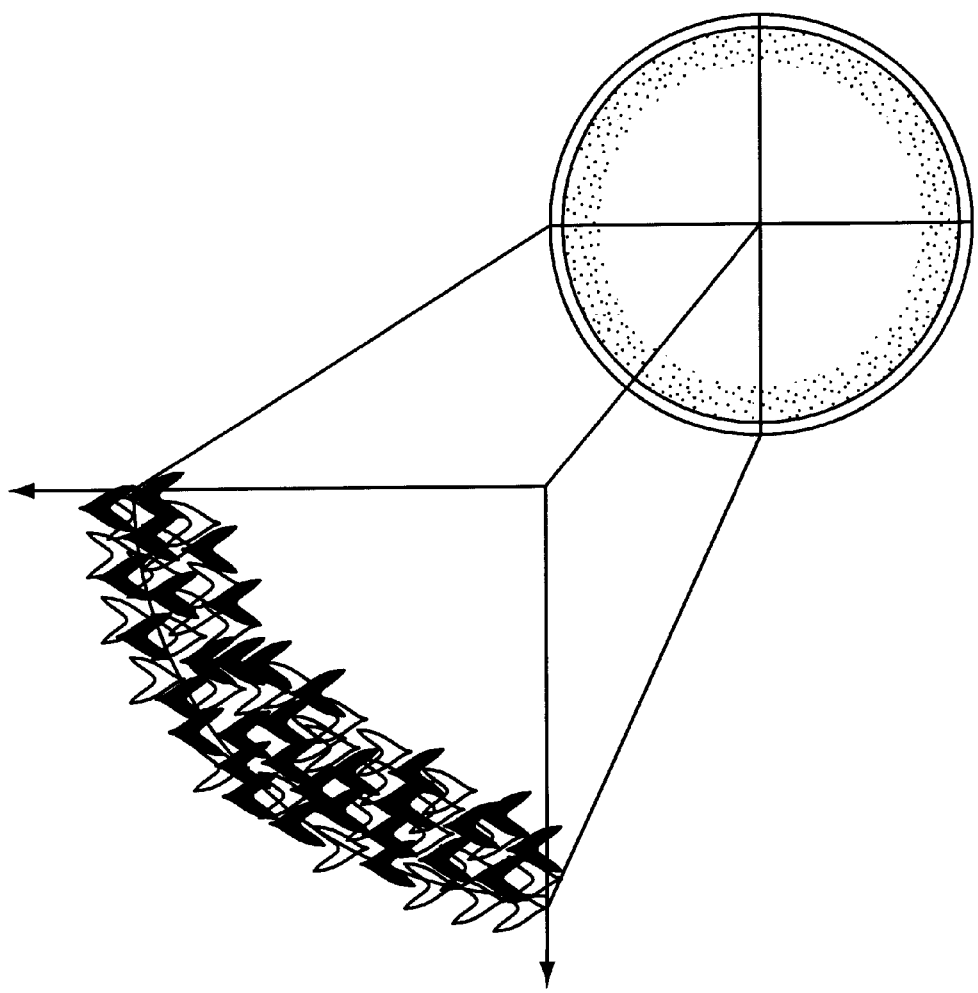
FIG. 3(A) shows permeation of antibody in the case of classical high density immobilization.
Figure 4B:
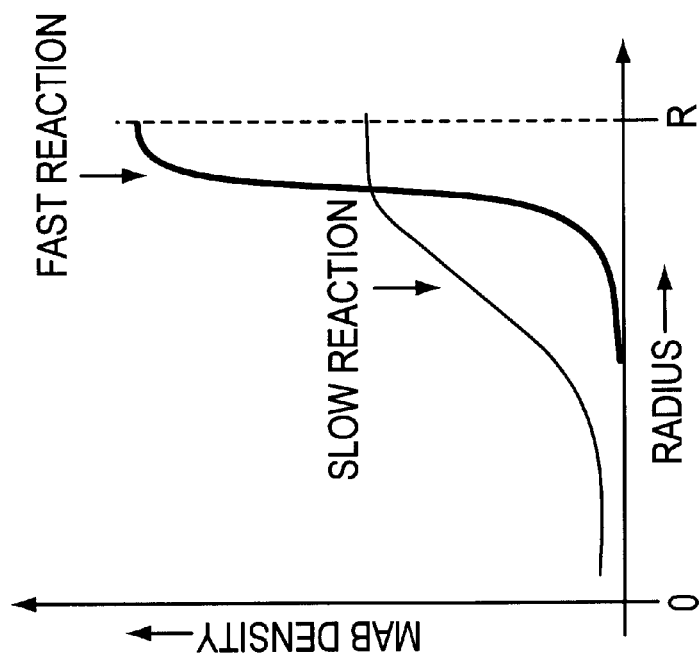
FIG. 4(B) depicts such immobilization graphically.
Figure 4A:
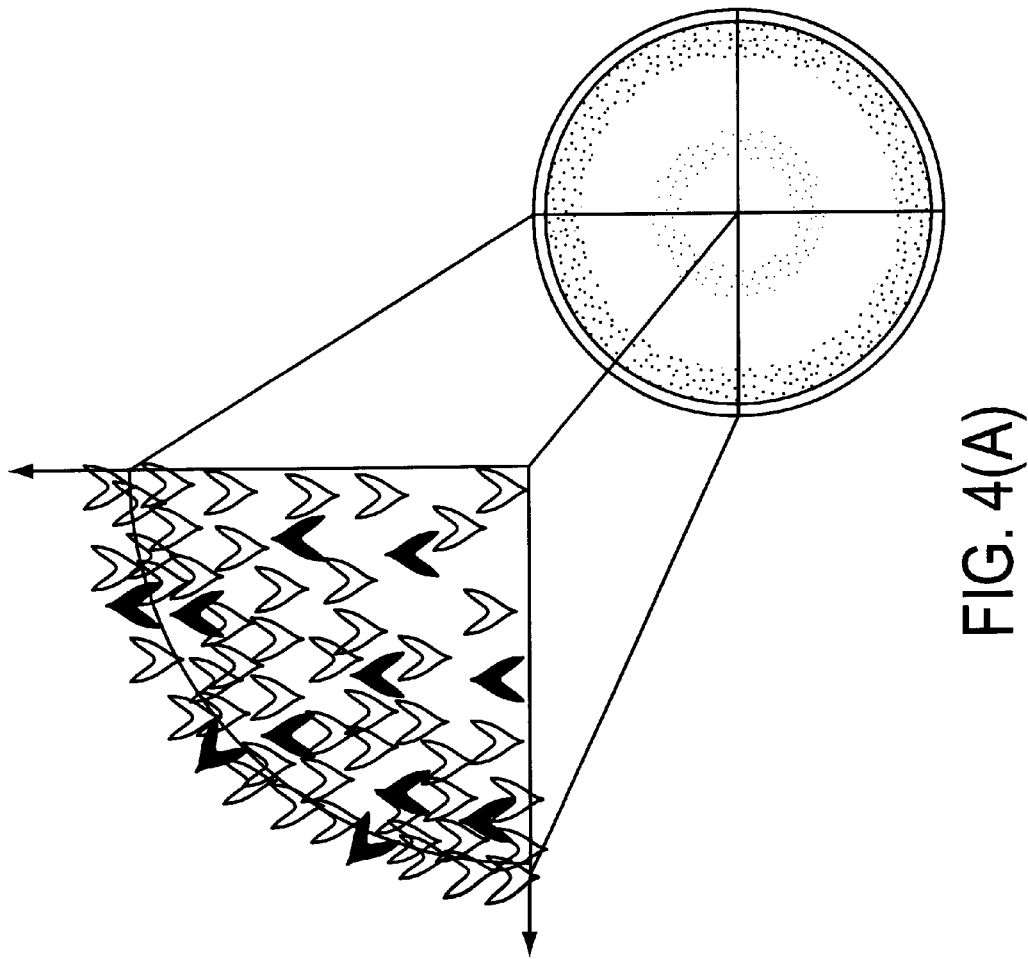
FIG. 4(A) shows two-step immobilization at high Mab density.

As comparisons to Example 1, the affinity ligand immobilization chemistries evaluated included novel two-step immobilization methods, classical one-step immobilization methods, and the classical cyano-transfer technique of Kohn et al. (1984). As to the two-step method, see the flow chart shown in FIG. 2. This two-step method is concerned with the delivery of ligand to a relatively uniform distribution of an excess of activated sites (FIGS. 2, 3(a) and 3(b), 4(a) and 4(b)) by altering reaction rates during ligand diffusion into the matrix. This contrasts the alternative strategy of installing activated sites in a gradient from low concentration at the (surface) edge to high concentration within the deep interior of the support. (FIGS. 5(A) and (B)). The two-step installation can be more optimally achieved when done in combination with an inside-outside activated matrix. The inside-outside method enables one-step classical ligand installation to more effectively install ligand in an active, immobilized state, due to moderated local ligand density.

The reference methods are set forth in G. A. Baumbach and D. J. Hammond, Protein Purification using Ligands Deduced from Peptide Libraries, *BioPharm* (1992) 24–35; E. Boschetti, Review: Advanced Sorbents for Preparative Protein Separation Purposes, *J. Chromatgr.* 658 (1994) 207–236; P. L. Coleman, M. M. Walker, D. S. Milbrath, D. M. Stauffer, J. K. Rasmussen, L. R. Krepski, and S. M. Heilman, Immobilization of Protein A at High Density on Azlactone-Functional Polymeric Beads and Their Use in Affinity Chromatography, *J. Chromatogr.* 512 (1990) 345–363; A. Denizili, A. Y. Rad, E. Piskin, Protein A Immobilized Polyhydroxyethyl-methacrylate Beads.

The % rhPC binding activity of these immunosorbents produced on IOA cellulose beads using either classical one-step or two-step methods of delivering ligand to the bead interior was evaluated under dynamic and batch loading conditions. Ordinary one-step delivery of ligands to classical outside-in activated cellulose beads is also given.

The results for Example 1 and Comparative Examples 1(a), (b) and (c) were as follows.

The combined use of both the inside-outside ligand attachment (IOLA) epoxy-activation with either two-step or one-step affinity ligand delivery methods provides lower local (spatial) ligand density while concomitantly affording a satisfactory ligand coupling (immobilization) yield. The results of this study are presented in Table 1, below. A 100% coupling yield was obtained with the classical one-step immobilization using the cyano-transfer technique. This immunosorbent had a density of 10.0 mg mAb/mL support, and an activity of only 0.6% under dynamic-loading conditions. A 31% coupling yield was obtained using the classical one-step method giving a support having a density of 4.8 mg mAb/mL support. The activity for this column under batch-loading conditions was 61%. Similarly, the activity for this immunosorbent under dynamic-loading condition was 50% and 45% for two consecutive chromatographic runs under identical operating conditions. A 50% coupling yield was obtained using the two-step method with the presence of tris as a nucleophilic competitor. This immunosorbent had a density of 7.7 mg Mab/ml support, an activity of 35% under batch-loading conditions, and activities of 38% and 42% under identical dynamic-loading conditions. An 80% coupling yield was obtained using the two-step method without tris present as a nucleophilic competitor. This immunosorbent had a density of 12.4 mg Mab/ml support, and an activity of 26% under batch-loading conditions, and activities of 25% and 30% under identical dynamic-loading conditions.

Inside-out activation according to the invention prespaces the epoxy sites onto the cellulose support to which affinity ligands then can be attached covalently at lower local density. Therefore, the IOLA method should produce a more highly active affinity matrix with either classical one-step or two-step immobilization strategies. The classical one-step immobilization method yielded a lower local Mab density (4.8 mg mAb/mL support) compared to the conventional two-step method (12.4 mg mAb/mL support). However, the classical one-step method provided a higher binding activity under both batch and dynamic-loading conditions compared to the conventional two-step coupling method due to lower local spatial density of immobilized mAb. The lower local spatial density of immobilized mAb decreased stearic hindrance effects, thereby increasing the accessibility of immobilized mAb for the target antigen, rhPC. The presence of tris serving as a nucleophilic competitor in the two-step method gave a lower density (7.7 mg mAb/mL support) compared to the conventional two-step method (12.4 mg mAb/mL support) while providing higher activity under both batch and dynamic-loading conditions. The similarity in binding activity of each of these immunosorbents under both batch and dynamic-loading conditions indicate that there are no mass-transfer limitations involved in the adsorption/desorption kinetics. The immunosorbent prepared using the cyano-transfer technique gave a support with a density of 10.0 mg mAb/mL support, however the binding activity was minimal compared to the classical one-step and both of the two-step methods. The difference in coupling yield between the one-step and two-step methods on IOA-activated matrices likely is due to the cellulose cross-linking which competes with the affinity ligand coupling reaction. The differences in activity likely are due to the accessibility of the high mAb density within the central interior region of the bead.

These results demonstrate the superiority of an IOLA-based support in which the activated epoxy ligand is immobilized from the inside-out of the support where the majority of the epoxy sites are distributed uniformly throughout the matrix interior, compared to an outside-in or predominantly surface installation. The installation of epoxy sites via the IOLA strategy allows an increased uniform affinity ligand density, therefore an opportunity for increased immunosorbent activity. A single one-step ligand delivery can be used because the activation chemistry is already spatially distributed.

Figure 5B:
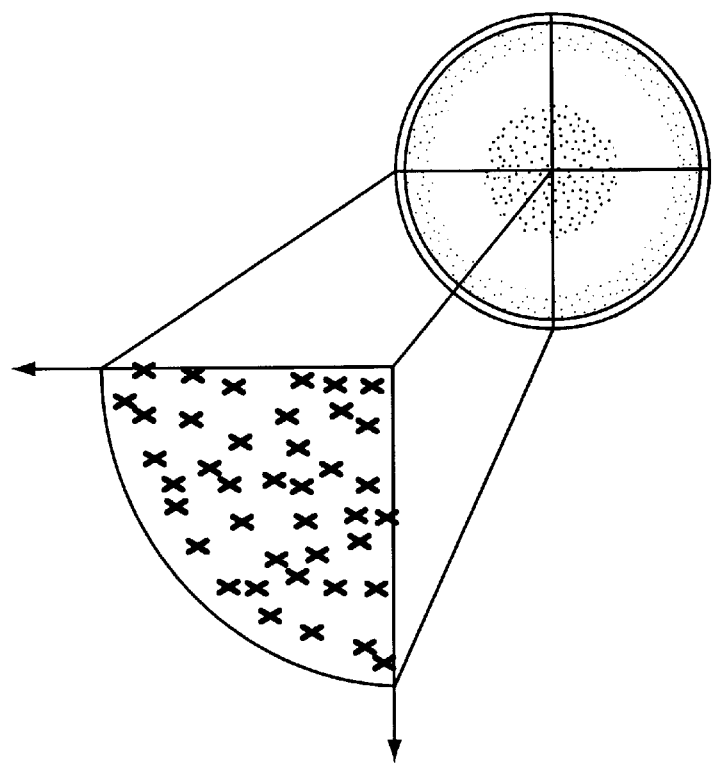
FIGS. 5(A) and 5(B) are exploded views depicting spatial distribution of activation.
Figure 5A:
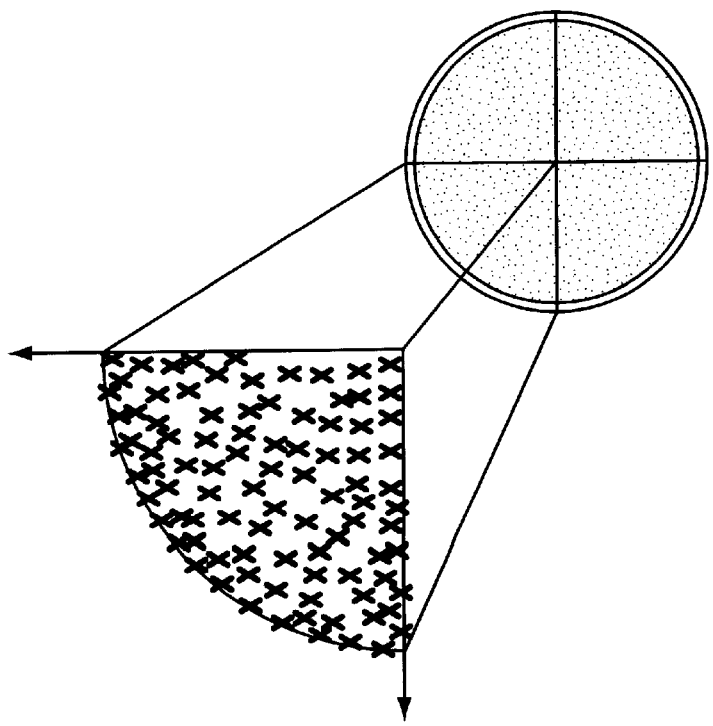

Inside-out activation according to the present invention (achieving spatially distributed activation) compared to classical outside-in activation (giving high activation throughout the support) is shown in FIGS. 5(a) (prior art) and 5(b) (present invention).

TABLE 1

Analysis of 12A8 mAb immunosorbent binding efficiency under rhPC dynamic and batch loading conditions.

| 12A8 MAb immobilization method | % coupling yield | 12A8 MAb density (mg/ml support) | % activity (batch loading) | % activity (dynamic loading) |
|---|---|---|---|---|
| classical 1-step*: pH 9.5 using 0.1 M Na$_2$CO$_3$/0.1 M NaCl at 4° C. overnight | 31% | 4.8 | 61% | 50% 45% |
| 2-step*: pH 5.0 with 0.5 M Tris for 1 hour at 4°, then adjusted to pH 9.5, overnight incubation at 4° C. | 50% | 7.7 | 35% | 38%–42% |
| 2-step* pH 6.0 for 1 hour at 4°, then adjusted to pH 9.5, overnight incubation at 4° C. | 81% | 12.4 | 26% | 25% 30% |
| classical 1-step[+]: cyano-transfer technique of Kohn et al. (1984) | 100% | 10.0 | — | 0.6% 0.6% |

(Notes: *3.5 wt % cellulose support activated by IOA method using 50% (v/v) epichlorohydrin/ethanol, [+]cellulose support activated using classical batch method.)

In a further embodiment of the present invention, inside-out crosslinked beads according to the invention may be derivatized.

In one derivatization method, crosslinked cellulose beads are derivatized using 3 M DEAE as follows.

A DEAE solution is added to the water washed beads, to form a bead/DEAE suspension. DEAE is added (preferably one bead volume of 3M DEAE with mixing). The DEAE solution for derivatizing the beads preferably is 3M DEAE filtered through a 5.0μ membrane cartridge filter. Preferably, the 3 M DEAE is added to the beads, pouring slowly with mixing, washing the bead off of the side of the flask with the DEAE solution.

The bead/DEAE suspension is stirred at for about 1 to 30 minutes at room temperature (~20–23° C.). Preferably, the stirring is slow (about 50–100 RPM) for 30 minutes at room temperature (~23° C.).

NaOH is added to the bead/DEAE suspension. Preferably, NaOH addition occurs while stirring is increased to 250–300 RPM. In a preferred example, using a peristaltic pump (Masterflex, tubing #14), 3 bead volumes of 3N NaOH @ ~1 ml/min/100 ml beads (e.g. 10 ml/minute for 1000 ml beads) is slowly added. Preferably, the reactor port is covered with aluminum foil. Preferably, stirring is continued for about 16–18 hours at room temperature.

On a second day of derivatization, after measuring pH, the beads are transferred to the exchanging column and washed thoroughly, preferably with 5 bead volumes of deionized water using descending flow at 1BV/10 min. When the pH of the wash is <pH 10.0, the beads are equilibrated, preferably with 2 volumes of 1.5M ethanolamine (91.5 ml/liter deionized water, pH=11.5) using ascending flow. At the end of equilibration, the flow is stopped and the beads are incubated in the ethanolamine (in the column) for 4 hours at room temperature.

After incubation, the beads are washed thoroughly, preferably with 5–8 bead bed volumes of deionized water at 1 column volume per 10 minutes using descending flow. When the pH of the wash is <pH 9.0, the column is drained to the top of the bead bed, the exchanging column is disassembled and the beads are removed.

The removed beads may be stored, with sodium azide stock solution added to a final concentration of 0.02% sodium azide.

These beads are chemically stable, anion exchange adsorbants. These beads will be usable as ordinary anion exchange applications where pathogen removal is not critical.

The resulting beads produced by the methods of the present invention may be characterized for various properties.

For example, determining % solids of polymer beads is known. The present inventors determined % solids by the following. For each sample of beads to be measured, three microcentrifuge tubes were labelled and tared to four (4) decimal places (e.g., 1.0000 g). A Kimwipe lab tissue (doubled over) was placed onto a stack of ten paper towels. 5–10 ml of beads were pipetted onto the Kimwipe, spread out with a spatula and the interstitial liquid was allowed to absorb into the paper towels for 15–30 seconds. 1–1.5 ml of "blotted" beads were transferred into the microcentrifuge tubes using a spatula. The tubes were weighed (gross wet weight). The tubes were carefully placed into the "speed vac" lyophilizer. The cover was closed and the centrifuge started. Upon reaching the maximum rotor speed, a vacuum was applied and the samples were freeze-dried overnight. Tubes were removed from the "speed vac" and carefully weighed (to four decimal places) (gross dry weight). The % solids =net dry/net wet, where "net dry"=gross dry–tare and "net wet"=gross wet–tare.

In an example of determining % solids, beads were packed into 'tared' microcentrifuge tubes, in triplicate, and freeze-dried using a "Speed Vac" centrifugal lyophilizer. The tubes were then weighed and the percent cellulose (w/w) that comprises the bead was calculated based on the differences in net-wet and net-dry weights.

Column titrations were performed on the derivatized beads according to the present invention as follows. The recording system and pH flow cell were set. The pH meter was calibrated by pumping pH 10 buffer through the flow cell (adjust pH) followed by pH 4 buffer. A ~10 ml column bed (14–15 cm in the 0.6×20 cm column) was poured. Beads were equilibrated with 40–50 ml 1M NaCl/100 mM NaOH (pH~12.2) @ 2 ml/minute. Eluent was collected in a 100 ml graduated cylinder. The amount of 1M NaCl/100 mM NaOH was recorded and the column height was measured. The recording device/timer was started, along with pumping 10 mM HCl through the column @ 2 ml/min. The eluent was collected in a 100 ml graduated cylinder during the run. At the end of the run (pH~1.8–2.0) the amount of 10 mM HCl used was recorded. Column height was measured. The pH was plotted versus ml 10 mM HCl to give a titration curve. The volume of HCl titrated at pH 6.0 represents the "equivalence" capacity for the beads per ml, or μeq/ml. In an example of a titration set-up for cross-linked-DEAE cellulose beads, beads (10–12 ml) were packed into a 20×0.9 cm column and equilibrated with 1 M NaCl/100 mM NaOH, pH~12.5. HCl (10 mM) was pumped through the bead bed at 2 ml/min passing though a pH electrode flow cell. The pH change was monitored.

Beads according to the present invention also were characterized for their chemical stability.

The effect of 1N NaOH on bed height and titration capacity was studied. After titration of the beads, the column bed height was measured. While the beads were still in the column, the beads were equilibrated with 3–5 column volumes of IN NaOH @ 2 ml/min. Column bed height was measured. The beads were incubated in the column for 16–24 hr. After re-titrating, column bed height again was measured.

Also, the effect of 100 mM HCl (hydrochloric acid) on bed height and titration capacity was studied. After titration of the beads, the column bed height was measured. While the beads were still in the column, they were equilibrated with 3–5 column volumes of 100 mM HCl @ 2 ml/min. Column bed height was measured. The beads were incubated in the column for 16–24 hours. After re-titrating, column bed height was measured.

Next, the % column shrinkage in 4 M NaCl was studied. During the conditioning of the 170–190 ml (85–95 cm) column, prior to the dynamic binding assay, column height was measured before washing with 2 column volumes of 4 M NaCl. After washing the column with 2 column volumes of 4 M NaCl, column bed height was measured. The column was washed with 3–5 column volumes of running buffer and the column bed height was measured.

The present inventors further have studied the pressure stability of the inside-out crosslinked hydrogels according to the present invention.

Pressure studies were done in 1.6×100 cm borosilicate columns (Pharmacia) configured with 100 μm screens at the bottom. A 90–95 cm cellulose bead column was equilibrated with 50 mM Tris-base, pH 8.3, at 10 cm/min of 3–5 column volumes. The pressure gauge was set to the top of the column using a 3-way valve. Pressure was recorded at zero flow.

For a first run, the flow was started at 5 cm/min, the pressure was equilibrated 1 minutes and the value recorded. Runs were repeated at increasing flows of 10, 15, and 20 cm/min. Column heights were recorded at 20 cm/min. Flow was decreased to zero in 5 cm/min increments, recording the pressures. Column height was measured.

For a second run, the flow was started at 5 cm/min, pressure was equilibrated for 1 minute and recorded. Flow was increased to 10, 15, 20, 25, 30, 35, 40 cm/min, or until 20 PSI was reached. Column heights were recorded at each 5 cm/min increment between 20 and 40 cm/min. Flow was decreased to zero in 5 cm/min increments, recording the pressures. The final column height was measured and the % compression (volume) was determined.

Figure 6A:
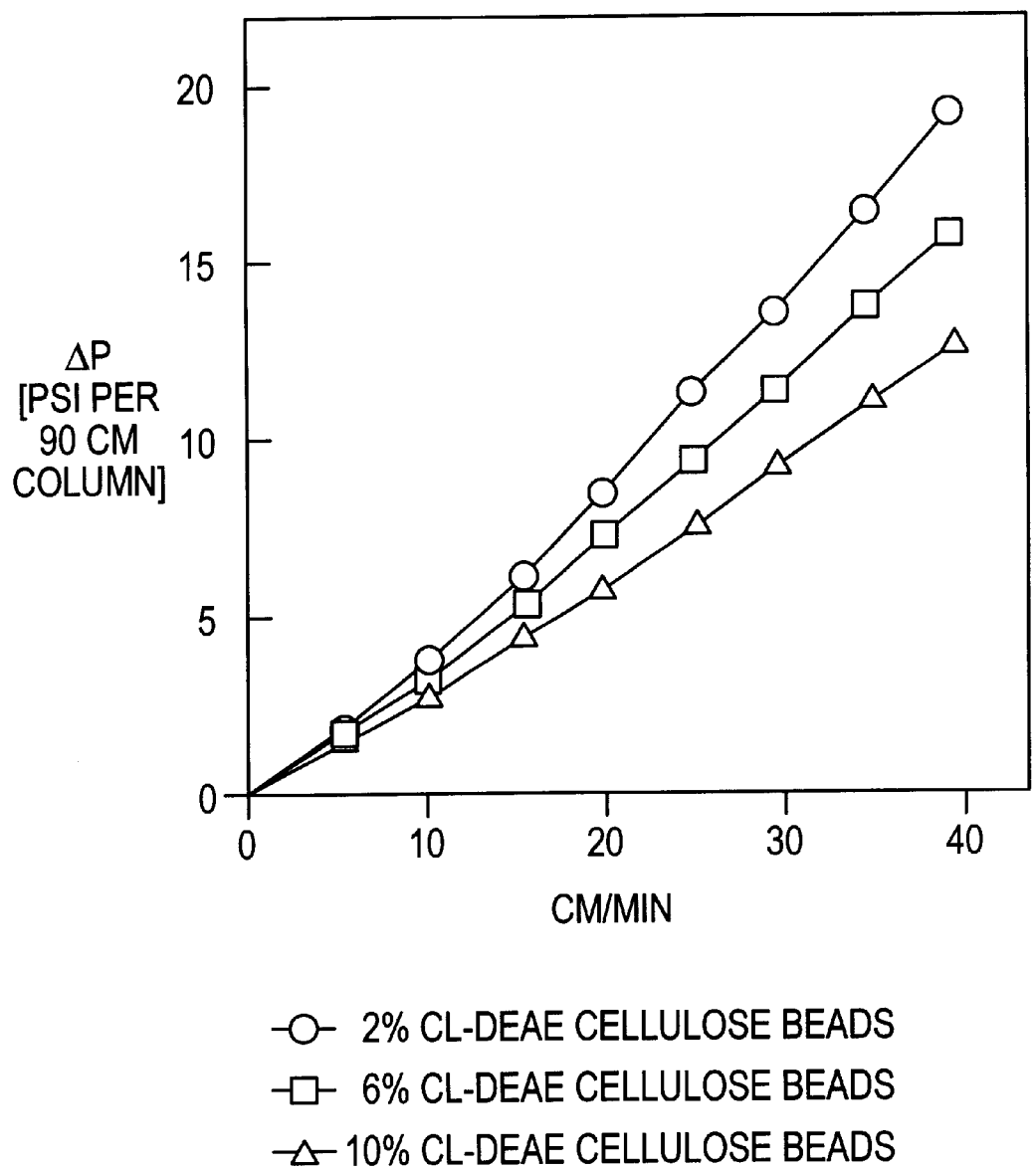
FIG. 6(A) is a graph depicting pressure drop versus linear velocity, for a comparison of crosslinked, DEAE-cellulose beads.

FIG. 6(A) is a comparison of pressure drops across cross-linked-DEAE cellulose beads. All three beads types were packed in 90 cm×1.6 columns and equilibrated with 5 column volumes of 50 mM Tris-base, pH 8.3 at 10 cm/minute. Compression of the bead bed at 20 cm/min was <1% for all beads. At 40 cm/minute, bed compression was <1% for 10% beads, ~1.2% for 6% beads and ~3% for 2% beads.

Figure 6B:
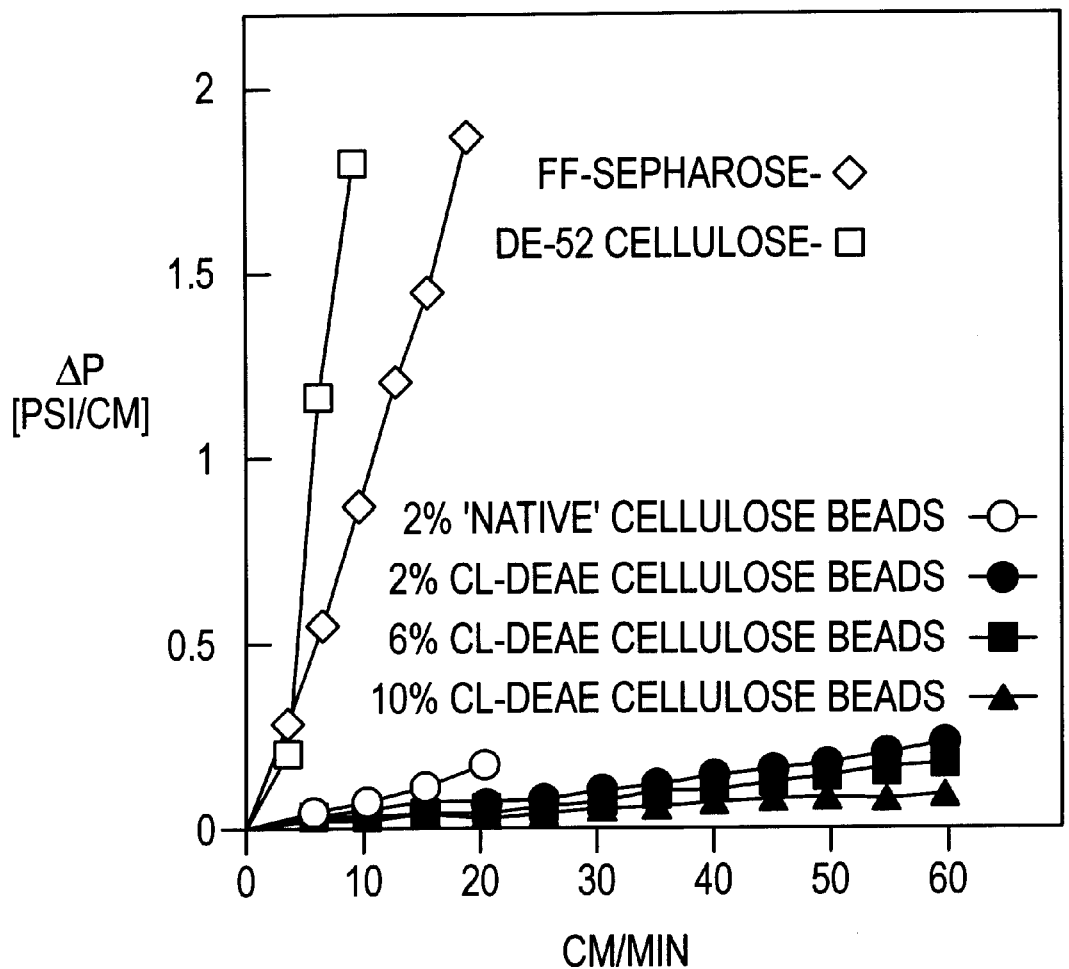
FIG. 6(B) graphically depicts pressure drop versus linear velocity, for a comparison of different DEAE media.

FIG. 6(B) is a comparison of pressure drops across DEAE media. cross-linked-DEAE cellulose beads were packed in a 90 cm column. To achieve comparable linear velocities, Sepharose Fast-Flow and DE-52 were packed in 15 cm×1.6 cm columns. Crushing velocities (i.e., dramatic increases in backpressures) for Sepharose Fast-Flow and DE-52 were at ~20 and 10 cm/minute, respectively. Uncrosslinked native cellulose beads began to crush at linear velocities >20 cm/minute.

The present inventors also have studied transport properties of hydrogels according to the present invention. Transport studies were done in 1.6×100 cm borosilicate columns (Pharmacia) configured with 100 µm screens at the bottom. No screen was used on the top plunger; a ~1 cm headspace was maintained. All tubing connections (i.e. the bottom screen holder and the plunger assembly) were drilled to ⅛ inch and fitted with rigid ⅛×1/16 (ID) PTFE tubing.

A slurry of 180–190 ml of beads in ~400 ml de-ionized water was degassed under vacuum for 5–10 minutes with periodic gentle swirling. The slurry was then poured into the column (held at ~15 degree slant) with the bottom valve open. As the beads packed by gravity and the water flowed out, more degassed bead slurry was added until the packed bed was 90–95 cm. The packed column was conditioned with 5–6 column volumes of 50 mM Tris-base, pH 7.0 at a linear velocity of 10 cm/minute.

Three types of cellulose beads (uncrosslinked, crosslinked and crosslinked/derivatized (cross-linked-DEAE)) with three different cellulose concentrations (% solids) were run with four chromatography standards (dextran blue—Mwt>2,000,000; fibrinogen—Mwt 340,000; bovine serum albumin, BSA—Mwt 60,000; tryptophan—Mwt 204) at three different linear velocities (1.25, 5 and 10 cm/minute) in duplicate (>216 runs).

The buffer delivery system consisted of a peristaltic pump (Masternex 7018–52) with #14 tubing connected to a three way valve at the top of the column through which standards were injected using a 1 ml syringe. To inject the standards, the column flow was stopped and 1 ml of standard was injected directly into the line connected to the column bed. The chromatography was monitored by UV spectrophotometry. Standards were monitored on a Knauer UV Detector at 280 nm. Retention volumes and the peak width (at half peak height) were averaged for each duplicate run and expressed as the fraction of the total column volume.

The linear velocity results are set forth in Table 2 below.

TABLE 2

| Beads: | % Solids: | Standards: | Linear Velocities: |
|---|---|---|---|
| 1. uncrosslinked | 2% cellulose | Dextran Blue (2 mg/ml) mg/ml) | 1.25 cm/min |
| 2. crosslinked | 6% cellulose | Fibrinogen (5 mg/ml) | 5 cm/min |
| 3. cross-linked-DEAE | 10% cellulose | BSA (5 mg/ml) Tryptophan (2 mg/ml) | 10 cm/min |

FIG. 7 shows, for a 90×1.6 cm column of crosslinked and derivatized (DEAE) beads (450–600) according to the present invention, results for transport in 2%, 3.5% and 6% cross-linked-DEAE cellulose beads, by plotting column volume versus UV-absorption at 280 nm. Curves are shown for Dextran Blue, fibrinogen, BSA and tryptophan. The buffer used was 50 mM Tris, pH 7.0 and 0.5 M NaCl. The samples were 1 ml Latex beads (0.3 mm; 1:10); Fibrinogen, 5 mg/ml (FIB); Albumin (BSA), 5 mg/ml; Tryptophan (TRP), 2 mg/ml.

FIG. 8 shows results relating to transport in 2% cellulose beads (600 um), for uncrossslinked (affinity beads), crosslinked beads, and crosslinked-DEAE beads.

FIG. 9 shows data for transport in 2%, 3.5% and 6% "native" (uncrosslinked) cellulose beads, for a 90×1.6 cm column of native (uncrosslinked) beads of 450–600µ diameter. The buffer was 50 mM Tris, pH 7.0 and 0.5 M NaCl. Absorbance at 280 nm was measured. Samples were 1 ml Dextran Blue, 2 mg/ml; Fibrinogen, 5 mg/ml; Albumin (BSA), 5 mg/ml; Tryptophan, 2 mg/ml.

From the data, calculated characteristic diffusion times provide conservative estimates for transport by diffusion. The data show that the actual contacting times are an order of magnitude shorter than predicted by the diffusion time. Thus, the transport in the uncrosslinked beads is likely due to convective mechanisms.

Additionally, the present inventors have conducted pulse-flow transport studies for various-height columns according to the present invention. Tables 3–11 below show pulse-flow transport data for cellulose beads, with column height and crosslinking being varied. The column used was 1.6 cm, with a tris base salt of 7.00. Flow rates of 1.25 cm/min, 5 cm/min and 10 cm/min, respectively, were studied. In each case, beads with diameter 600±150 um were used.

Table 3 below shows data for a 92 cm column, for naked (uncrosslinked) 2% beads. Table 4 contains data for a 93 cm column, for crosslinked 2% beads. Table 5 below shows data for a 91.5 cm, for crosslinked and derivatized 2% beads. Table 6 below shows data for an 89 cm column, for naked 6% beads. Table 7 below shows data for an 85 cm column, for crosslinked 6% beads. Table 8 below shows data for an 90.5 cm column, for crosslinked then derivatized 6% beads. Table 9 below shows data for a 92 cm column, for naked 10% beads. Table 10 below shows data for an 89 cm column, for crosslinked 10% beads. Table 11 below shows data for a 93 cm column, for crosslinked and then derivatized 10% beads. In these Tables, PC is the number of column volume for the peak of the emergent pulse; PW is the pulse width.

The standard deviation is neglected when σ<±0.01.

TABLE 3

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.1 | 0.28 (±0.01) | 0.76 (±0.11) | 0.4 (±0.07) | 1.02 (±0.02) | 0.55 (±0.1) |
| Bovine Serum Albumin 5 mg/0.5 ml | 1.00 (±0.04) | 0.56 (±0.02) | 0.65 | 0.67 (±0.02) | 0.52 (±0.03) | 0.21 |
| Fibrinogen 2 mg/0.5 ml | 0.63 (±0.05) | 0.75 (±0.07) | 0.38 (±0.01) | 0.14 (±0.01) | 0.38 | 0.12 |
| Dextran Blue 5 mg/0.5 ml | 0.45 (±0.05) | 0.11 (±0.01) | 0.37 | 0.08 | 0.48 (±0.06) | 0.08 (±0.03) |

TABLE 4

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.17 (±0.01) | 0.37 (±0.01) | 1.02 | 0.43 | 1.00 (±0.01) | 0.52 (±0.02) |
| Bovine Serum Albumin 5 mg/0.5 ml | 0.96 (±0.01) | 0.54 (±0.01) | 0.6 (±0.01) | 0.54 (±0.05) | 0.54 | 0.35 (±0.03) |
| Fibrinogen 2 mg/0.5 ml | 0.48 | 0.2 (±0.01) | 0.43 | 0.1 | 0.45 | 0.11 (±0.03) |
| Dextran Blue 5 mg/0.5 ml | 0.45 | 0.09 (±0.01) | 0.4 | 0.08 | 0.4 | 0.4 (±0.06) |

Surprisingly, the fast intraparticle transport is highly retained after inside-outside crosslinking when the penetration of BSA and tryptophan are compared from the results of Table 3 and Table 4.

TABLE 5

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.21 (±0.09) | 0.35 (±0.05) | 0.98 | 0.37 (±0.02) | 1.02 (±0.02) | 0.55 (±0.1) |
| Bovine Serum Albumin 5 mg/0.5 ml | 0.96 (±0.16) | 0.53 (±0.04) | 0.45 | 0.35 | 0.52 (±0.02) | 0.21 (±0.03) |
| Fibrinogen 2 mg/0.5 ml | 0.43 (±0.01) | 0.1 | 0.38 (±0.01) | 0.07 (±0.01) | 0.44 (±0.02) | 0.1 (±0.01) |
| Latex 0.5% | 0.45 | 0.1 | 0.4 | 0.1 | 0.44 | 0.1 |

TABLE 6

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.1 | 0.3 | 1.01 | 0.35 | 1.16 (±0.01) | 0.48 (±0.02) |
| Bovine Serum Albumin 5 mg/0.5 ml | 0.86 | 1.05 | 0.5 | 0.24 (±0.01) | 0.52 (±0.02) | 0.18 (±0.01) |
| Fibrinogen 2 mg/0.5 ml | 0.47 (±0.01) | 0.1 (±0.01) | 0.43 (±0.02) | 0.084 | 0.48 (±0.02) | 0.1 (±0.01) |
| Dextran Blue 5 mg/0.5 ml | 0.53 | 0.06 (±0.01) | 0.45 | 0.08 (±0.01) | 0.48 (±0.01) | 0.07 (±0.02) |

TABLE 7

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.12 (±0.02) | 0.43 (±0.03) | 1.00 | 0.53 | 1.11 (±0.02) | 0.69 (±0.01) |
| Bovine Serum Albumin 5 mg/0.5 ml | 0.57 | 0.48 | 0.41 | 0.19 (±0.01) | 0.46 (±0.01) | 0.18 |
| Fibrinogen 2 mg/0.5 ml | 0.44 | 0.18 | 0.4 | 0.12 (±0.02) | 0.41 | 0.15 (±0.01) |
| Latex 0.5% | 0.43 | 0.17 (±0.01) | 0.41 | 0.12 | 0.45 | 0.16 |

TABLE 8

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.27 | 0.55 | 0.93 (±0.01) | 0.55 (±0.01) | 0.88 (±0.01) | 0.71 (±0.07) |
| Bovine Serum Albumin 5 mg/0.5 ml | 0.43 | 0.2 | 0.41 (±0.02) | 0.12 (±0.01) | 0.36 (±0.02) | 0.11 |
| Fibrinogen 2 mg/0.5 ml | 0.39 (±0.01) | 0.1 | 0.36 | 0.11 (±0.01) | 0.38 | 0.13 |
| Latex 0.5% | 0.42 | 0.1 | 0.39 | 0.04 | 0.39 | 0.1 |

TABLE 9

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.11 (±0.13) | 0.47 (±0.05) | 0.95 (±0.15) | 0.6 (±0.05) | 0.96 (±0.07) | 0.74 (±0.07) |
| Bovine Serum Albumin 5 mg/0.5 ml | 0.46 | 0.17 | 0.4 (±0.02) | 0.22 (±0.02) | 0.46 (±0.06) | 0.24 |
| Fibrinogen 2 mg/0.5 ml | 0.4 | 0.15 (±0.01) | 0.35 (±0.01) | 0.19 (±0.01) | 0.39 (±0.01) | 0.2 (±0.02) |
| Dextran Blue 5 mg/0.5 ml | 0.45 (±0.07) | 0.18 (±0.06) | 0.41 (±0.03) | 0.14 (±0.04) | 0.41 (±0.03) | 0.22 (±0.12) |

TABLE 10

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.16 (±0.05) | 0.32 (±0.05) | 0.98 | 0.37 (±0.02) | 1.02 (±0.02) | 0.55 (±0.1) |
| Bovine Serum Albumin 5 mg/0.5 ml | 0.43 | 0.12 | 0.45 | 0.35 (±0.02) | 0.52 (±0.03) | 0.21 |
| Fibrinogen 2 mg/0.5 ml | 0.41 (±0.01) | 0.08 | 0.38 (±0.01) | 0.07 (±0.01) | 0.44 (±0.02) | 0.1 (±0.01) |
| Dextran Blue 5 mg/0.5 ml | 0.4 | 0.07 | 0.36 | 0.06 | 0.38 (±0.03) | 0.07 (±0.01) |

TABLE 11

| Velocities | 1.25 cm/mn | | 5 cm/mn | | 10 cm/mn | |
|---|---|---|---|---|---|---|
| | PC | PW | PC | PW | PC | PW |
| Tryptophan 5 mg/0.5 ml | 1.25 (±0.02) | 0.43 (±0.03) | 1.03 (±0.01) | 0.61 (±0.01) | 1.03 | 0.7 |
| Bovine Serum Albumin | 0.46 (±0.01) | 0.06 (±0.02) | 0.42 (±0.01) | 0.04 (±0.02) | 0.44 | 0.04 |

TABLE 11-continued

| | 1.25 cm/mn | | 5 cm/mn | | 10 cm/mn | |
|---|---|---|---|---|---|---|
| Velocities | PC | PW | PC | PW | PC | PW |
| 5 mg/0.5 ml Fibrinogen | 0.45 | 0.05 | 0.4 | 0.054 | 0.37 | 0.032 |
| 2 mg/0.5 ml | | | | | (±0.07) | |
| Latex 0.5% | 0.42 (±0.01) | 0.06 | 0.38 | 0.06 | 0.42 (±0.02) | 0.05 (±0.06) | property of the hydrogels according to the present invention, namely, static binding capacity (SBC), by studying adsorption isotherms.

On a first day, stock solutions (~75 ml) were prepared of BSA (or other protein) at concentrations ranging from 0.5 to 50 mg/ml in 50 mM Tris-saline, pH 8.3. $OD_{280}$ of each starting protein solution was measured.

Triplicate 5 ml "snap-cap" tubes for each protein concentration were prepared by carefully pipeting 1 ml of buffer (50 mM Tris-saline, pH 8.3) into each tube.

Beads were washed and equilibrated with 39 mM Tris-phosphate, pH 8.6. (using a 25 mm membrane filter assembly attached to a vacuum flask).

Triplicate samples (1 ml) of cellulose beads were aliquoted into the 5 ml tubes containing 1 ml buffer. After the beads settled, bead "bed" was adjusted to the 1 ml mark and interstitial buffer removed with a pasteur pipet. (With small beads such as Fast-flow Sepharose or Whatman DE-52, brief centrifuging of the tubes (2000–3000×g, 5 min) was done to settle the beads.)

2 ml of each BSA solution/dilution was pipetted to each triplicate set of bead samples, capped tightly and mixed (tumbled) for 18–24 hours at room temperature.

On a second day, the tubes were centrifuged at 2000–3000×g for 5 minutes to settle the beads. 1.5 ml of each supernatant was removed and the residual BSA measured using $O.D._{280}$ [1 mg/ml=0.667].

Isotherm plots were generated. (For such plot generation, a QuatroPro calculation template (or some other spreadsheet) may be used.)

Figure 10:
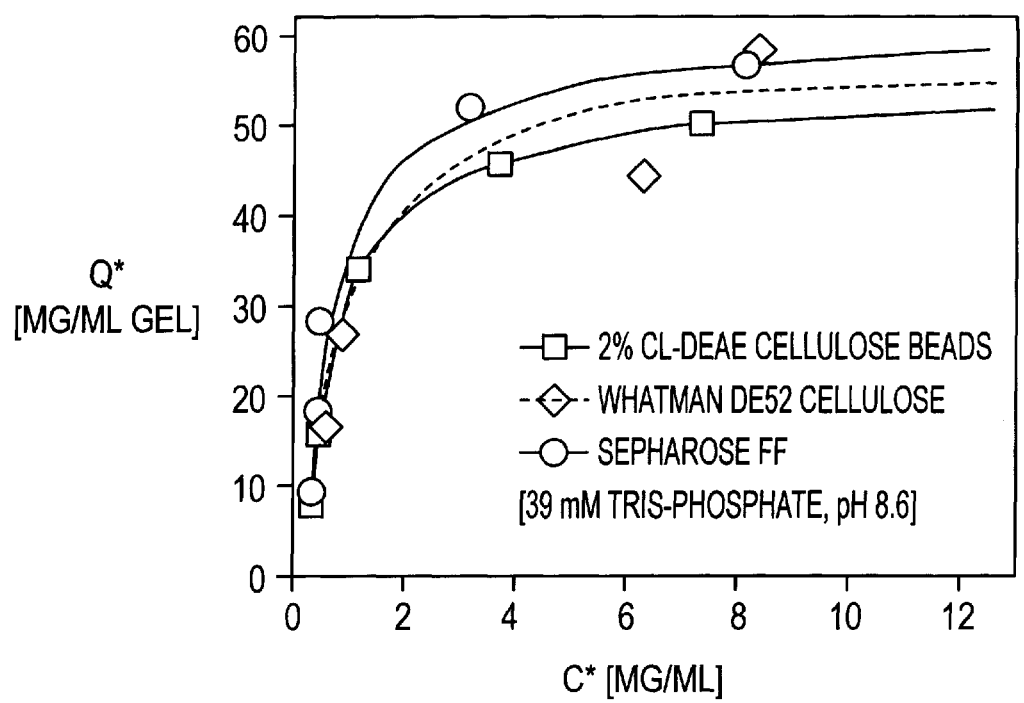
FIGS. 10(A) and 10(B) are equilibrium isotherms comparing binding to various DEAE matrices, for albumin (FIG. 10(A)) and for fibrinogen (FIG. 10(B)).
Figure 10:
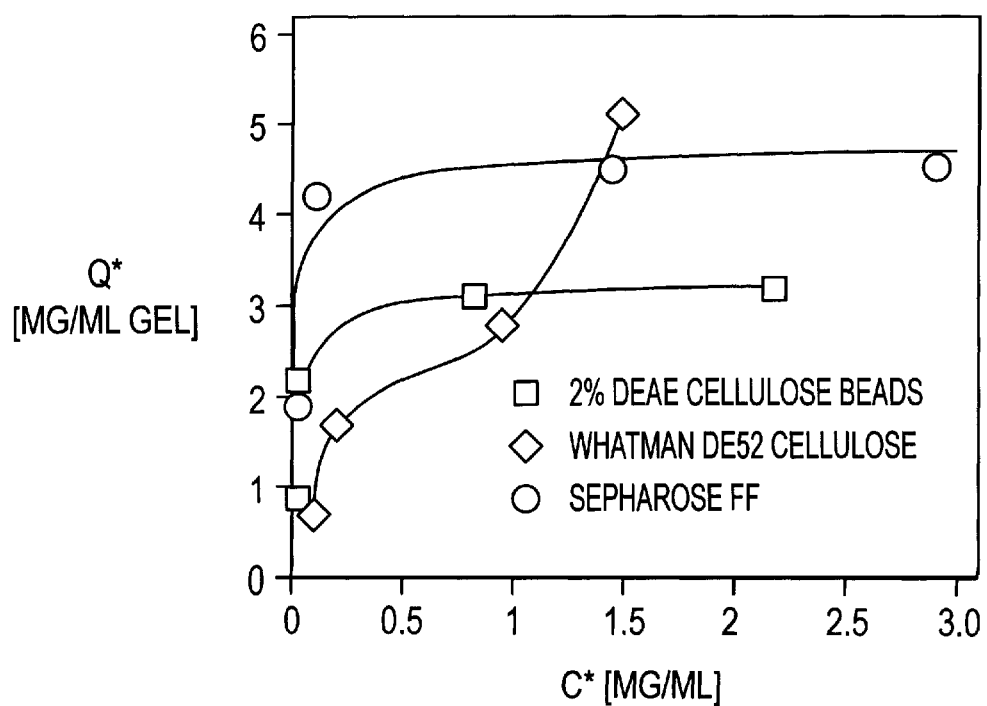

FIG. 10(A) shows equilibrium isotherms for BSA binding to DEAE matrices. Beads were equilibrated with 39 mM Tris-phosphate, pH 8.6, and triplicate 1 ml aliquots were incubated with 0.5 to 50 mg/ml BSA at room temperature (~21° C.) for 24 h. Concentrations of BSA in the supernatants (C*, mg/ml) were determined by absorption at 280 nm (extinction coefficient; 0.667). Q* (mg/ml) represents the amount of BSA bound to the beads. This figure shows that the Whatman and Sepharose DEAE-derivatized media have essentially equivalent binding capacity for BSA. This is surprising since the 2% DEAE-cellulose beads have much smaller surface area/volume than the Sepharose and Whatman media, yet equivalent or less DEAE moieties.

FIG. 10(B) shows equilibrium isotherms for fibrinogen binding to DEAE matrices. Beads were equilibrated with 39 mM Tris-phosphate, pH 8.6, and triplicate 1 ml aliquots were incubated with 0.5 to 10 mg/ml fibrinogen at room temperature (~21° C.) for 24 h. Concentrations of fibrinogen in the supernatants (C*, mg/ml) were determined by absorption at 280 nm (extinction coefficient; 1.67). Q* (mg/ml) represents the amount of fibrinogen bound to the beads. The similar amounts of fibrinogen bound is surprising since the DEAE-cellulose beads have so much less surface area/volume than the Whatman and Sepharose DEAE-media.

Figure 11:
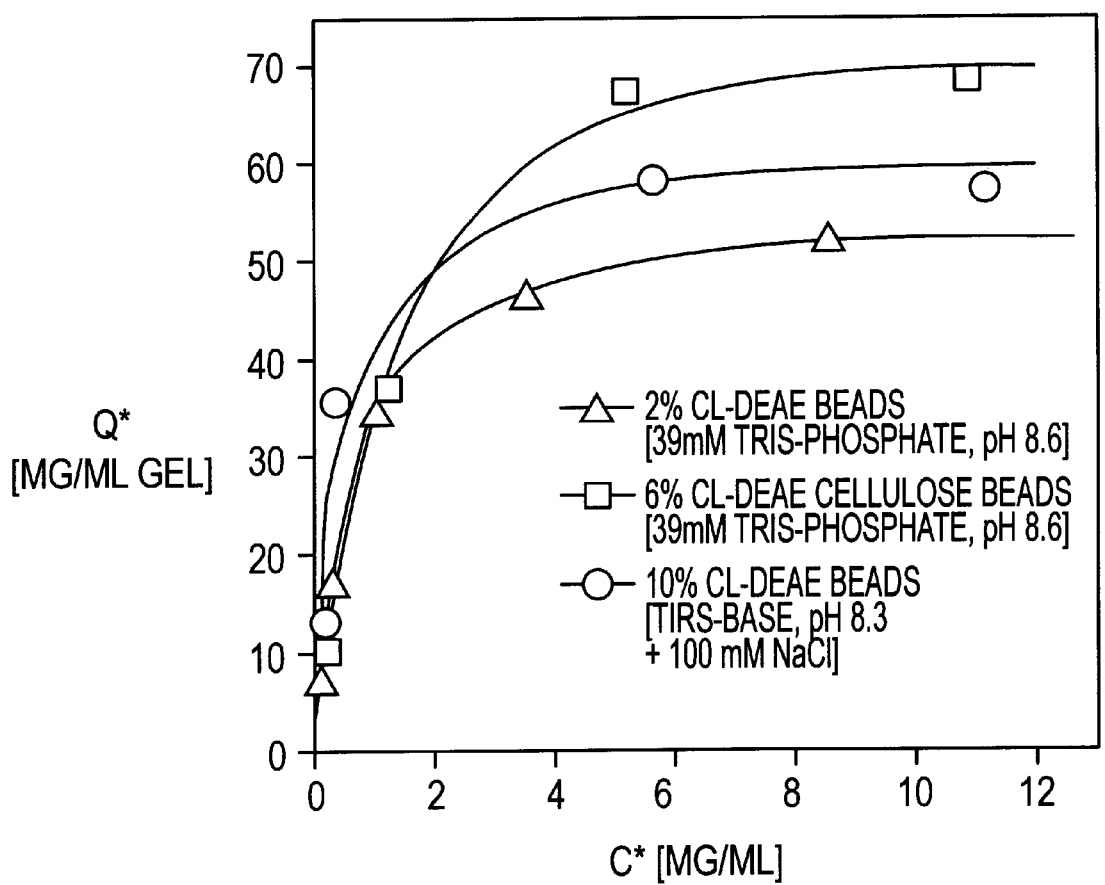
FIG. 11 is an equilibrium isotherm graph showing static binding of albumin on crosslinked-DEAE-cellulose matrices of different solids content.

FIG. 11 is an equilibrium isotherm showing static binding of albumin on DEAE matrices. The beads were equilibrated in the respective buffer and triplicate 1 ml aliquots were incubated with 2 ml of bovine serum albumin (BSA, 0.5 to 50 mg/ml) at room temperature (21° C.) for 24 hours. Concentrations of BSA in the supernatants (C*, mg/ml) were determined by absorption at 280 nm (extinction coefficient, 0.667). Q* (mg/ml) represents the amount of BSA bound to the beads.

Dynamic binding capacity (DBC) was determined by the following procedure.

2–4 liters of running buffer (e.g. 50 mM Tris-HCl, pH 8.3) and 1 liter of 1M NaCl and 4M NaCl, and 1–2 liters of protein solution (e.g., BSA @ 1 mg/ml in running buffer) were respectively prepared.

The beads were diluted in running buffer, degassing the beads under vacuum and packing a one (1) meter column with 85–95 cm of beads (~170–190ml). The column was tapped while the beads settled to remove air bubbles. The column was equilibrated with 3–5 column volumes of running buffer at 5 cm/min.

Protein solution was loaded onto the column until the desired breakthrough (10–50%), recording flows and absorbances. Upon achieving the desired breakthrough, the column was washed with 1–2 column volumes of running buffer (until an even baseline returned). The bound protein was eluted using 1M NaCl until an even baseline returned (up to 2 column volumes). Absorbances and volumes were recorded.

Tables 12 and 13 below show dynamic binding data for cross-linked-DEAE Cellulose and DEAE Ff-Sepharose, for 2% and 3.5% respectively. Table 14 compares dynamic binding of 3.5% cross-linked-DEAE and cross-linked-Q cellulose with DEAE and Q Fast Flow Sepharose at 10 cm/min.

TABLE 12a

| 2% cross-linked-DEAE cellulose (199) | 50 mM TB 100 mM Salt | 50 mM TB 50 mM Salt | 50 mM TB 35 mM Salt | 50 mM TB 20 mM Salt | 50 Mm TB |
|---|---|---|---|---|---|
| Flow Rate | 10 cm/min. | 10 cm/min | 10 cm/min | 10 cm/min | 10 cm/min |
| % Break Through | 23% | 33% | 24% | 23% | 25% |
| | 43% | 25% | | 23% | 30% |
| Conductivity (m ) | 10.9 | 5.7 | 4.6 | 2.8 | 0.9 |
| Capacity | 3.0 mg/ml | 15 mg/ml | 15.5 mg/ml | 9 mg/ml | 1.5 mg/ml |
| (mg/ml) | 4.5 mg/ml | 14.5 mg/ml | | 8.5 mg/ml | 2.0 mg/ml |
| % loss Feed | 12%, 0.1% | 3.1% 3.3% | 3% | 8.5%, 9.1% | 2.2%, 8% |
| % loss Wash | 44%, 34.5% | 7.62%, 6.7% | 1.5% | 1.1%, 1.25% | 5.5%, 5% |
| *(Column Volume/wash) | (12 Column Volumes) | (3 Column Volumes) | (2 Column Volumes) | (2 Column Volumes) | (2 Column Volumes) |
| % yield Elute | 23%, 65.5% | 80%, 84% | 95% | 94%, 87.5% | 83%, 81% |

Dynamic binding capacities of 2% cross-linked-DEAE cellulose beads using tris buffer (pH 8.6) with varying concentrations of NaCl. Backpressure range, 2–3 PSI TABLE 12b

| 2% cross-linked-DEAE cellulose (199) | 15 mM Na$_3$PO$_4$ 100 mM Salt | 15 mM Na$_3$PO$_4$ 50 Mm Salt | 15 mM Na$_3$PO$_4$ 20 mM Salt | 15 Mm Na$_3$PO$_4$ |
|---|---|---|---|---|
| Flow Rate | 10 cm/min. | 10 cm/min | 10 cm/min | 10 cm/min |
| % Break Through | 20.5% 28% | 23% | 23% 23% | 17% |
| Conductivity (mψ) | 10.4 | 6.0 | 4.5 | 3 |
| Capacity (mg/ml) | 1.7 mg/ml 1.7 mg/ml | 9.6 mg/ml | 18 mg/ml 17.1 mg/ml | 23 mg/ml |
| % loss Feed | 6.4%, 7% | 4.33% | 4%, 3.5% | 2% |
| % loss Wash | 45%, 60% | 20% | 5%, 7% | 1.3% |
| *(Column Volume/wash) | (12 Column Volumes) | (5 Column Volumes) | (2 Column Volumes) | (2 Column Volumes) |
| % yield Elute | 42%, 41% | 78% | 88%, 71% | 95% |

Dynamic binding capacities of 2% cross-linked-DEAE cellulose beads using sodium phosphate buffer (pH 7.8) with varying concentrations of NaCl. Backpressure range = 2.3 PSI.

TABLE 12c

| DEAE-FF Sepharose | 15 mM Na$_3$PO$_4$ 100 mM Salt | 15 mM Na$_3$PO$_4$ 50 mM Salt | 15 mM Na$_3$PO$_4$ 20 mM Salt | 15 mM Na$_3$PO$_4$ |
|---|---|---|---|---|
| Flow Rate | 10 cm/min. | 10 cm/min | 10 cm/min | 10 cm/min |
| % Break Through | 23.6% | 20% | 47% | 20% |
| Conductivity (m ) | 9.4 | 6.1 | 4.2 | 2.0 |
| Capacity (mg/ml) | 5 | 14.5 | 27 | 35.5 |
| % loss Feed | 8% | 9.4% | 11% | 6% |
| % loss Wash | 45% | 24% | 17% | 19% |
| *(Column Volume/wash) | (15 Column Volumes) | (20 Column Volumes) | (15 Column Volumes) | (8 Column Volumes) |
| % yield Elute | 56% | 58% | 65% | 75% |

Dynamic binding capacities of DEAE-FF-Sepharose using 15 mM phosphate buffer (pH 7.8) with varying concentrations of NaCl. Backpressure range = 15–20 PSI.

TABLE 12d

| 2% cross-linked-DEAE cellulose (199) | 40 mM Na$_3$PO$_4$ 20 mM Salt | 40 mM Na$_3$PO$_4$ | 25 mM Na$_3$PO$_4$ | 15 mM Na$_3$PO$_4$ |
|---|---|---|---|---|
| Flow Rate | 10 cm/min. | 10 cm/min | 10 cm/min | 10 cm/min |
| % Break Through | 27% | 23.7% | 24% | 17% |
| Conductivity (m ) | 6.9 | 5.7 | 3.3 | 3 |
| Capacity (mg/ml) | 5 mg/ml | 7.5 mg/ml | 16 mg/ml | 23 mg/ml |
| % loss Feed | 4% | 6% | 3% | 2% |
| % loss Wash | 18% | 26% | 8% | 1.3% |
| % yield Elute | 89% | 71% | 80% | 95% |

Comparison of the dynamic binding capacities as a function of sodium phosphate concentrations. Backpressure range, 2–3 PSI

TABLE 13

| 3.5% cross-linked-DEAE cellulose (199) | 50 mM TB 100 mM Salt | 50 mM TB 50 Mm Salt | 50 mM TB 35 mM Salt | 50 mM TB, 20 mM Salt | 50 Mm TB |
|---|---|---|---|---|---|
| Flow Rate | | 10 cm/min | 10 cm/min | | 10 cm/min |
| % Break Through | | 20% | 20% | | 44% (fast break!) |
| Conductivity (mψ) | | 6.2 | 4.4 | | 1.1 |
| Capacity (mg/ml) | Not determined | 24 mg/ml | 16.8 mg/ml | Not determined | 2.2 mg/ml |
| % loss Feed | | 2.2% | 8% | | 20% |
| % loss Wash | | 6% | <1% | | 5% |
| *(Column Volume/wash) | | 2–3 Column Volumes | (1–2 Column Volumes) | | (1–2 Column Volumes) |
| % yield Elute | | 91% | 92% | | 75% |

Table 13a: Dynamic binding capacity of 3.5% cross-linked-DEAE cellulose beads using tris buffer (pH 8.6) with varying concentration of NaCl. Backpressure range = 2–3, PSI.

| 3.5% cross-linked-DEAE cellulose (199) | 15 mM Na$_2$PO$_4$ 100 mM Salt | 15 mM Na$_3$PO$_4$ 50 Mm Salt | 15 mM Na$_3$PO$_4$ 20 mM Salt | 15 Mm Na$_3$PO |
|---|---|---|---|---|
| Flow Rate | | 10 cm/min | | 10 cm/min |

TABLE 13-continued

| | | |
|---|---|---|
| % Break Through | 22% | 23% |
| Conductivity (mψ) | 6.2 | 2.1 |
| Capacity (mg/ml) | 11.5 mg/ml | 21.3 mg/ml |
| % loss Feed | 6% | 5% |
| % loss Wash | 8.5% | <1% |
| *(Column Volume/wash) | 3–4 Column Volumes | (1–2 Column Volumes) |
| % yield Elute | 85% | 95% |

Table 13b: Dynamic binding capacity of 3.5% cross-linked-DEAE cellulose beads using sodium phosphate buffer (pH 7.8) with varying concentration of NaCl. Backpressure range = 2–3 PSI.

| DEAE-FF Sepharose | 15 mM $Na_2PO_4$ 100 mM Salt | 15 mM $Na_3PO_4$ 50 Mm Salt | 15 mM $Na_3PO_4$ 20 mM Salt | 15 Mm $Na_3PO$ |
|---|---|---|---|---|
| Flow Rate | 10 cm/min | 10 cm/min | 10 cm/min | 10 cm/min |
| % Break Through | 23.6% | 20% | 47% | 20% |
| Conductivity (mψ) | 9.4 | 6.1 | 4.2 | 2.0 |
| Capacity (mg/ml) | 5 | 14.5 | 27 | 35.5 |
| % loss Feed | 8% | 9.4% | 11% | 6% |
| % loss Wash | 45% | 24% | 17% | 19% |
| *(Column Volume/wash) | (15 Column Volumes) | (20 Column Volumes) | (15 Column Volumes) | (10 Column Volumes) |
| % yield Elute | 56% | 58% | 65% | 74% |

Table 13c: Dynamic binding capacity of DEAE FF-Sepharose using 15 mM sodium phosphate buffer (pH 7.8) with varying concentration of NaCl. Backpressure range = 20–25 PSI.

TABLE 14

| 15 mM Sodium phosphate, pH 7.8 [conductivity 2.1] | 3.5% cross-linked-DEAE Cellulose (90 × 1.6 cm) | DEAE Fast-Flow Sepharose (15 × 0.5 cm) | 3.5% cross-linked-Q Cellulose (90 × 1.6 cm) | Q Fast-Flow Sepharose (15 × 2.5 cm) |
|---|---|---|---|---|
| Flow Rate | 10 cm/min | 10 cm/min | 10 cm/min | 10 cm/min |
| % Break Through | 23% | 20% | 20% | 21% |
| Backpressure | 2–3 PSI | 20–25 PSI | 2–3 PSI | 20–25 PSI |
| Capacity (mg/ml) | 21/3 mg/ml | 35.5 mg/ml | 30.5 mg/ml | 45.5 mg/ml |
| % loss Feed | 5% | 6% | 1% | 2% |
| % loss Wash | <1% | 19% | 2% | 10% |
| *(Column Volume/wash) | 1–2 Column Volumes Wash | 8–10 Column Volumes Wash | 1–2 Column Volumes Wash | 20–25 Column Volumes Wash |
| % yield Elute | 56% | 58% | 65% | 74% |

In Table 14 above, dynamic binding capacities of 3.5% cross-linked-DEAE and 3.5% cross-linked-Q cellulose beads are compared to DEAE Fast-Flow and Q Fast-Flow Sepharose using 15 mM sodium phosphate, pH 7.8 (conductivity, 2.1) and serum albumin (1 mg/ml) at 10 cm/min.

Figure 12:
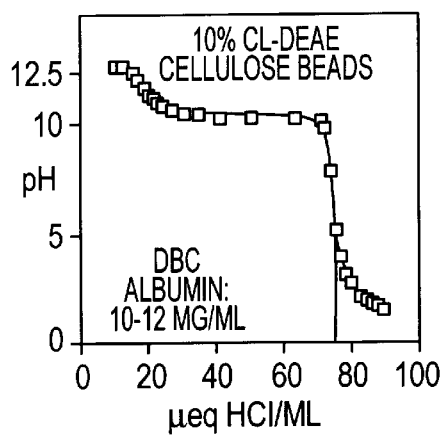
FIG. 12 graphically represent relative titrations of DEAE groups on the matrices as compared to typical dynamic binding capacities (DBC) of DEAE matrices at operating velocities of 10 cm/min.
Figure 12:
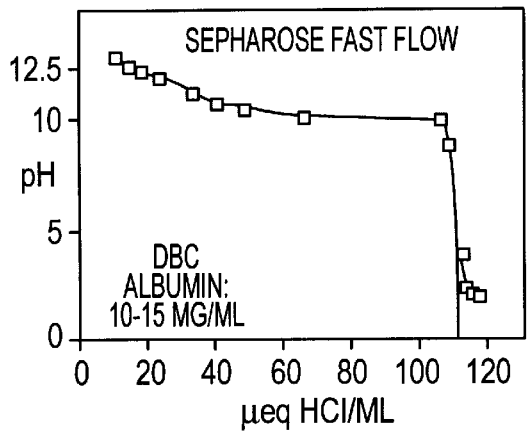
Figure 12:
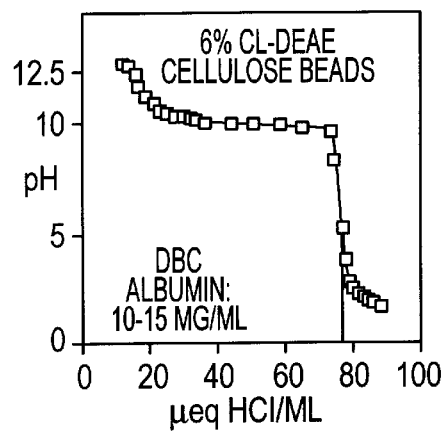
Figure 12:
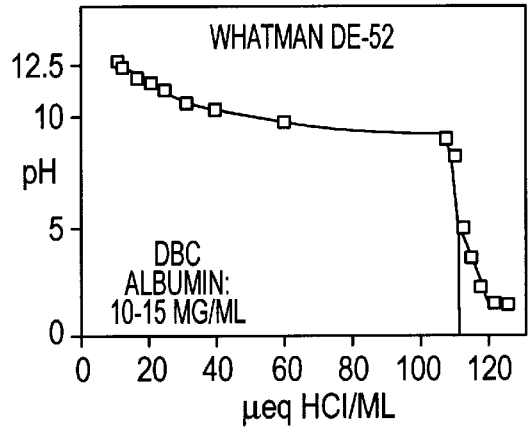
Figure 12:
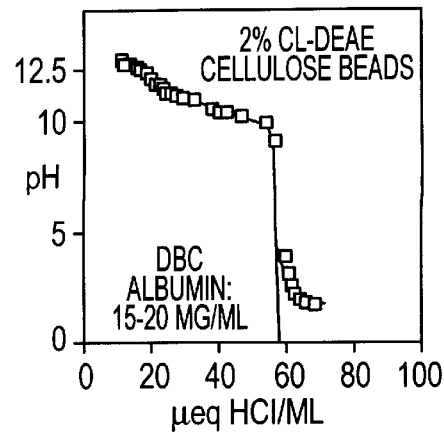
Figure 12:
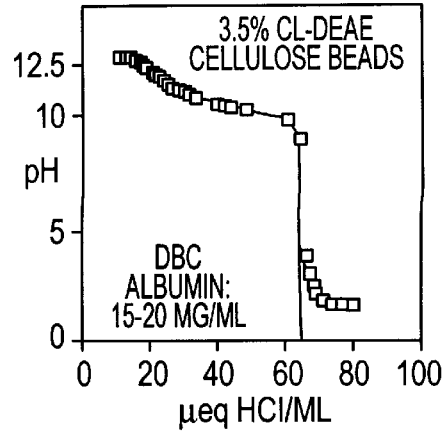

As to dynamic binding capacity, reference is further made to FIG. 12, showing relative titrations and dynamic binding capacities of DEAE matrices. to Cellulose beads (10 ml) were equilibrated with 1 M NaCl in 100 mM NaOH and titrated 'in-column' with 10 mM HCl at 2 ml/min as previously described. The dynamic binding capacities (DBC) for bovine serum albumin were determined using optimal buffer conditions at, i) 10 cm/min in 90×1.6 column beds for cellulose beads and ii) 2 cm/min column beds for DE-52 and Sepharose Fast Flow.

FIG. 13 shows titrations of 2% cross-linked-DEAE cellulose beads.

Figure 14:
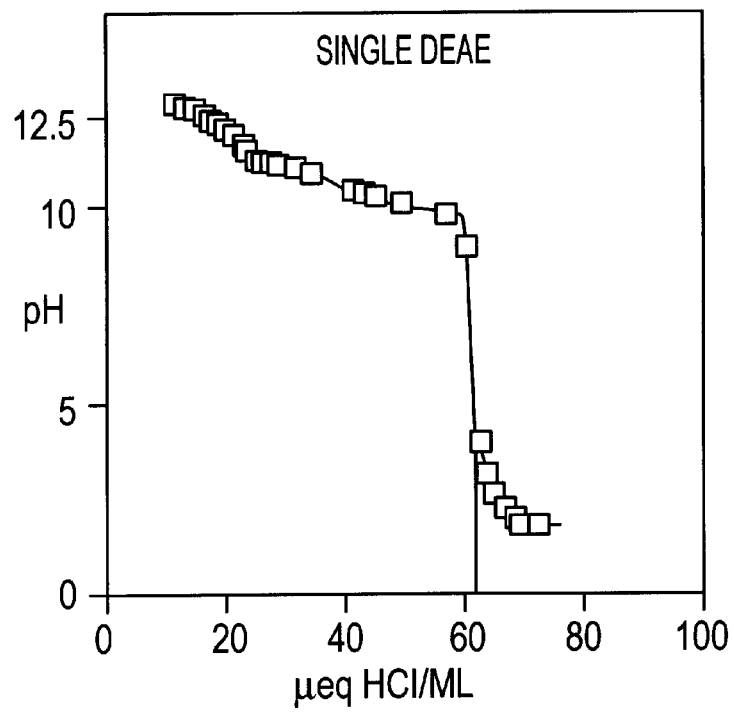
FIG. 14 graphically compares titrations of DEAE groups on 2% cross-linked-DEAE cellulose beads having single and triple DEAE derivatization treatments.
Figure 14:
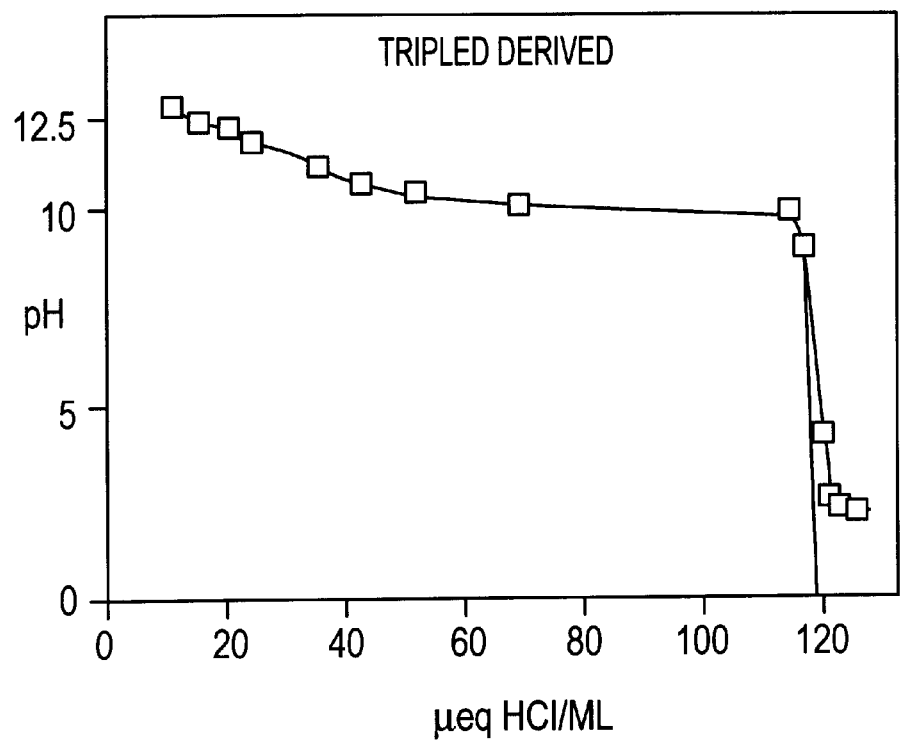

FIG. 14 shows titrations of 2% cross-linked-DEAE cellulose beads with single derivatization, then triple derived. A batch of 2% cellulose beads was derived three times on consecutive days (1 column volume of beads+1 column volume of 3N DEAE+3 column volumes of 1 N NaOH (slow addition) at room temperature) and titrated according to 'SOP'.

FIGS. 15 and 16 show titrations of cross-linked-DEAE cellulose beads, 6% and 10% respectively.

Figure 17A:
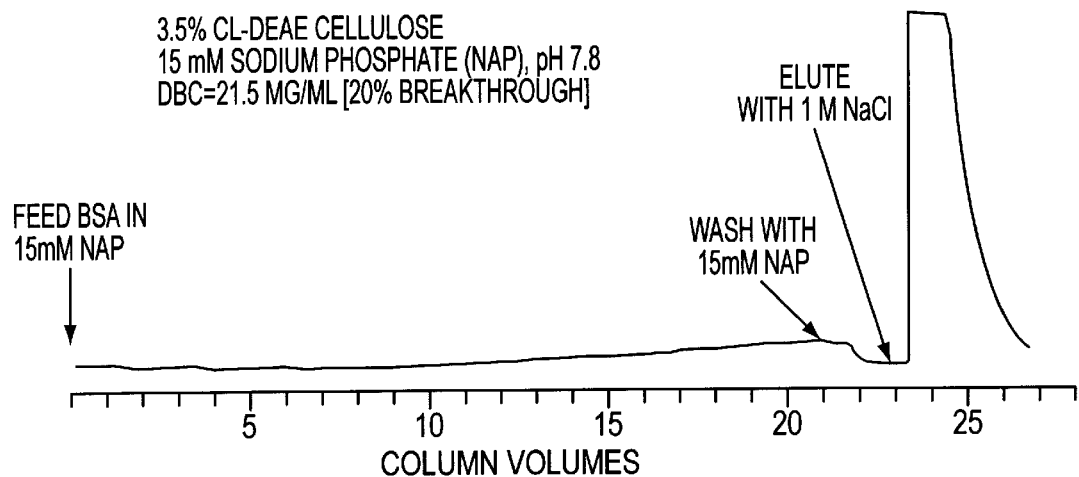
FIG. 17 graphically depicts breakthrough loading of serum albumin on 3.5% cross-linked-DEAE cellulose and DEAE Fast-flow Sepharose at 10 cm/min.
Figure 17B:
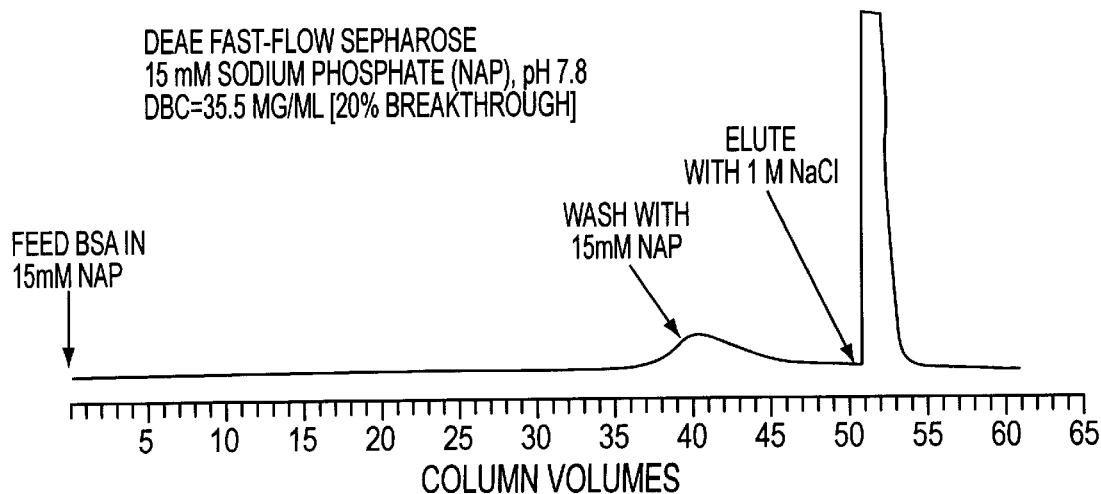
Figure 18A:
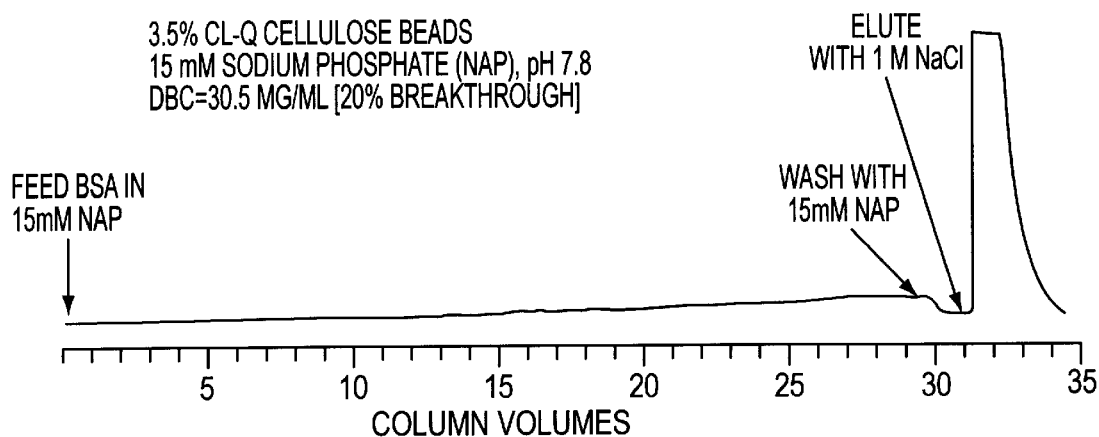
FIG. 18 graphically depicts breakthrough loading of serum albumin on 3.5% cross-linked-DEAE cellulose and Q Fast-Flow Sepharose at 10 cm/min.
Figure 18B:
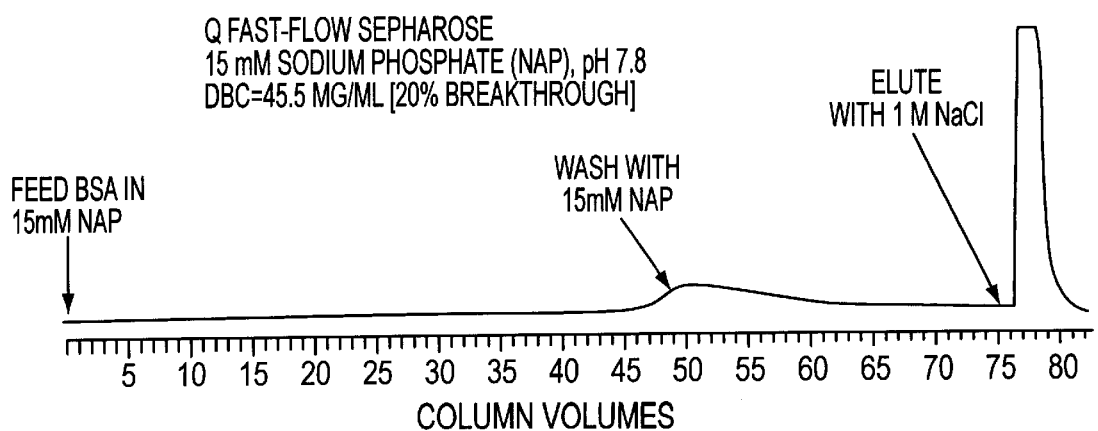

FIGS. 17 and 18 show breakthrough loading of serum albumin on 3.5% cross-linked cellulose and Fast-Flow Sepharose at 10 cm/min for, respectively, 3.5% cross-linked-DEAE Cellulose and DEAE Fast Flow Sepharose, and 3.5% cross-linked-Q Cellulose and Q Fast Flow Sepharose.

FIG. 19 shows the effect of column length on dynamic binding capacity, namely, increasing adsorption number to increase DBC. The dynamic binding capacity of 2% cross-linked-DEAE cellulose beads were determined for BSA at 10 cm/min in 1.6 cm diameter columns (2 ml/cm) of varying lengths, L. The running buffer was 15 mM sodium phosphate, pH 7.8 (conductivity=2.1), and the feed was BSA at 1 mg/ml. Breakthrough was about 20% and protein concentrations were determined by absorbance$_{280}$.

Figure 20A:
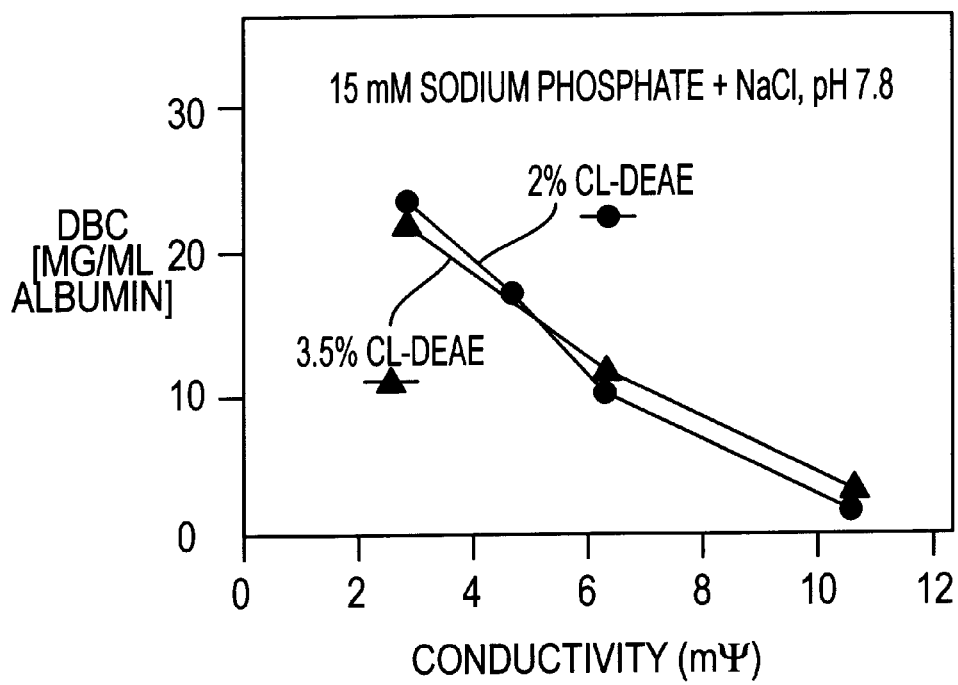
FIG. 20 shows the dynamic binding capacities of 2% and 3.5% cross-linked-DEAE cellulose for BSA at varying conductivities (i.e., ionic strengths).
Figure 20B:
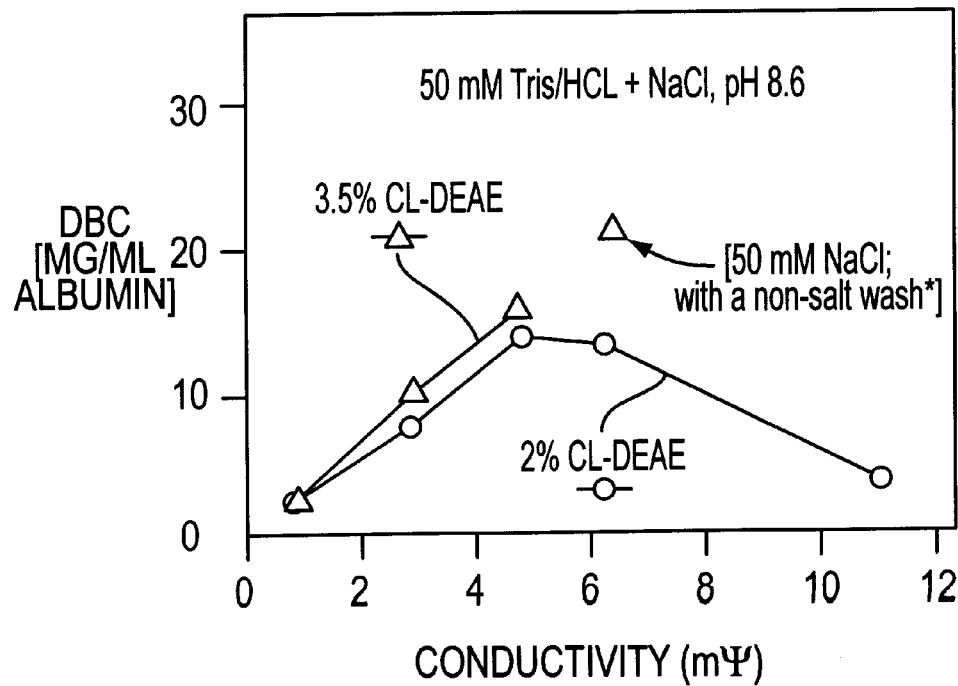

FIG. 20 shows the dynamic binding capacities of 2% and 3.5% cross-linked-DEAE cellulose for BSA at varying conductivities (i.e., ionic strengths). The binding capacities of 2% and 3.5% cross-linked-DEAE cellulose beads (90×1.6 cm bed) for BSA (1 mg/ml) were determined at a linear velocity of 10 cm/min. Operating backpressures ranges from 2–3 PSI for all of the bead beds and all beds washed to baseline within 2–3 column volumes following loading (except for the 3.5% beads in Tris/50 mM NaCl). FIG. 20(A) is for 15 mM sodium phosphate, pH 7.8 (monobasic+dibasic); 2% cross-linked-DEAE (0, 20, 50 and 100 mM NaCl), 3.5% cross-linked-DEAE (0, 50 and 100 mM NaCl). FIG. 20(B) is for 50 mM Tris base+HCl , pH 8.6; 2% cross-linked-DEAE (0, 20, 35, 50, 100 mM NaCl), 3.5% cross-linked-DEAE (0, 20, 35 and 50 mM). When loaded and washed using 50 mM NaCl, the 3.5% beads would not wash below the 20% breakthrough level (the BSA just slowly desorbed in a trial for 10–20 column volumes). However, when loaded in 50 mM NaCl and washed in Tris buffer with no NaCl, the 3.5% beads washed to baseline in 2–3 column volumes and an accurate DBC could be obtained. DBCs with 100 mM NaCl could not be determined accurately on 3.5% beads due to minimal binding and extensive trailing.

FIG. 21 shows the effect of column length on the DBC of 3.5% cross-linked-DEAE cellulose beads. Albumin (bovine serum, 1 mg/ml) was loaded onto 9×5 cm (○) and 90×1.6 ([]) column beds (180 ml) in 15 mM sodium phosphate buffer, pH 7.8, at room temperature to 20–25% breakthrough. After washing to baseline (absorbance 280 nm) with 1–2 column volumes of running buffer, the bound protein was eluted with 1 M NaCl. Beds were reconditioned with 2 column volumes of 4 M NaCl, 1 column volume of 0.5 NaOH and 6 column volumes of running buffer at 10 cm/min.

Figure 22:
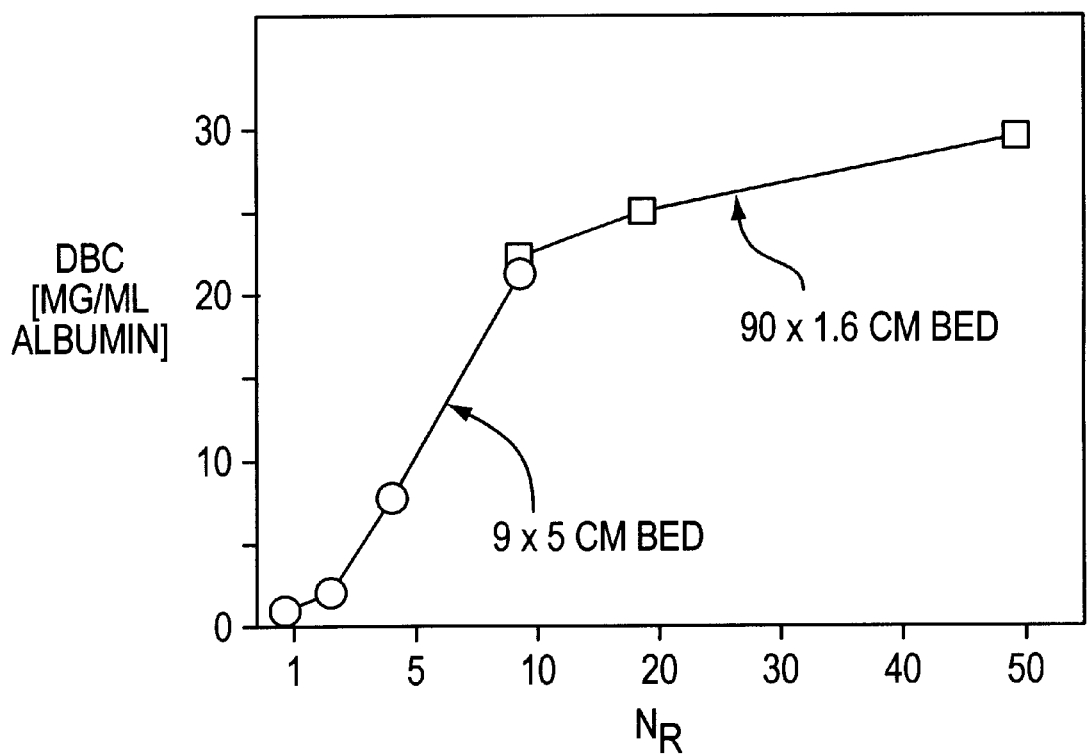
FIG. 22 shows an adsorption number analysis, of the effect of column length on DBC.

FIG. 22 shows an adsorption number analysis, off the effect of column length on DBC. 3.5 cross-linked-DEAE cellulose beads, 450–600 u were used. Albumin (bovine serum, 1 mg/ml) was loaded onto 9×5 cm (○) and 90×1.6 ([]) beads (180 ml) in 15 mM sodium phosphate buffer, pH 7.8, at room temperature to 20–25% breakthrough at 1, 2, 5 and 10 cm/ml.

The effect of sanitization on the Dynamic Binding Capacity of 3.5% cross-linked-DEAE and cross-linked-Q Cellulose Beads for Serum Albumin was studied. The columns used were 90×1.6 cm (180 ml) 3.5% cross-linked-DEAE and cross-linked-Q cellulose beads. The sanitization consisted of equilibrating the beads with 2 column volumes of 0.5 N NaOH at 45° C. (using a circulating waterjacket), stopping the flow was stopped and maintaining the column for, (i) 4 hours at 45° C., (ii) 24 hours at 20° C. and (iii) 72 hours at 20° C. After each NaOH sanitization, the column was washed with 6–8 column volumes of 15 mM sodium phosphate buffer, pH 7.8 and the dynamic binding of serum albumin was determined.

Dynamic binding was studied as follows. Bovine serum albumin (1 mg/ml in 15 mM sodium phosphate buffer, pH 7.8) was loaded onto the column at 10 cm/min to ~20% breakthrough. The column was then washed to baseline (absorbance$_{280}$) with 2 column volumes of running buffer, and eluted with 3 column volumes of 1 M NaCl at 10 cm/min. Protein concentrations of the feed, wash and elusion pools were determined by absorbance$_{280}$ The pressure range represents the backpressures from loading to elusion in 1M NaCl.

The results are reported in Table 15 below.

TABLE 15

| | 3.5% cross-linked-DEAE Cellulose Beads | | | 3.5% cross-linked-Q Cellulose Beads | | |
|---|---|---|---|---|---|---|
| Column Treatment | DBC | % Yield | ΔP | DBC | % Yield | ΔP |
| Before Sanitization (0.5 N NaOH, 45C, 4 hours) | 22 mg/ml | 92% | 2.4–2.9 PSI | 30.5 mg/ml | 96% | 2.5–2.9 PSI |
| After Sanitization #1 (0.5 N NaOH, 45C, 4 hr) | 21.5 mg/ml | 94% | 2.2–2.9 PSI | 31 mg/ml | 96% | 2.4–3.1 PSI |
| After Sanitization #2 (0.5 N NaOH, 24 hours, 20C) | 21 mg/ml | 95% | 2.3–2.8 PSI | 30 mg/ml | 95% | 2.4–2.9 PSI |
| After Sanitization #3 (0.5 N NaOH, 72 hours, 20C) | 19 mg/ml | 97% | 2.4–3.0 PSI | 29.5 mg/ml | 97% | 2.6–3.1 PSI |

It may be seen that a low desorption number, $N_{des}$, provides a fast washout, in the formula $$N_{des} = k_{des} L / u_o,$$

where $k_{des}$ is a desorption constant, L is the length of the column, and $u_o$ is the velocity. This $N_{des}$ is the ratio of desorption to convection. Intraparticle mass transfer is not limiting. High $k_{des}$ is countered by high velocity (u).

Figure 23:
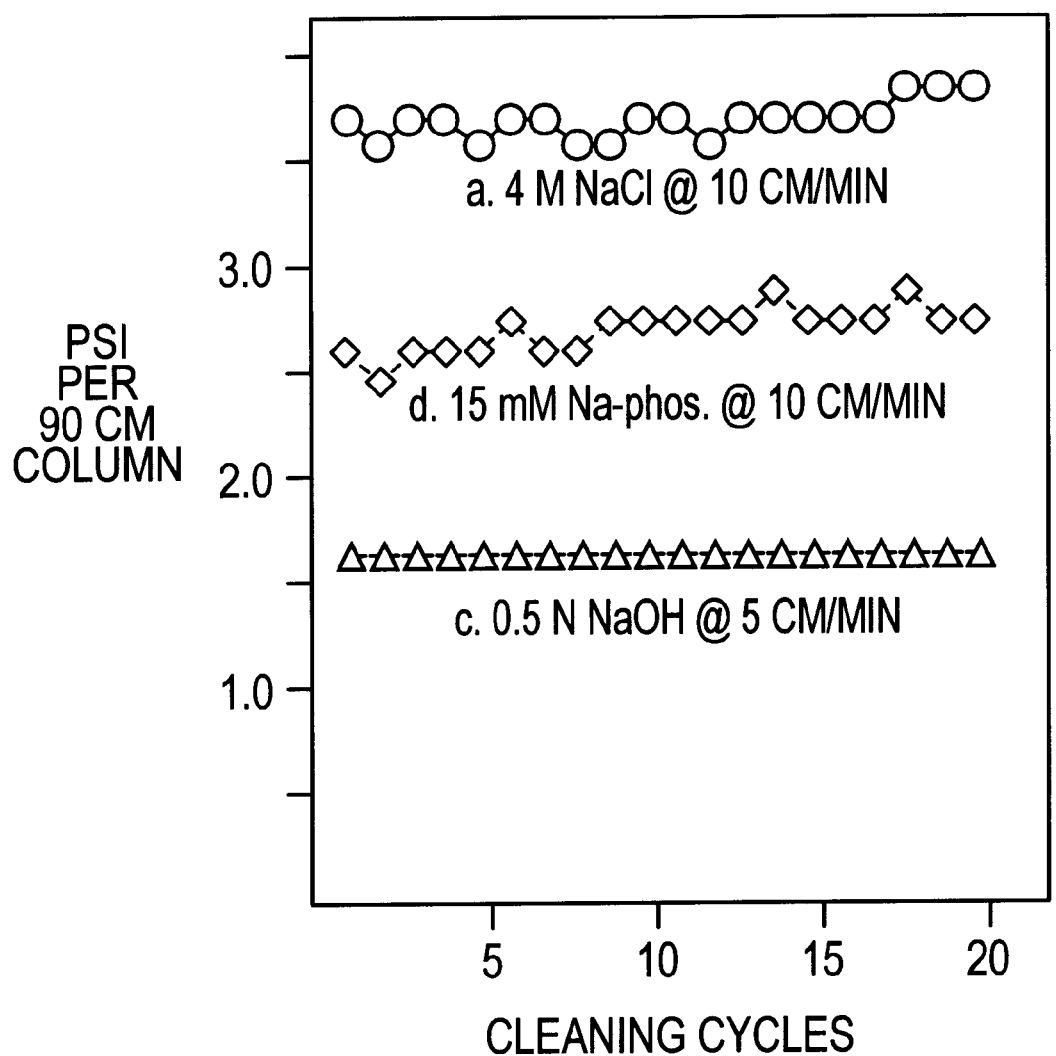
FIG. 23 graphically depicts media stability by a 15 swelling analysis of hydrogels according to the present invention, as to chemical treatment and effect on pressure-flow.

The present inventors also conducted a swelling analysis of hydrogels according to the present invention, as to chemical treatment and effect on pressure-flow. The results are shown in FIG. 23. For FIG. 23, a 90×1.6 cm column bed of 3.5% cross-linked-DEAE beads was (i) flow-packed with 3 column volumes of 15 mM sodium phosphate buffer (NAP), pH 7.8, at 10 cm/min and (ii) conditioned with 1 column volume of 0.5 NaOH at 5 cm/min. Backpressures were measured at the end of steps (a), (c) and (d) in the cleaning cycle. The cleaning cycles included: (a) 4 M NaCl (2 column volumes) at 10 cm/min; (b) 15 mM NAP (2 column volumes) at 10 cm/min; (c) 0.5 N NaOH (1 column volume) at 5 cm/min; and (d) 15 mM NAP (2 column volumes) at 10 cm/min.

Figure 24:
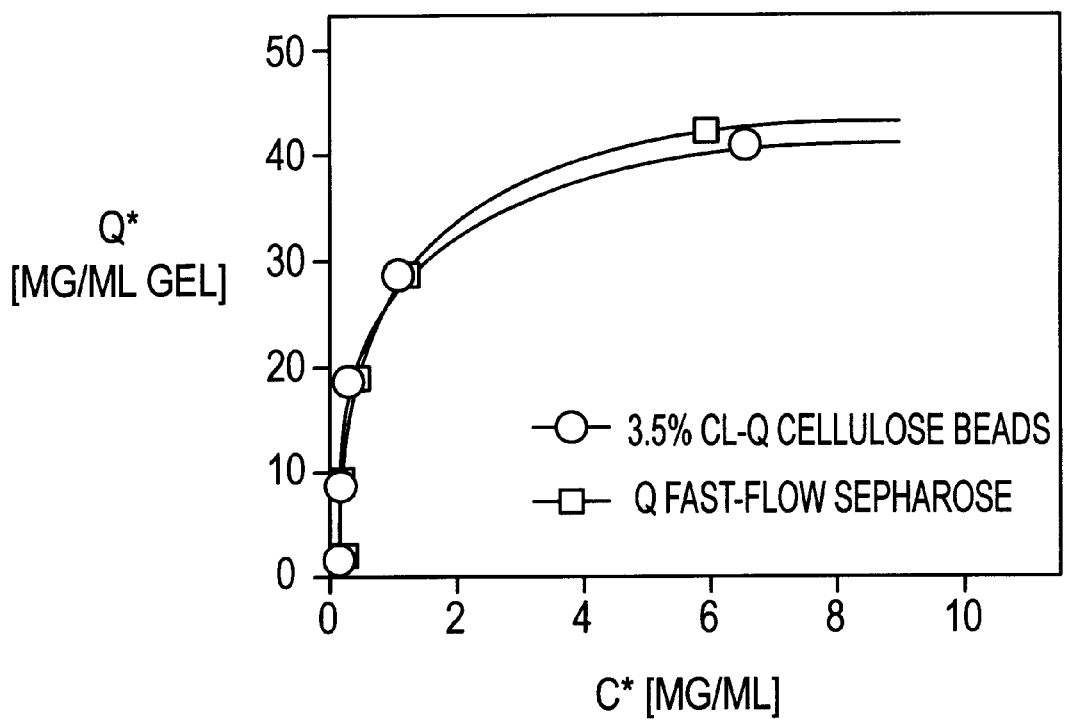
FIG. 24 is an equilibrium adsorption isotherm for BSA on cross-linked-Q Cellulose and Q Fast-Flow Sepharose.
Figure 25A:
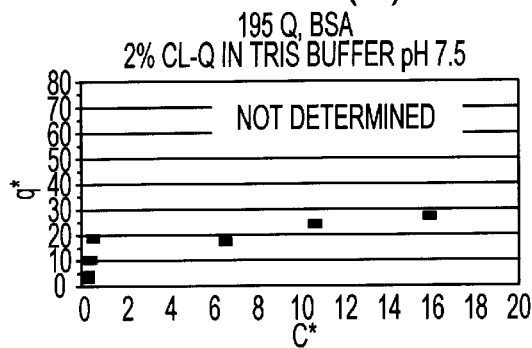
FIG. 25 includes various equilibrium adsorption isotherms on quarternary ammonium ("Q")-derivatized Q-cellulose matrices.
Figure 25B:
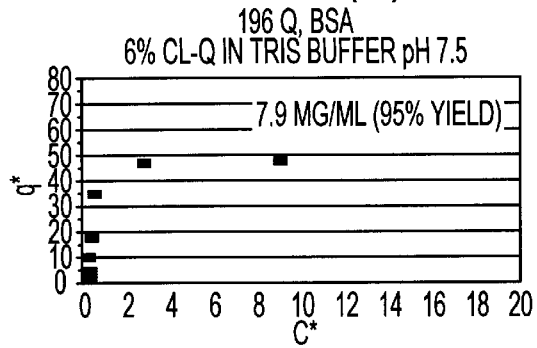
Figure 25C:
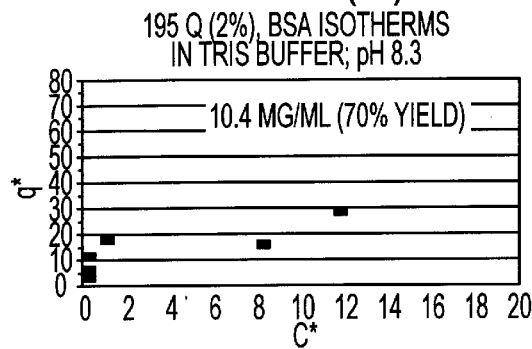
Figure 25D:
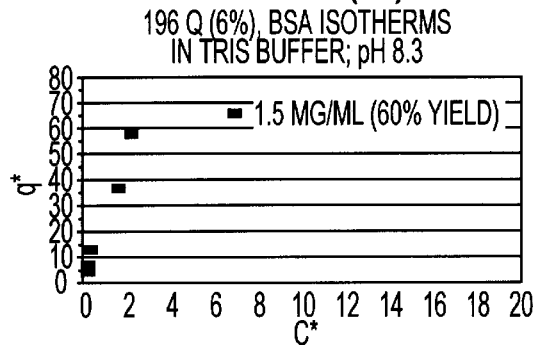
Figure 25E:
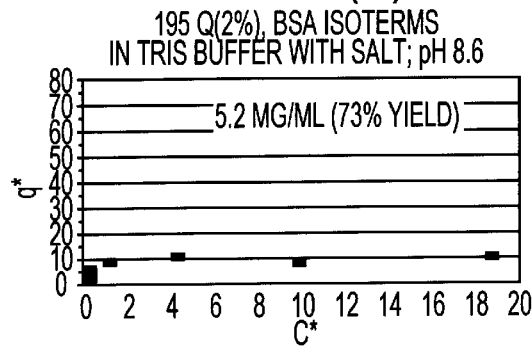
Figure 25F:
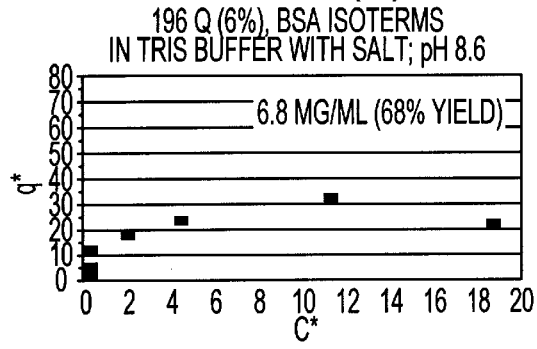
Figure 25G:
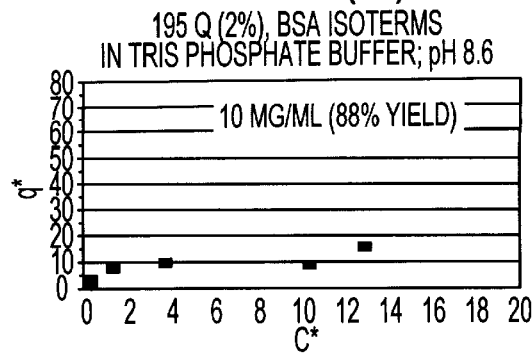
Figure 25H:
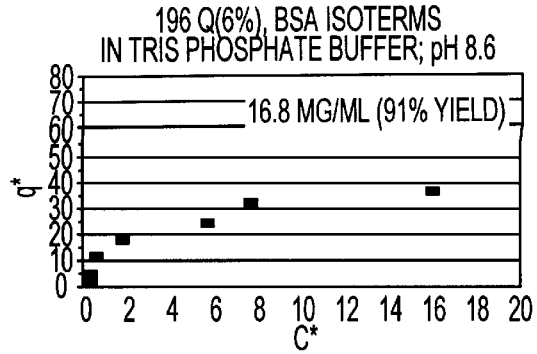
Figure 26A:
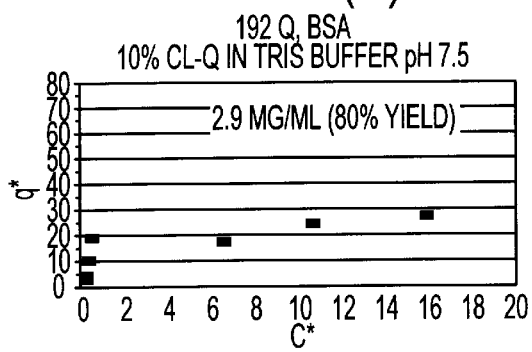
FIG. 26 also includes various equilibrium adsorption isotherms on quarternary ammonium ("Q")-derivatized Q-cellulose matrices.
Figure 26B:
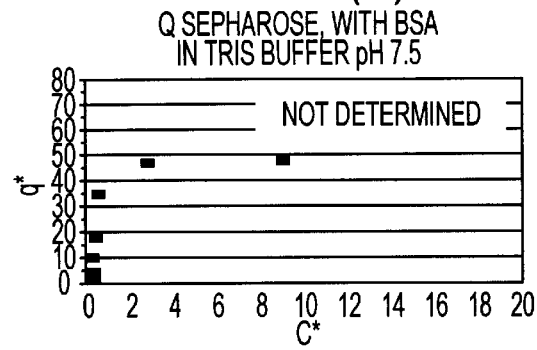
Figure 26C:
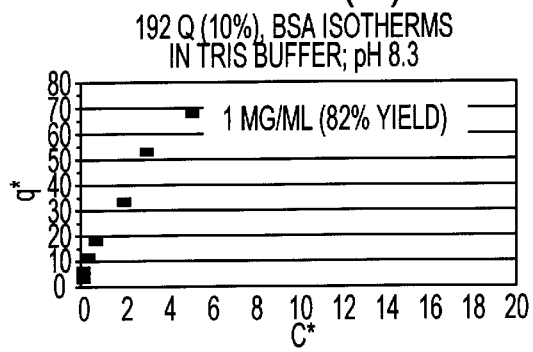
Figure 26D:
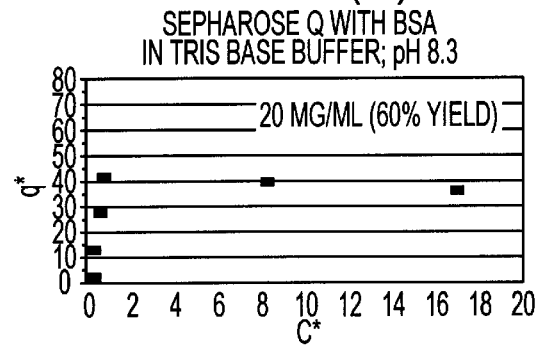
Figure 26E:
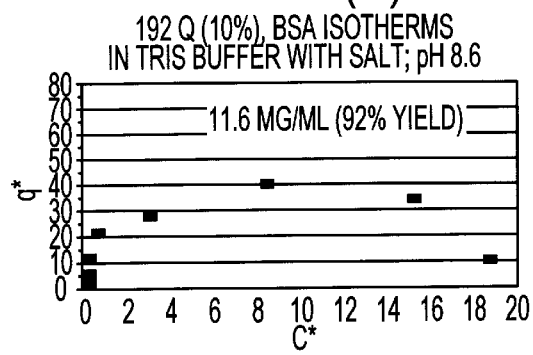
Figure 26F:
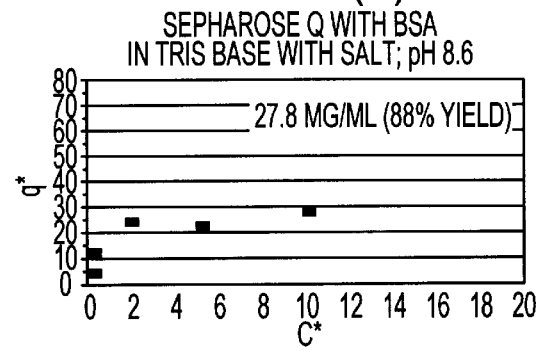
Figure 26G:
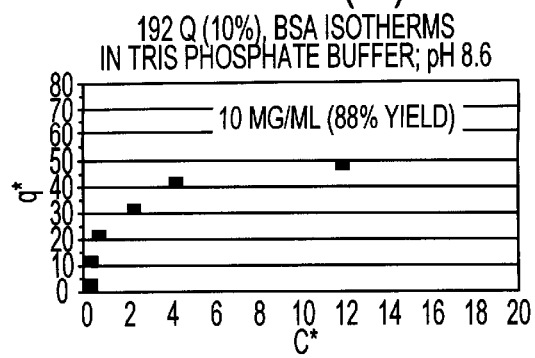
Figure 26H:
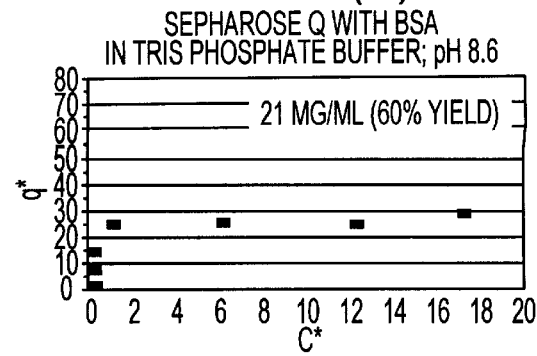

FIG. 24 is an equilibrium isotherm for BSA on cross-linked-Q Cellulose and Q Fast-Flow Sepharose. 3.5% cross-linked-Q Cellulose Beads were equilibrated in 15 mM sodium phosphate buffer, pH 7.8, and triplicate 1 ml aliquots were incubated with 2 ml bovine serum albumin (BSA, 0.5 to 50 mg/ml) at room temperature (21° C.) for 24 hours. Concentrations of BSA in the supernatants (C*, mg/ml) were determined by absorption at 280 nm (extinction coefficient; 0.667) Q* (mg/ml) represents the amount of BSA bound to the beads.

Dynamic binding studies were done for cross-linked-Q cellulose and Q FF-Sepharose. The results are set forth in Table 16 below.

Also, dynamic binding of 3.5% cross-linked-DEAE and cross-linked-Q cellulose with DEAE and Q Fast Flow Sepharose at 10 cm/minute was compared. The results are shown in Table 17 below.

TABLE 16

| 40 mM Tris phosphate pH 8.6 (no salt) | 2% Q Beads | 3.5% Q Beads | 6% Q Beads | 10% Q Beads | Q-FF Sepharose |
|---|---|---|---|---|---|
| Flow Rate | 10 cm/min | 10 cm/min | 10 cm/min | 10 cm/min | 10 cm/min |
| % Breakthrough | 31% | 20% | 17% | 13% | 42% |
| Conductivity (mψ) | 4.2 | 4.3 | 4.2 | 4.3 | 4.2 |
| Capacity (mg/ml) | 10.4 mg/ml | 17.6 mg/ml | 16.8 mg/ml | 16.5 mg/ml | 21.4 mg/ml |
| % loss Feed | 7% | 3.5% | 5% | 3.5 | 5% |
| % loss Wash | 3% | 2% | 2% | 5% | 20% |
| *(column volumes/wash) | 1–2 column volumes | 1–2 column volumes | 1–2 column volumes | 1–2 column volumes | >6 column volumes |
| % yield Elute | 88% | 92% | 91% | 88% | 60% |

Table 16a: Dynamic binding capacities of cross-linked-Q Beads using 40 mM tris-phosphate (pH 8.6). Backpressure range: Cellulose (90 × .16 cm); 2–3 PSI, Q FF Sepharose (15 × 2.5 cm); 20–25 PSI.

| 50 mM Tris, pH 8.6 (no salt) | 2% Q Beads | 3.5% Q Beads | 6% Q Beads | 10% Q Beads | Q-FFSeph |
|---|---|---|---|---|---|
| Flow Rate | 10 cm/min | 10 cm/min | 10 cm/min | 10 cm/min | 10 cm/min |
| % Break Through | 21% | 50% | 58% | 32% | 53% |
| Conductivity (mψ) | 1.0 | 1.0 | 1.1 | 1.0 | 1.0 |
| Capacity (mg/ml) | 10.8 mg/ml | 3.9 mg/ml | 1–2 mg/ml | 1–2 mg/ml | 20 mg/ml |
| % loss Feed | 6.5% | 25% | 16% | 4% | 3.2% |
| % loss Wash | 8.5% | 5% | 13% | 5% | 16.5% |
| *(column volumes/wash) | 2–3 column volumes | 1–2 column volumes | 1–2 column volumes | 1–2 column volumes | 1–2 (low MB) volumes |
| % yield Elute | 73% | 68% | 70% | 87% | 80% |

Table 16b: Dynamic binding capacities of cross-linked-Q Beads using 50 mM Tris buffer (pH 7.8). Backpressure range: Cellulose (90 × 1.6 cm); 20–25 PSI.

| 15 mM Sod. phosphate pH 7.8 (no salt) | 2% Q Beads | 3.5% Q Beads | 6% Q Beads | 10% Q Beads | Q-FFSeph |
|---|---|---|---|---|---|
| Flow Rate | 10 cm/min | 10 cm/min | 10 cm/min | 10 cm/min | 10 cm/min |
| % Break Through | | 20% | | | 21% |
| Conductivity (mψ) | | 2.1 | | | 2.1 |
| Capacity (mg/ml) | | 30.5 mg/ml | | | 45.5 |
| % loss Feed | | 1% | | | 2% |
| % loss Wash | | 2% | | | 10% |
| *(column volumes/wash) | | 2–3 column volumes | | | 25 column volumes |
| 5 yield Elute | | 96% | | | 88% |

Table 16c: Dynamic binding capacities of cross-linked-Q Beads using 15 mM sodium phosphate buffer (pH 7.8). Backpressure range: Cellulose (90 × 1.6 cm); 2–3 PSI, Q FFSeph (15 × 2.5 cm); 20–25 PSI.
[*column volumes/wash, column volumes to elute unbound BSA]

| 50 mM Tris, pH 8.6 + 100 mM NaCl | 2% Q Beads | 3.5% Q Beads | 6% Q Beads | 10% Q Beads | Q-FFSeph |
|---|---|---|---|---|---|
| Flow Rate | 10 cm/min | | 10 cm/min | 10 cm/min | 10 cm/min |
| % Break Through | 24% | | 23% | 23% | 48% |
| Conductivity (mψ) | 9.7 | | 9.7 | 9.8 | 9.7 |
| Capacity (mg/ml) | 5.3 mg/ml | | 6.8 mg/ml | 11.6 mg/ml | 27.8 mg/ml |
| % loss Feed | 5% | | 6.5% | 8.5% | 3.5% |
| % loss Wash | 16% | | 27% | 5.5% | 16.5% |
| *(column volumes/wash) | 3–4 column volumes | | >6 column volumes | 2–3 column volumes | 3–4 column volumes |
| % yield Elute | 73% | | 68% | 92% | 80% |

Table 16d: Dynamic binding capacities of cross-linked-Q Beads using 50 mM Tris buffer (pH 7.8) + 100 mM NaCl. Backpressure range: Cellulose (90 × 1.6 cm); 2–3 PSI, Q FFSeph (15 × 2.5 cm); 20–25 PSI.

TABLE 17

| 15 mM Sodium phosphate, pH 7.8 [conductivity 2.1] | 3.5% cross-linked-DEAE Cellulose (90 × 1.6 cm) | DEAE Fast-Flow Sepharose (15 × 2.5 cm) | 3.5% cross-linked-Q Cellulose (90 × 1/6 cm) | Q Fast-Flow Sepharose (1.5 × 2.5 cm) |
|---|---|---|---|---|
| Flow Rate | 10 cm/min | 10 cm/min | 10 cm/min | 10 cm/min |
| % Break Through | 23% | 20% | 20% | 21% |
| Backpressure | 2–3 PSI | 20–25 PSI | 2–3 PSI | 20–25 PSI |
| Capacity (mg/ml) | 21.3 mg/ml | 35.5 mg/ml | 30.5 mg/ml | 45.5 mg/ml |
| % loss Feed | 5% | 6% | 1% | 2% |
| % loss Wash | <1% | 19% | 2% | 10% |

TABLE 17-continued

| 15 mM Sodium phosphate, pH 7.8 [conductivity 2.1] | 3.5% cross-linked-DEAE Cellulose (90 × 1.6 cm) | DEAE Fast-Flow Sepharose (15 × 2.5 cm) | 3.5% cross-linked-Q Cellulose (90 × 1/6 cm) | Q Fast-Flow Sepharose (1.5 × 2.5 cm) |
|---|---|---|---|---|
| *(column volume/wash) | 1–2 column volumes Wash | 8–10 column volumes Wash | 1–2 column volumes Wash | 20–25 column volumes Wash |
| % yield Elute | 95% Yield | 75% | 95% Yield | 88% Yield |

Dynamic binding capacities of 3.5% cross-linked-DEAE and 3.5% cross-linked-Q cellulose beads compared to DEAE Fast-Flow and Q Fast-Flow Sepharose using 15 mM phosphate, pH 7.8 (conductivity, 2.1) and serum albumin (1 mg/ml) at 10 cm/min.

Isotherms are shown in FIGS. 25 and 26.

Table 18 below summarizes dynamic Binding capacities for cross-linked-DEAE cellulose beads.

TABLE 18

| Cellulose Beads | Albumin [10 cm/min] | Fibrinogen [10 cm/min] | Fibrinogen [0.5 cm/min] |
|---|---|---|---|
| 2% cross-linked-DEAE | | | |
| Tris-phosphate | 15–20 mg/ml | 0.4–0.6 mg/ml | 2.7–3.1 mg/ml |
| Tris-base | 4–5 mg/ml | N/D* | N/D |
| Tris-base + NaCl | 4–5 mg/ml | N/D | N/D |
| 6% cross-linked-DEAE | | | |
| Tris-phosphate | 8–10 mg/ml | <0.2 mg/ml | N/D |
| Tris-base | 1–2 mg/ml | N/D | N/D |
| Tris-base + NaCl | 10–15 mg/ml | N/D | N/D |
| 10% cross-linked-DEAE | | | |
| Tris-phosphate | 4–6 mg/ml | <0.2 mg/ml | N/D |
| Tris-base | <0.5 mg/ml | N/D | N/D |
| Tris-base + NaCl | 10–12 mg/ml | N/D | N/D |

The dynamic binding capacity of cross-linked-DEAE cellulose beads made with three different cellulose concentrations, 2%, 6% and 10%, were run according to the standard protocol for serum albumin (bovine) and fibrinogen as previously described. The running buffers included, i) 39 mM Tris-phosphate, pH 8.6; 50 mM Tris-base, pH 8.3 and 50 mM Tris-base+100 mM NaCl, pH 8.3. Runs were performed at room temperature (~21° C.). The range of binding capacities represents those obtained between 20–50% breakthroughs.

In another test of the present invention, an experimental binary system was established for albumin and fibrinogen, respectively.

The albumin was present at about 30–60 g/l in blood plasma, and was both a contaminant and a product in plasma fractionation. Albumin has fast ion exchange kinetics and high ion exchange capacity.

The fibrinogen was present at about 2 g/l in blood plasma, and was a high value product in plasma fractionation. Fibrinogen has slow ion exchange kinetics and low ion exchange capacity and is easily denatured and proteolyzed.

The present inventors considered the question of what mechanism is controlling, i.e., film mass transfer, intraparticle mass transfer, convective mass transfer, or adsorption kinetics.

Film mass transfer limitations do not explain the higher capacity of fibrinogen at lower $u_o$ and same column residence time.

As to convection and/or adsorption kinetics, the adsorption kinetics of fibrinogen appear to be relatively slow. However, $N_{i+}$ ($L/u_o$) does not adequately describe the relationship between the adsorption rate and convection rate. $N_{i+}$ is valid only if L or $u_o$ is kept constant.

In summary, the present invention relating to inside-out crosslinking and inside-out crosslinked cellulose beads provides: low pressure drops at high flow rates for a high L/D column mode; high binding capacity with rapid transport to adsorption sites; and differential $N_{i+}$ allowing for purification by speed.

The dynamic binding capacities of three DEAE media for BSA and fibrinogen were compared. The running buffer for all columns was 39 mM Tris-phosphate, pH 8.6 and all runs were performed at room temperature (~21° C.) with breakthroughs of 20–30%. BSA (1 mg/ml) and fibrinogen (1 mg/ml) was loaded at 10 cm/min, or at the highest linear velocities attainable while maintaining backpressures <20 PSI. Note that at a column length of 15 cm or more, an operating linear velocity of 10 cm/min is not feasible with DEAE-Sepharose FF and Whatman DE-52 due to high back pressures. Table 19 below provides a comparison of dynamic binding capacities (DBC) for DEAE Media.

TABLE 19

| DEAE Media [bead length/particle size] | Albumin [high velocity or P] | Fibrinogen [high velocity] | Fibrinogen [low velocity] |
|---|---|---|---|
| 2% cross-linked-DEAE Cellulose [90 cm - 500–500 μm] | 15–20 mg/ml [10 cm/min, ~3 PSI] | 0.4–0.6 mg/ml [10 cm/min, ~3 PSI] | 2.7–3.1 mg/ml [0.5 cm/min] |
| DEAE Sepharose Fast-Flow [15 cm - 50–100 μm] | 10–12 mg/ml [7 cm/min, ~20 PSI] | 2.2–2.7 mg/ml [7 cm/min, ~20 PSI] | 2.4–3.0 mg/ml [0.5 cm/min] |
| Whatman DE-52 [15 cm - <50 μm] | 10–15 mg/ml [2 cm/min, ~20 PSI] | N/D* | 3.2–3.9 mg/ml [0.5 cm/min] |

Dynamic binding of serum albumin on cellulose beads under optimal binding conditions at 10 cm/minute is reported in FIG. 27. For FIG. 27, albumin (1 mg/ml) was loaded onto columns of 2%, 6% and 10% cross-linked-DEAE cellulose beads at 10 cm/min to about 20 breakthrough according to standard procedures. The loading/ running buffer for all columns was 39 mM Tris-phosphate, pH 8.6. Protein concentrations in the pools of the fall-through, wash and 1M salt elution were determined by absorbance at 280 nm. In all cases, the recovery of serum albumin (bovine) was greater than 90%.

Figure 28A:
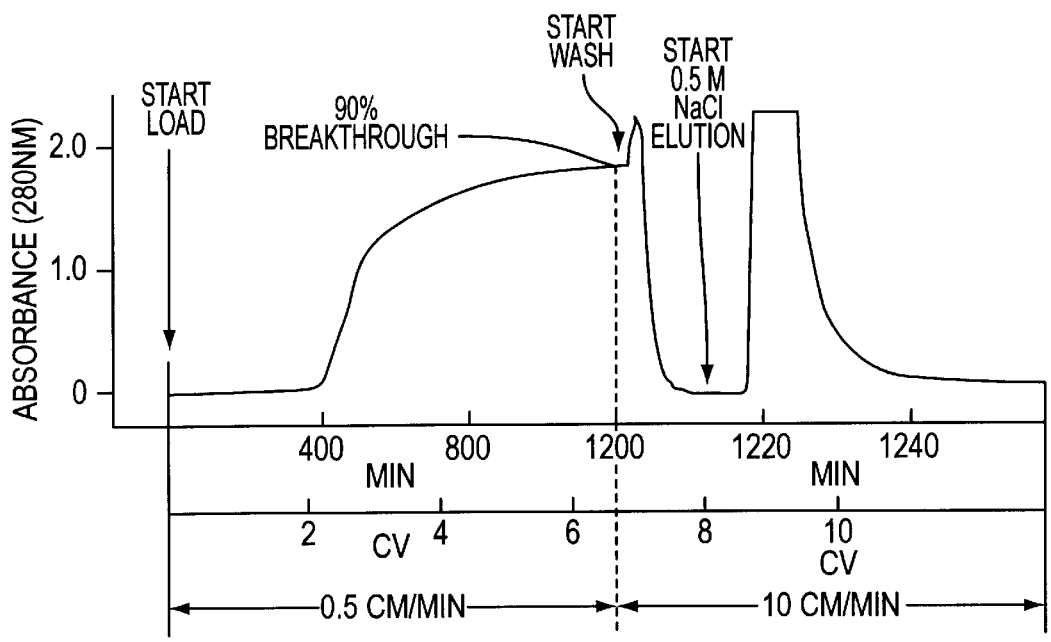
FIG. 28(A) and (B) are graphs of dynamic binding of fibrinogen on 2% crosslinked-DEAE cellulose beads.
Figure 28B:
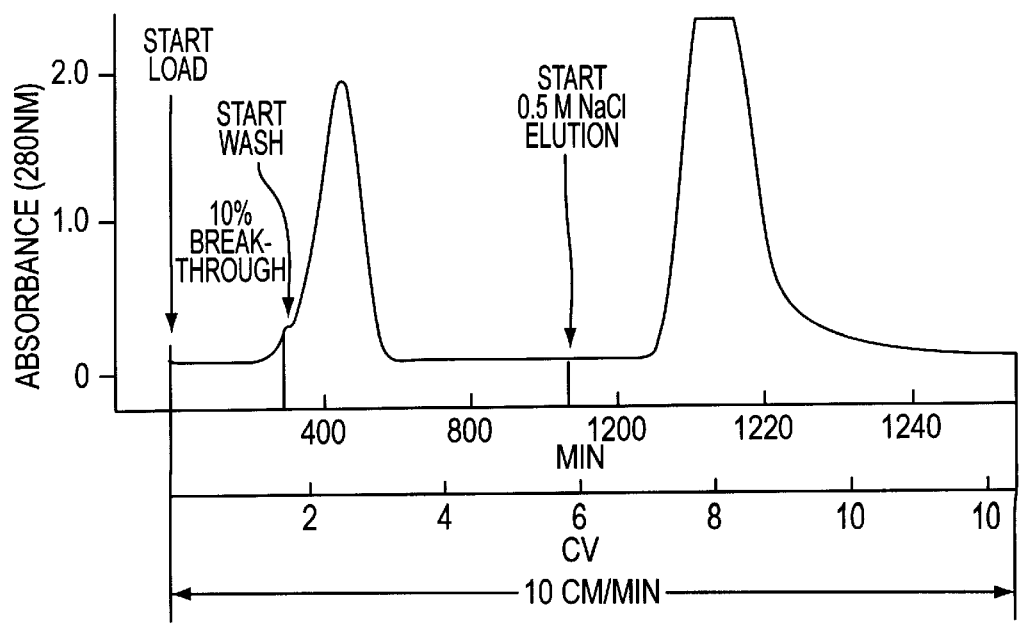
FIG. 28($a$) gives data for 0.5 cm/minute load, with 10 cm/minute wash and elution.
Figure 29A:
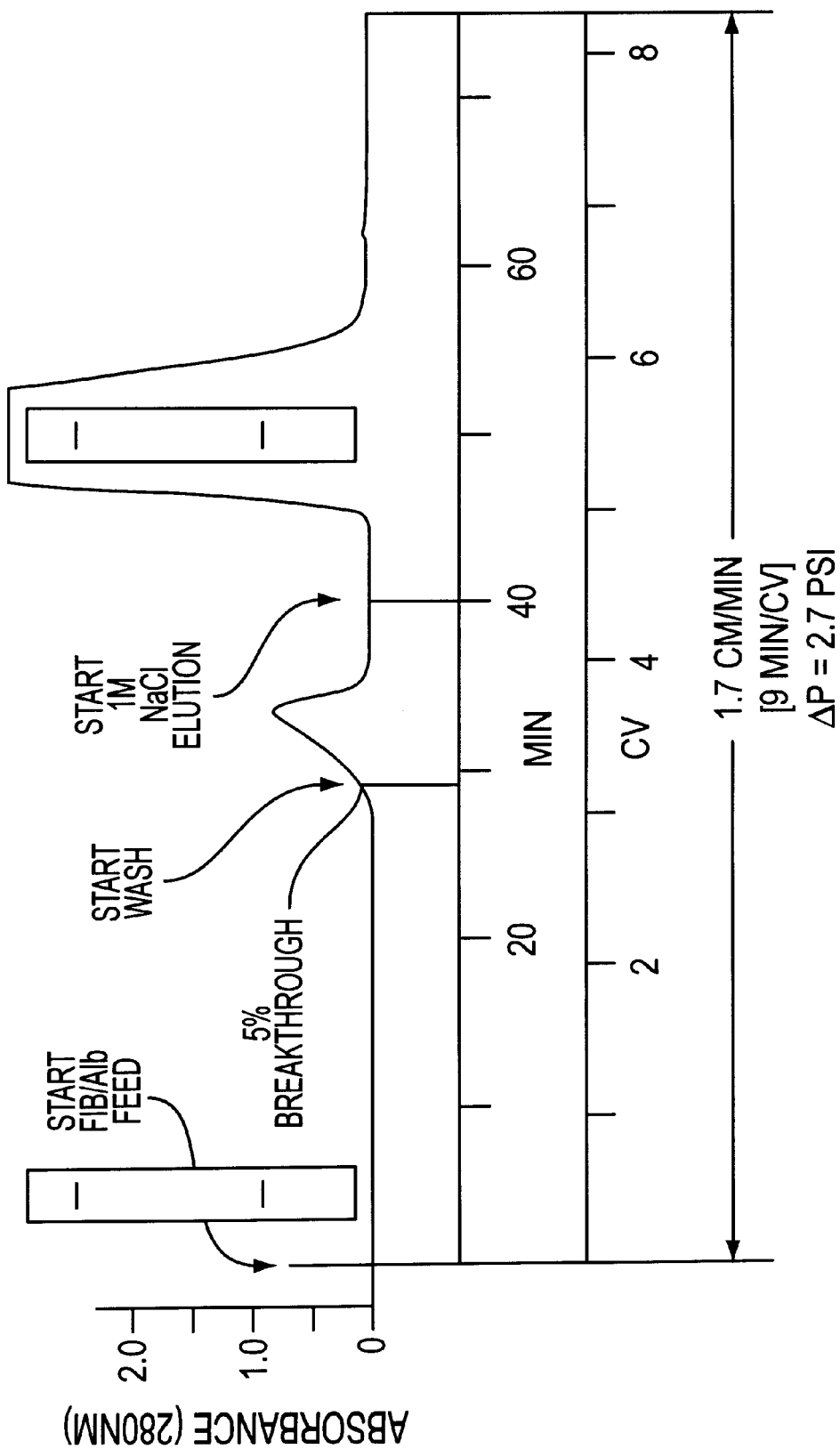
FIG. 29 graphically represents absorbance data for fibrinogen and albumin.
Figure 29B:
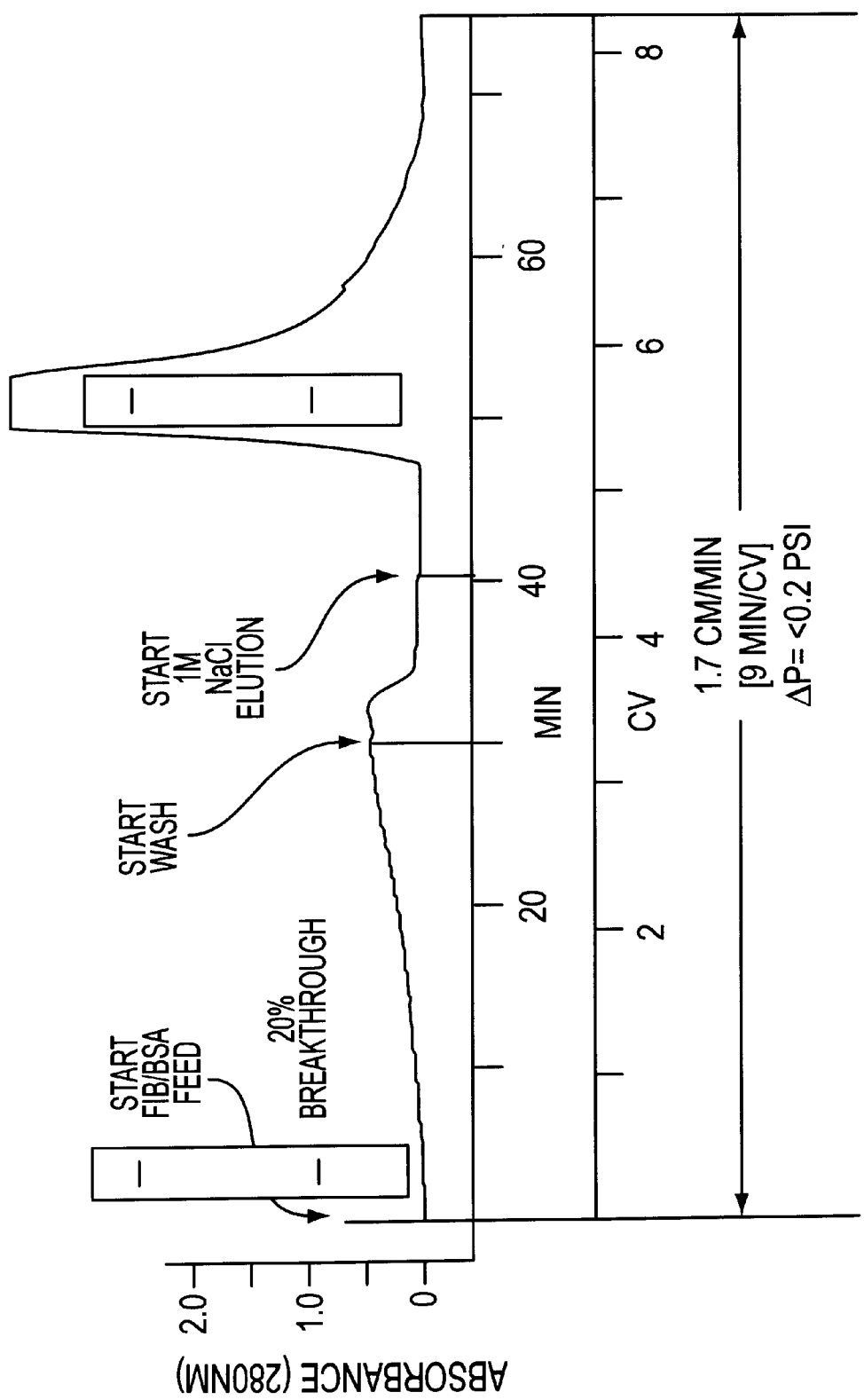
Figure 29C:
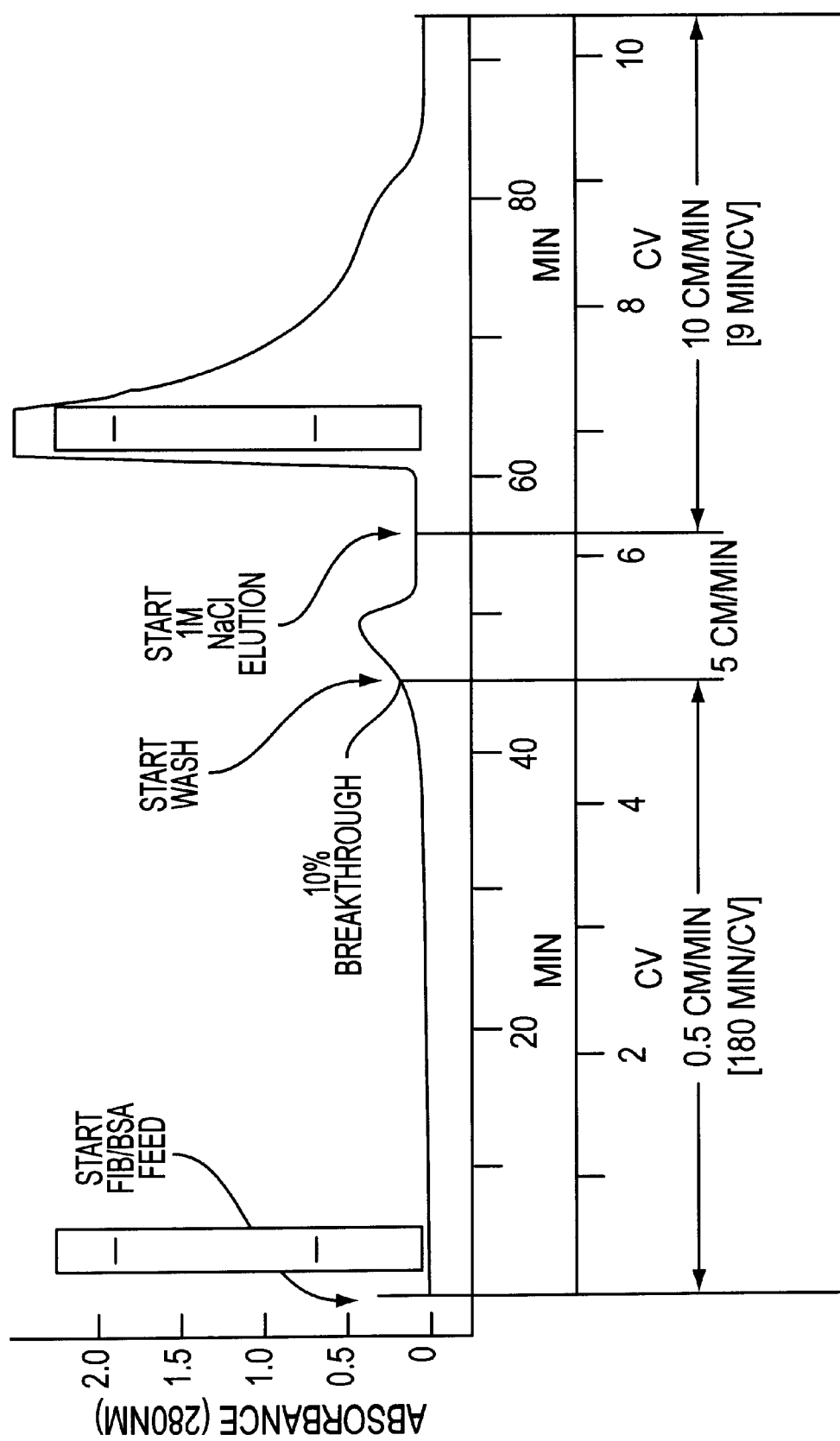
Figure 29D:
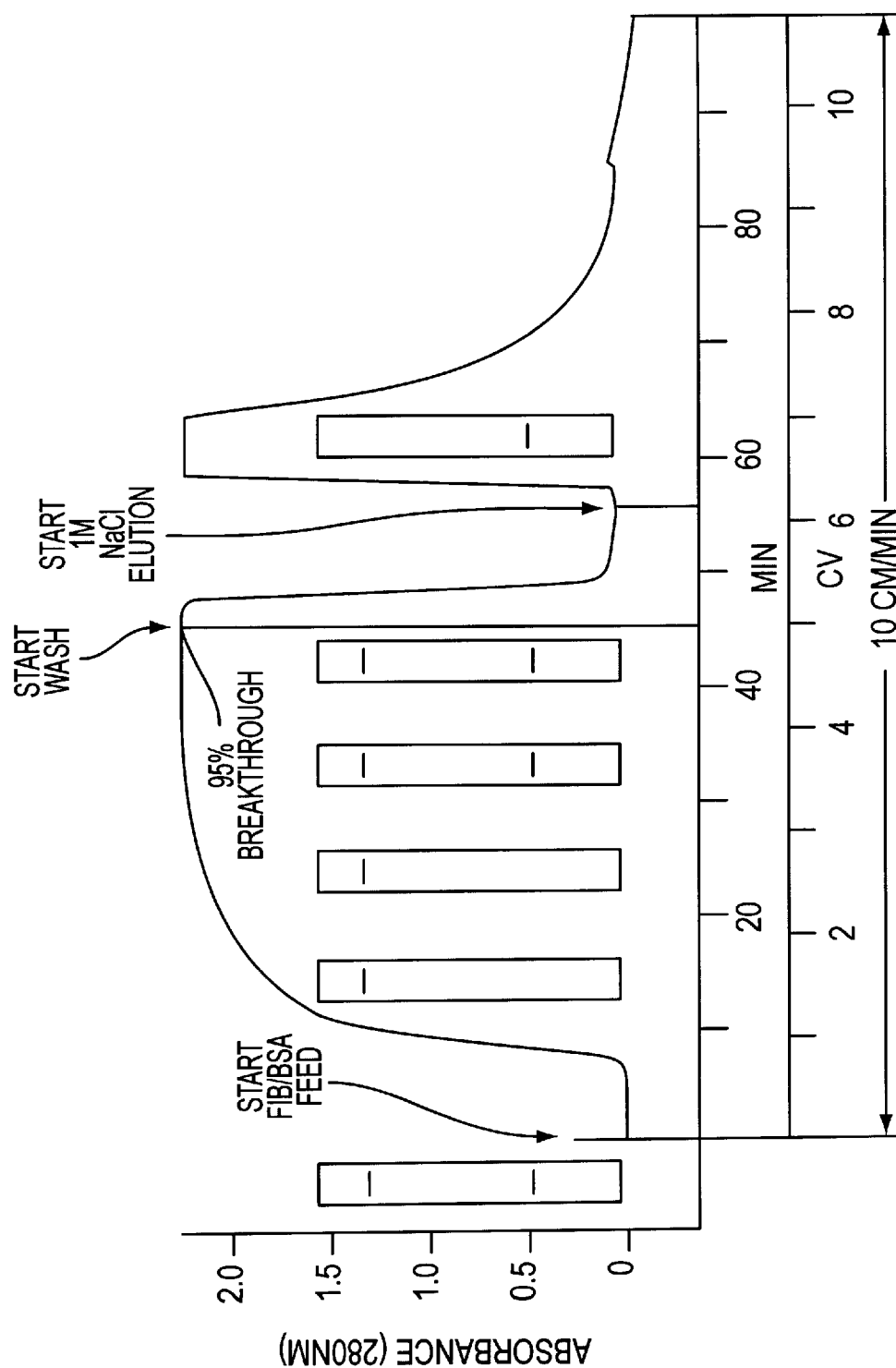
Figure 29F:
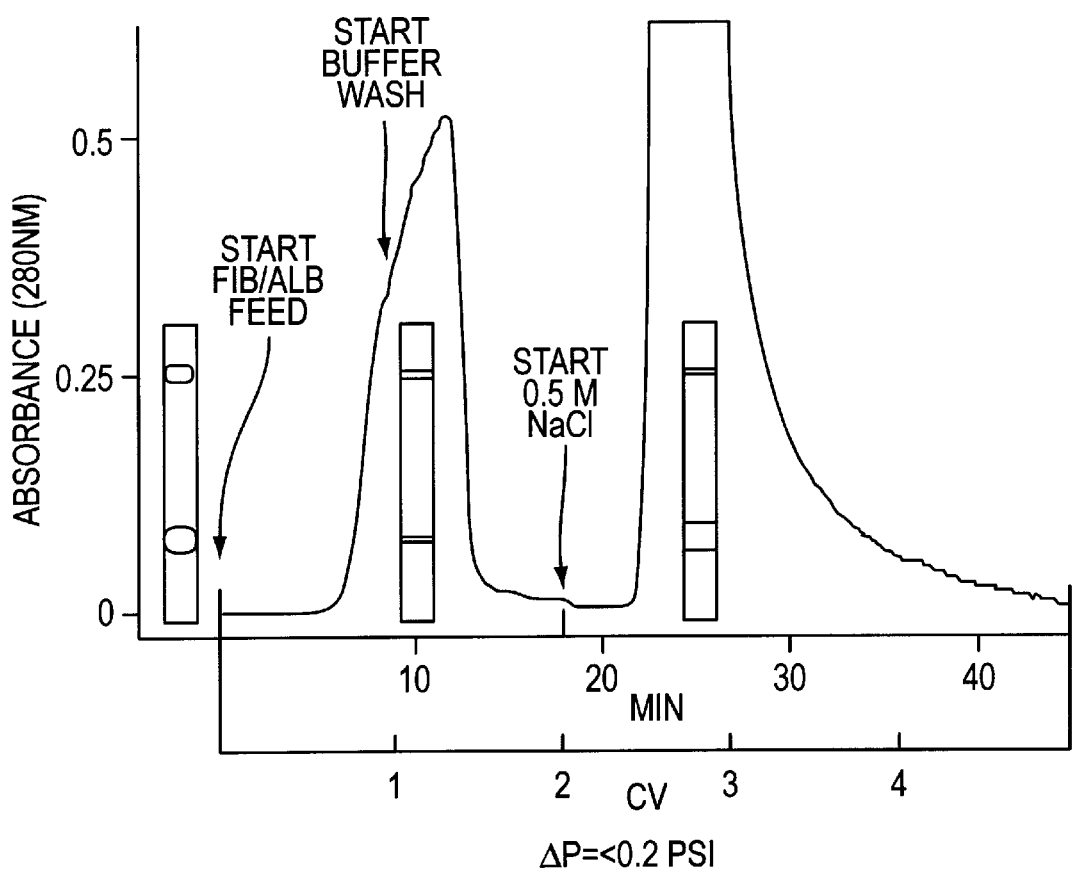
Figure 29G:
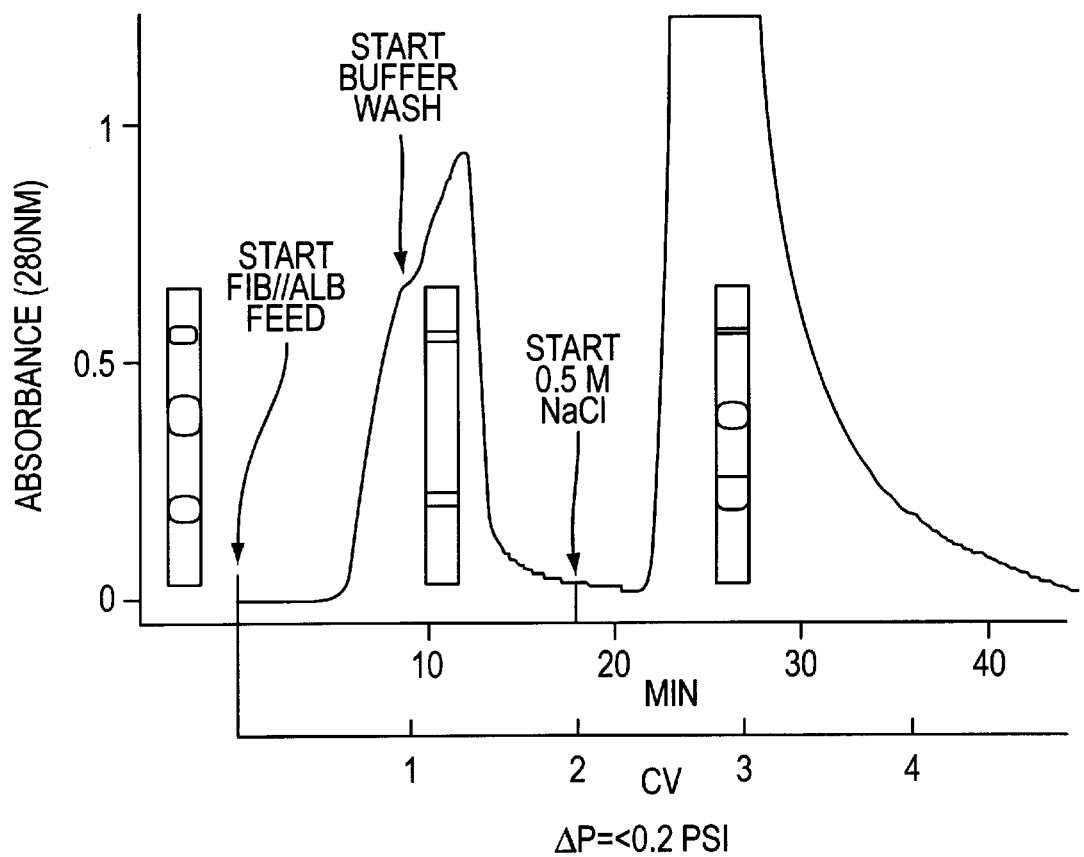

Dynamic binding of fibrinogen on 2% crosslinked-DEAE cellulose beads was studied in FIG. 28. FIG. 28(a) gives data for 0.5 cm/minute load, with 10 cm/minute wash and elution. FIG. 28(b) gives data for 10 cm/minute loading, washing and elution.

Fibrinogen/Albumin were studied by the following methods.

2% cross-linked-DEAE cellulose beads were packed into (i) a 20×5.0 cm or (ii) a 100×1.6 cm borosilicate glass column, washed with 2 column volumes of 4M NaCl, I column volume of 0.5M NaOH and equilibrated with 10 column volumes of 39 mM Tris-phosphate, pH 8.6. Sepharose Fast-Flow (Pharmacia) was packed into a 20 cm×5.0 cm column and conditioned as described above. The buffer delivery system in all cases consisted of a peristaltic pump (Masterflex 7018–52) with #14 tubing connected to a three way valve connected to the top of the column and a pressure gauge. Eluents were monitored by absorbance on a Knauer UV Detector at 280 nm.

Binary models solutions consisted of ~1 mg/ml fibrinogen (FIB, made for ARC by Baxter) and (i) 1 mg/ml, (ii) 5 mg/ml or (iii) 10 mg/ml albumin (ALB, bovine serum albumin, Sigma). That is, three bimodal mixtures were examined with FIB/ALB at ratios of 1:1, 1:5 and 1:10. The loading and running buffer was 39 mM Tris-phosphate, pH 8.6.

Experiments A and B used 1:1 FIB/ALB, ~3.5 column volumes, 15×5.0 cm beds. A 15×5 cm column was packed with 2% cross-linked DEAE beads or Sepharose-FF. These columns were loaded with 1000 ml of a bimodal mixture of FIB/ALB (1 mg/ml each) at 1.7 cm/min, a column residence time of 9 min. The columns were washed with 2 column volumes of tris-phosphate buffer and the bound proteins were eluted with 3 column volumes of 1M NaCl.

Experiment C used 1:1 FIB/ALB, ~5 column volumes, 90×1.6 cm beds. A 90×1.6 cm column was packed with 2% cross-linked DEAE beads (batch #193). This column was loaded with 1000 ml of FIB/ALB (1 mg/ml: 1 mg/ml) at 0.5 cm/min. The column was washed with 1 column volume of tris-phosphate buffer and the bound proteins were eluted with 2 column volumes of 1M NaCl and 2 column volumes of 4M NaCl.

Experiments D and E used 1:1 FIB/ALB, ~5 column volumes, 90×1.6 cm beads. A 90×1.6 cm column was packed with 2% cross-linked DEAE beads (batch #193). This column was loaded with 1000 ml of FIB/ALB (1 mg/ml: 1 mg/ml) at 10 cm/min (Experiment D). The unabsorbed 'flow-through' pool from this 10 cm/min run was then reloaded onto the column (after regeneration) at 0.5 cm/min (Experiment E). In both cases, the columns were washed with 1 column volume of tris-phosphate buffer and the bound proteins were eluted with 2 column volumes of IM NaCl and 2 column volumes of 4M NaCl.

Experiments F and G used 1:5 and 1:10 FIB/ALB, respectively, 1 column volume, 90×1.6 cm beads. A 90×1.6 cm column was packed with 2% cross-linked DEAE beads (batch #193). This column was loaded with i) one column volume (180 ml) of FIB/ALB in a ratio of 1:5 (1 mg/ml:5 mg/ml) at 10 cm/min (Experiment F) or ii) one column volume of FIB/ALB in a ratio of 1:10 (1 mg/ml: 10 mg/ml) at 10 cm/min (Experiment G). In both cases, the columns were washed with one column volume of tris-phosphate buffer and the bound proteins were eluted with 2 column volumes of 1M NaCl and 2 column volumes of 4M NaCl.

In all cases above, the i) 'flow-through' ii) wash, iii) 1M NaCl elusion and iv) 4M NaCl elusion were collected separately and pooled. The volumes and absorbances (280 nm) were measured to determine the mass balance. To regenerate the columns, they were washed with 2 column volumes of 4M NaCl, one column volume of tris-phosphate buffer, one column volume of 0.5 N NaOH and re-equilibrated with 8–10 column volumes of loading buffer.

Table 20 below shows adsorption purification by speed of albumin/fibrinogen mixtures at high L/D and high $d_p/u_o$, for 2% crosslinked DEAE cellulose beads and DEAE sepharose FF.

TABLE 20

| | | Experimental Conditions | | | | Fibrinogen | | BSA | |
|---|---|---|---|---|---|---|---|---|---|
| Matrix | Comments | BSA:FiB Feed Ratio | $U_o$ [cm/min] | L [cm] | $L/U_o$ [min] | % FT (Purity) | Purification Factor (Basis) | % Bound (Purity) | Purification Factor (Basis) |
| 2% cross-linked-DEAE Cellulose | Base case for Cellulose Low $U_o$ No separation | 1:1 (5 column volumes) | 0.5 | 90 | 180 | 5% (100%) | 1 | 100% (51%) | 1 |
| 2% cross-linked-DEAE Cellulose | Load 5 column volumes of Albumin/Fib High $U_o$, High L/D Good separation | 1:1 (5 column volumes) | 10 | 90 | 9 | 85% (80%) | 1.6 | 80% (84%) | 1.7 |
| 2% cross-linked-DEAE Cellulose | Load 5 column volumes of Albumin/Fib Low $U_o$, Low L/D | 1:1 (3.5 column volumes) | 1.6 | 15 | 9 | 30% (100%) | 2.0 | 100% (60%) | 1.2 |
| 2% cross-linked-DEAE Cellulose | 1 column volume of 20% Fib/80% Alb High $U_o$, High L/D Good Separation | 5:1 (1 column volumes) | 10 | 90 | 9 | 45% (62%) | 3.1 | 95% (93%) | 1.2 |
| 2% cross-linked-DEAE | 1 column volumes of 10% Fib/90% | 10:1 (1 | 10 | 90 | 9 | 55% (37%) | 3.7 | 90% (95%) | 1.1 |

TABLE 20-continued

| | | Experimental Conditions | | | | Fibrinogen | | BSA | |
|---|---|---|---|---|---|---|---|---|---|
| | | | | | | | Purification | | Purification |
| Matrix | Comments | BSA:FiB Feed Ratio | $U_o$ [cm/min] | L [cm] | $L/U_o$ [min] | % FT (Purity) | Factor (Basis) | % Bound (Purity) | Factor (Basis) |
| Cellulose | Alb High $U_o$, High L/D Good Separation | column volumes) | | | | | | | |
| DEAE Sepharose FF | Base Case for DEAE sepharose FF Low $U_o$, Low L/D No Separation | 1:1 (5 column volumes) | 1.6 | 15 | 9 | 2% | 1 | 100% (51%) | 1 |
| DEAE Sepharose FF | Base Case for DEAE Sepharose FF Low $U_o$, Low L/D No Separation | 1:1 (3 column volumes) | 2 | 18 | 9 | 0% | 1 | 100% (50%) | 1 |
| DEAE sepharose FF | Load Albumin/Fib at highest possible $U_o$ No separation | 1:1 (3 column volumes) | 7 | 15 | 2 | 0% | 1 | 100% (50%) | 1 |

FIG. 29 reports results relating to fibrinogen and albumin. The loading/running buffer for all runs was 39 mM Tris-phosphate, pH 8.6.

FIG. 29-A relates to a DEAE Sepharose Fast-flow-Low L/D column, 1:1. A 15×5 cm bed (300 ml) was loaded at 1.7 cm/min with 1000 ml of fibrinogen (1 mg/ml) and albumin (1 mg/ml). The column residence time was 9 min. Most of the fibrinogen and albumin bound and eluted together. The buffer used was 39 mM Tris-phosphate, pH 8.6.

FIG. 29-B reports the results for 2% cross-linked-DEAE cellulose beads—Low L/D column, 1:1. A 15×5 cm bed (300 ml) was loaded at 1.7 cm/min with 1000 ml (~3.5 column volumes) of fibrinogen (1 mg/ml) and albumin (1 mg/ml). The column residence time was 9 minutes. Most of the fibrinogen and albumin bound and eluted together.

FIG. 29-C gives the results for 2% cross-linked-DEAE cellulose beads—High L/D column/Slow load. A 90×1.6 cm bed (180 ml) was loaded at 0.5 cm/min with 1000 ml (~5 column volumes) of fibrinogen (1 mg/ml) and albumin (1 mg/ml). The column residence time was 180 minutes. Most of the fibrinogen and albumin bound and eluted together.

FIG. 29-D gives the results for 2% cross-linked-DEAE cellulose beads—High L/D column/Fast load. A 90×1.6 cm bed (180 ml) was loaded at 10 cm/min with 1000 ml (~5 column volumes) of fibrinogen (1 mg/ml) and albumin (1 mg/ml). The column residence time was 9 min. Greater than 75% of the fibrinogen flowed through the column without binding, whereas most of the albumin bound and eluted with 1M NaCl.

FIG. 29-E gives the results for 2% cross-linked-DEAE cellulose beads—Reload. A 90×1.6 cm bed (180 ml) was 're-loaded' at 0.5 cm/min with the 'flow-through' (~650 ml) from the 10 cm/inin FIB/ALB run shown in FIG. 29-D. The column residence time was 180 minutes. Most of the fibrinogen and remaining albumin bound and eluted together.

FIG. 29-F provides results for 2% cross-linked-DEAE Cellulose Beads—FIB/ALB 1:5. A 90×1.6 cm bed (180 ml) was loaded at 10 cm/min with 180 ml (1 column volume) of fibrinogen (1 mg/ml) and albumin (5 mg/ml). Most of the fibrinogen 'fell through' the column in a 3.1-fold purification, whereas most of the albumin bound and eluted with 0.5M NaCl.

FIG. 29-G gives data for 2% cross-linked-DEAE Cellulose Beads—FIB/BSA 1:10. A 90×1.6 cm bed (180 ml) was loaded at 10 cm/min with 180 ml (1 column volume) of fibrinogen (1 mg/ml) and albumin (5 mg/ml). Most of the fibrinogen 'fell through' the column in a 3.7-fold purification, whereas most of the albumin bound and eluted with 0.5M NaCl.

Analysis of 1:5 and 1:10 fibrinogen/albumin was conducted by runs by PAGE. Albumin standards and the eluents of the 1:5 and 1:10 fibrinogen/albumin (FIB/ALB) runs on 2% cross-linked-DEAE cellulose beads (batch 193) were analyzed by PAGE (4–12% gradient gel). Lanes: 1. ALB, 0.2 mg/ml; b. ALB, 0.5 mg/ml; c. 1:5 feed; d. 1:5 flow-through/wash; e. 1:5 NaCl eluent; f. 1:10 feed; g. 1:10 flow-through/wash; h. 1:10 NaCl eluent; i. ALB 1, mg/ml; j. ALB, 2 mg/ml. Concentrations of fibrinogen in the mixtures were determined by ELISA. Concentrations of ALB in the mixtures were determined by laser densitometry of the ALB bands versus ALB (standards e.g., lanes a,b,i, and j). Fibrinogen and BSA yields and purities for a DEAE Sepharose Fast Flow (column length, 15 cm), with loading the fibrinogen or BSA at 1.7 cm/minute, with $L/U_o$=9 minutes, were as set forth in Table 21 below.

TABLE 21

| | Fibrinogen | BSA |
|---|---|---|
| Feed | 100% | 100% |
| FT & Wash | 2% | 0% |
| Elution (purity) | 98% (49%) | 100% (51%) |

Fibrinogen and BSA yields and purities for a 2% DEAE-crosslinked-cellulose bead column (column length, 15 cm), with loading the fibrinogen or BSA at 1.6 cm/minute, with $L/U_o$=9 minutes. For fibrinogen, feed was 100%, FT and wash was 2%, and elution (purity) was 70% (40%). For BSA, feed was 1005, FT and wash was 0% and elution (purity) was 100% (60%).

Fibrinogen and BSA yields and purities for a 2% DEAE-crosslinked-cellulose bead column (column length, 90 cm), with loading the fibrinogen or BSA at 0.5 cm/minute, with $L/U_o$=180 minutes, were as follows. Feed was 100% for fibrinogen and BSA; FT & Wash was 5% for fibrinogen and 0% for BSA; elution (purity) was 95% (49%) for fibrinogen and 100% (51%) for BSA.

Fibrinogen and BSA yields and purities for a 2% DEAE-crosslinked-cellulose bead column (column length, 90 cm), with loading the fibrinogen or BSA at 0.5 cm/minute, with $L/U_o=9$ minutes for loading for Feed #1 and 180 minutes for loading for Feed #2, were as follows. Fibrinogen had feed #1, 100%; FT and wash 85%; elution #1, 15%; feed #2 (from FT and wash #1), 15 85%; FT and wash #2, 8% and elution #2, 77%, for overall yields (purity) of 77% (79%). BSA had feed #1, 100%; FT and wash 21%; elution #1, 79%, for overall yields (purity) of 79% (84%).

In a preferred embodiment of the present invention, an inside-out crosslinked hydrogel is used in a method for purifying a virus-containing biological product, to thereby remove a pathogen, e.g., HIV, Hepatitis B and/or Hepatitis C.

While the invention is described in detail and with reference to specific embodiments thereof, it will be apparent to one skilled in the art that changes and modifications can be made therein without departing from the spirit and scope thereof.

We claim:

1. An inside-outside spatial installation method for a bifunctional reagent that crosslinks and/or activates a polymer matrix, comprising at least the step of:
    (a) pre-loading a polymer matrix comprising a column of polymer beads with an organic solvent to give a non-aqueous bead/organic solvent pre-load,
       wherein the polymer matrix comprises (i) at least one cellulose particle, (ii) at least one agarose particle. (iii) at least one chitosan particle (iv) at least one dextran particle, (v) at least one polymer particle of a polymer having polysaccharide linkages, or (vi) a composite of cellulose, agarose, chitosan and/or other polymer particles;
    (b) to the bead/organic solvent pre-load of step (a), adding a bifunctional reagent dissolved in an organic solvent mixture to give a bead/organic solvent/bifunctional reagent mixture,
    (c) for the bead/organic solvent/bifunctional reagent mixture provided in step (b), reacting one functionality of the bifunctional reagent with the polymer matrix.

2. The method of claim 1, wherein the polymer matrix comprises at least one cellulose particle.

3. The method of claim 1, wherein the polymer matrix comprises at least one agarose particle.

4. The method of claim 1, wherein the polymer matrix comprises at least one chitosan particle.

5. The method of claim 1, wherein the polymer matrix comprises a composite of cellulose, agarose, chitosan, and/or other polymer particles.

6. The method of claim 1, further comprising removing the reagent from the void volume of the polymer matrix prior to the reacting step (c).

7. The method of claim 1, wherein step (c) is followed by the inside-outside crosslinking step of:
    (d) further reacting the matrix so to crosslink the matrix, wherein a higher local concentration of crosslinking occurs on the intra-particle volume relative to the local concentration near the outer surface of the matrix.

8. The method of claim 1, wherein step (c) is followed by the inside-outside ligand attachment step of:
    (d*) further reacting the matrix with a ligand or an ionic group so that a higher concentration of ligand or ionic moiety occurs on the intra-particle volume relative to the outer surface of the matrix.

9. The method of claim 7, further comprising, prior to crosslinking step (d), a step of classifying by fluidizing.

10. The method of claim 8, further comprising, prior to crosslinking step (d*), a step of classifying by fluidizing.

11. A inside-outside spatial installation method for a bifunctional reagent that crosslinks and/or activates a polymer matrix, comprising at least the step of:
    (a) pre-loading a polymer matrix comprising a column of polymer beads with an organic solvent to give a non-aqueous bead/organic solvent pre-load;
    (b) to the bead/organic solvent pre-load of step (a), adding a bifunctional reagent dissolved in an organic solvent mixture to give a bead/organic solvent/bifunctional reagent mixture,
    (c) for the bead/organic solvent/bifunctional reagent mixture provided in step (b), reacting one functionality of the bifunctional reagent with the polymer matrix.

12. The method of claim 1, wherein the polymer particles are 350 microns to 1,000 microns.

13. The method of claim 12, wherein the polymer particles are 500 microns to 1,000 microns.

14. The method of claim 12, wherein the polymer particles are 400 to 600 um.

15. The method of claim 1, further comprising, before step (a), a step of polymer particle sizing.

16. The method of claim 1, wherein an approximately spherical bead of about 500 microns is used in step (a), such that a crosslinked bead is provided with an observable halo of about 50 microns from the particle edge, with the heavily crosslinked part of the bead in the interior volume of the particle sphere from the particle center to about the point where the radius is about 200 microns.

17. The method of claim 1, wherein, before step (a), a pre-crosslinking wash is performed using de-ionized water.

18. The method of claim 1, wherein the addition of the bifunctional reagent in step (b) is in a column mode.

19. The method of claim 1, wherein the step (c) reaction of the bifunctional molecule within the beads is done by changing pH, increasing temperature, catalyst addition or a combination thereof.

20. The method of claim 1, wherein the organic solvent is epichlorohydrin in ethanol.

21. The method of claim 20, wherein after the epichlorohydrin in ethanol solution is supplied to the beads, the column is closed and the beads are allowed to incubate in the solution.

22. The method of claim 21, wherein the incubation is at room temperature for about 30 minutes.

23. The method of claim 1, wherein before step (c), the beads are removed from the column and in step (c), the beads are suspended in a NaOH solution.

24. The method of claim 23, wherein the bead/NaOH solution is stabilized to about pH 12.7 to 12.8 and stirred at about 100–200 rpm for about 18–24 hours.

* * * * *